United States Patent [19]
Herz et al.

[11] Patent Number: 5,835,087
[45] Date of Patent: Nov. 10, 1998

[54] SYSTEM FOR GENERATION OF OBJECT PROFILES FOR A SYSTEM FOR CUSTOMIZED ELECTRONIC IDENTIFICATION OF DESIRABLE OBJECTS

[76] Inventors: Frederick S. M. Herz, Box 625 Canaan Valley, Davis, W. Va. 26260; Jason M. Eisner, 1015 Spruce St., Philadelphia, Pa. 19107; Lyle H. Ungar, 321 S. 20th St., Philadelphia, Pa. 19103

[21] Appl. No.: 551,201

[22] Filed: Oct. 31, 1995

Related U.S. Application Data

[63] Continuation-in-part of Ser. No. 346,425, Nov. 29, 1994, Pat. No. 5,758,257.

[51] Int. Cl.$^6$ ...................................................... H04N 7/14
[52] U.S. Cl. ................................. 345/327; 348/1; 348/7; 348/10; 348/12; 348/13; 455/2; 455/4.2; 455/5.1
[58] Field of Search .................................. 348/1, 2, 6, 7, 348/10, 12, 13, 906; 455/2, 3.1, 4.1, 4.2, 5.1, 6.1, 6.2, 6.3; 345/326, 327; 395/200.47, 200.48, 200.49; H04N 7/10, 7/14, 7/173

[56] References Cited

U.S. PATENT DOCUMENTS

| | | | |
|---|---|---|---|
| 4,529,870 | 7/1985 | Chaum | 235/380 |
| 4,706,080 | 11/1987 | Sincoskie | 340/825 |
| 4,759,063 | 7/1988 | Chaum | 380/30 |
| 4,914,698 | 4/1990 | Chaum | 380/30 |
| 4,926,480 | 5/1990 | Chaum | 380/23 |
| 4,947,430 | 8/1990 | Chaum | 380/25 |
| 4,987,593 | 1/1991 | Chaum | 380/3 |
| 5,131,039 | 7/1992 | Chaum | 380/23 |
| 5,136,501 | 8/1992 | Silverman et al. | 364/408 |
| 5,245,656 | 9/1993 | Loeb et al. | 380/23 |
| 5,251,324 | 10/1993 | McMullan, Jr. | 455/2 |
| 5,276,736 | 1/1994 | Chaum | 380/24 |

(List continued on next page.)

OTHER PUBLICATIONS

Tak W. Yan & Hector Garcia–Molina, SIFT –A Tool for Wide–Area Information Dissemination, 1995 USENIX Technical Conference, New Orleans, LA., Jan. 16–20, pp. 177–186.

Masahiro Morita & Yoichi Shinoda, Information Filtering Based on User Behavior Analysis and Best Match Text Retrieval, Proceedings of the Seventeenth Annual International ACM–SIGIR Conference on Research and Development in Information Retrieval, Dublin, Jul. 3–6, 1994, Pages Title Page (272)–281.

(List continued on next page.)

*Primary Examiner*—Andrew I. Faile
*Assistant Examiner*—John W. Miller
*Attorney, Agent, or Firm*—Duft, Graziano & Forest, P.C.

[57] ABSTRACT

This invention relates to customized electronic identification of desirable objects, such as news articles, in an electronic media environment, and in particular to a system that automatically constructs both a "target profile" for each target object in the electronic media based, for example, on the frequency with which each word appears in an article relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media. Users' target profile interest summaries can be used to efficiently organize the distribution of information in a large scale system consisting of many users interconnected by means of a communication network. Additionally, a cryptographically-based pseudonym proxy server is provided to ensure the privacy of a user's target profile interest summary, by giving the user control over the ability of third parties to access this summary and to identify or contact the user.

24 Claims, 13 Drawing Sheets

U.S. PATENT DOCUMENTS

| | | | |
|---|---|---|---|
| 5,301,109 | 4/1994 | Landauer et al. | 364/419 |
| 5,321,833 | 6/1994 | Chang et al. | 395/600 |
| 5,331,554 | 7/1994 | Graham | 364/419.07 |
| 5,331,556 | 7/1994 | Black, Jr. et al. | 364/419.01 |
| 5,373,558 | 12/1994 | Chaum | 380/23 |
| 5,410,344 | 4/1995 | Graves et al. | 348/1 |
| 5,469,206 | 11/1995 | Strubbe et al. | 348/7 |
| 5,483,278 | 1/1996 | Strubbe et al. | 348/7 |
| 5,534,911 | 7/1996 | Levitan | 348/1 |
| 5,541,638 | 7/1996 | Story | 348/7 |
| 5,600,364 | 2/1997 | Hendricks et al. | 348/1 |

OTHER PUBLICATIONS

Jim Binkley & Leslie Young, Rama: An Architecture for Internet Information Filtering, Journal of Intelligent Information Systems: Integrating Artificial Intelligence and Database Technologies, vol. 5, No. 2, Sep. 1995, pp. 81–99.

Sincoskie, W.D. & Cotton C.J. "Extended Bridge Algorithms for Large Networks", IEEE Network, Jan. 1988 –vol. 2, No. 1, pp. 16–24.

Deering, S.; Estrin, D.; Farinacci, D.; Jacobson, V.; Liu, C.; Wei, L; "An Architecture for Wide–Area Multicast Routing", Computer Communication Review, vol. 24, No. 4, Oct. 1994, Proceedings of SIGCOMM 94, pp. 126–135.

Bolot, J.; Turletti, T. & Wakeman, I.; "Scalable Feedback Control for Multicast Video Distribution In the Internet", Computer Communication Review, vol. 24, No. 4 Oct. 1994, Proceedings of SIGCOMM 94, pp. 58–67.

Rivest, R.L.; Shamir,A. & Adleman, L.; "A Method for Obtaining Digital Signatures and Public–Key Cryptosystems", Communications of the ACM, Feb. 1978, vol. 21, No. 2, pp. 120–126.

Chaum, D. "Security without Identification: Card Computers to Make Big Brother Obsolete", Communications of the ACM, 28(10), Oct. 1985, pp. 1030–1044.

Chaum, D. "Untraceable Electronic Mail, Return Addresses, and Digital Pseudonyms", Communications of the ACM, vol. 24, No. 2, Feb., 1981.

Sheth, B. & Maes, P. "Evolving Agents For Personalized Information Filtering", Proc. 9th IEEE Conference, 1993 pp. 345–352.

Cutting, D.R.; Karger, D.R.; Pedersen, J.O. & Tukey, J.W. "Scatter/Gather: A Cluster–based Approach to Browsing Large Document Collections", 15 Ann. Int'l SIGIR '92, ACM, 1992, pp. 318–329.

Rose, D.E.; Mander, R.; Oren, T., Ponceleon, D.B.; Salomon, G. & Wong, Y.Y. "Content Awareness in a File System Interface Implementing the 'Pile' Metaphor for Organizing Information", 16 Ann. Int'l SIGIR '93, ACM, pp. 260–269.

Damashek, M., Gauging Similarity via N–Grams: Language–Independent Sorting, Categorization, and Retrieval of Text, pp. 1–11, Jan. 24, 1995.

Salton, G., "Developments in Automatic Text Retrieval", Science, vol. 253, pp. 974–980, Aug. 30, 1991.

Chaum, D., "Achieving Electronic Privacy", Scientific American, Aug. 1992, pp. 96–101.

Loeb, S., "Architecting Personalized Delivery of Multimedia Information", Communications of the ACM, Dec. 1992, vol. 35, No. 12, pp. 39–50.

Foltz, P.W., Dumais, S.T., "Personalized Information Delivery: An Analysis Of Information Filtering Methods", Communications of the ACM, Dec. 1992, vol. 35, No. 12, pp. 51–60.

Belkin, N.J., Croft, W.B., "Information Filtering And Information Retrieval: Two Sides of the Same Coin?", Communications of the ACM, Dec. 1992, vol. 35, No. 12, pp. 29–38.

Chalmers, M., Chitson, P., "Bead: Explorations In Information Visualization", 15th Ann. Int'l SIGIR 92/Denmark – Jun. 1992, pp. 330–337.

Willett, P., "Recent Trends in Hierarchic Document Clustering: A Critical Review", Information Processing & Management, vol. 24, No. 5, pp. 557–597, 1988.

SYSTEM FOR GENERATION OF OBJECT PROFILES FOR A SYSTEM FOR CUSTOMIZED ELECTRONIC IDENTIFICATION OF DESIRABLE OBJECTS

CROSS-REFERENCE TO RELATED APPLICATIONS

This patent application is a continuation-in-part of U.S. patent application Ser. No. 08/346,425, filed Nov. 29, 1994 and titled "SYSTEM AND METHOD FOR SCHEDULING BROADCAST OF AND ACCESS TO VIDEO PROGRAMS AND OTHER DATA USING CUSTOMER PROFILES", now U.S. Pat. No. 5,758,257, which application is assigned to the same assignee as the present application.

FIELD OF INVENTION

This invention relates to customized electronic identification of desirable objects, such as news articles, in an electronic media environment, and in particular to a system that automatically constructs both a "target profile" for each target object in the electronic media based, for example, on the frequency with which each word appears in an article relative to its overall frequency of use in all articles, as well as a "target profile interest summary" for each user, which target profile interest summary describes the user's interest level in various types of tar get objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media. Users' target profile interest summaries can be used to efficiently organize the distribution of information in a large scale system consisting of many users interconnected by means of a communication network. Additionally, a cryptographically based proxy server is provided to ensure the privacy of a user's target profile interest summary, by giving the user control over the ability of third parties to access this summary and to identify or contact the user.

PROBLEM

It is a problem in the field of electronic media to enable a user to access information of relevance and interest to the user without requiring the user to expend an excessive amount of time and energy searching for the information. Electronic media, such as on-line information sources, provide a vast amount of information to users, typically in the form of "articles," each of which comprises a publication item or document that relates to a specific topic. The difficulty with electronic media is that the amount of information available to the user is overwhelming and the article repository systems that are connected on-line are not organized in a manner that sufficiently simplifies access to only the articles of interest to the user. Presently, a user either fails to access relevant articles because they are not easily identified or expends a significant amount of time and energy to conduct an exhaustive search of all articles to identify those most likely to be of interest to the user. Furthermore, even if the user conducts an exhaustive search, present information searching techniques do not necessarily accurately extract only the most relevant articles, but also present articles of marginal relevance due to the functional limitations of the information searching techniques. There is also no existing system which automatically estimates the inherent quality of an article or other target object to distinguish among a number of articles or target objects identified as of possible interest to a user.

Therefore, in the field of information retrieval, there is a long-standing need for a system which enables users to navigate through the plethora of information. With commercialization of communication networks, such as the Internet, the growth of available information has increased. Customization of the information delivery process to the user's unique tastes and interests is the ultimate solution to this problem. However, the techniques which have been proposed to date either only address the user's interests on a superficial level or provide greater depth and intelligence at the cost of unwanted demands on the user's time and energy. While many researchers have agreed that traditional methods have been lacking in this regard, no one to date has successfully addressed these problems in a holistic manner and provided a system that can fully learn and reflect the user's tastes and interests. This is particularly true in a practical commercial context, such as on-line services available on the Internet. There is a need for an information retrieval system that is largely or entirely passive, unobtrusive, undemanding of the user, and yet both precise and comprehensive in its ability to learn and truly represent the user's tastes and interests. Present information retrieval systems require the user to specify the desired information retrieval behavior through cumbersome interfaces.

Users may receive information on a computer network either by actively retrieving the information or by passively receiving information that is sent to them. Just as users of information retrieval systems face the problem of too much information, so do users who are targeted with electronic junk mail by individuals and organizations. An ideal system would protect the user from unsolicited advertising, both by automatically extracting only the most relevant messages received by electronic mail, and by preserving the confidentiality of the user's preferences, which should not be freely available to others on the network.

Researchers in the field of published article information retrieval have devoted considerable effort to finding efficient and accurate methods of allowing users to select articles of interest from a large set of articles. The most widely used methods of information retrieval are based on keyword matching: the user specifies a set of keywords which the user thinks are exclusively found in the desired articles and the information retrieval computer retrieves all articles which contain those keywords. Such methods are fast, but are notoriously unreliable, as users may not think of the right keywords, or the keywords may be used in unwanted articles in an irrelevant or unexpected context. As a result, the information retrieval computers retrieve many articles which are unwanted by the user. The logical combination of keywords and the use of wild-card search parameters help improve the accuracy of keyword searching but do not completely solve the problem of inaccurate search results. Starting in the 1960's, an alternate approach to information retrieval was developed: users were presented with an article and asked if it contained the information they wanted, or to quantify how close the information contained in the article was to what they wanted. Each article was described by a profile which comprised either a list of the words in the article or, in more advanced systems, a table of word frequencies in the article. Since a measure of similarity between articles is the distance between their profiles, the measured similarity of article profiles can be used in article retrieval. For example, a user searching for information on a subject can write a short description of the desired information. The information retrieval computer generates an article profile for the request and then retrieves articles with profiles similar to the profile generated for the request. These requests can then be refined using "relevance feedback", where the user actively or passively rates the articles retrieved as to how close the information contained therein is to what is desired. The information retrieval computer then uses this relevance feedback information to refine the request profile and the process is repeated until the user either finds enough articles or tires of the search.

A number of researchers have looked at methods for selecting articles of most interest to users. An article titled "Social Information filtering: algorithms for automating 'word of mouth'" was published at the CHi-95 Proceedings by Patti Maes et al and describes the Ringo information retrieval system which recommends musical selections. The Ringo system requires active feedback from the users—users must manually specify how much they like or dislike each musical selection. The Ringo system maintains a complete list of users ratings of music selections and makes recommendations by finding which selections were liked by multiple people. However, the Ringo system does not take advantage of any available descriptions of the music, such as structured descriptions in a data base, or free text, such as that contained in music reviews. An article titled "Evolving agents for personalized information filtering", published at the Proc. 9th IEEE Conf. on AI for Applications by Sheth and Maes, described the use of agents for information filtering which use genetic algorithms to learn to categorize Usenet news articles. In this system, users must define news categories and the users actively indicate their opinion of the selected articles. Their system uses a list of keywords to represent sets of articles and the records of users' interests are updated using genetic algorithms.

A number of other research groups have looked at the automatic generation and labeling of clusters of articles for the purpose of browsing through the articles. A group at Xerox Parc published a paper titled "Scatter/gather: a cluster-based approach to browsing large article collections" at the 15 Ann. Int'l SIGIR '92, ACM 318–329 (Cutting et al. 1992). This group developed a method they call "scatter/gather" for performing information retrieval searches. In this method, a collection of articles is "scattered" into a small number of clusters, the user then chooses one or more of these clusters based on short summaries of the cluster. The selected clusters are then "gathered" into a subcollection, and then the process is repeated. Each iteration of this process is expected to produce a small, more focused collection. The cluster "summaries" are generated by picking those words which appear most frequently in the cluster and the titles of those articles closest to the center of the cluster. However, no feedback from users is collected or stored, so no performance improvement occurs over time.

Apple's Advanced Technology Group has developed an interface based on the concept of a "pile of articles". This interface is described in an article titled "A 'pile' metaphor for supporting casual organization of information in Human factors in computer systems" published in CHI '92 Conf. Proc. 627–634 by Mander, R. G. Salomon and Y. Wong. 1992. Another article titled "Content awareness in a file system interface: implementing the 'pile' metaphor for organizing information" was published in 16 Ann. Int'l SIGIR '93, ACM 260–269 by Rose E. D. et al. The Apple interface uses word frequencies to automatically file articles by picking the pile most similar to the article being filed. This system functions to cluster articles into subpiles, determine key words for indexing by picking the words with the largest TF/IDF (where TF is term (word) frequency and IDF is the inverse document frequency) and label piles by using the determined key words.

Numerous patents address information retrieval methods, but none develop records of a user's interest based on passive monitoring of which articles the user accesses. None of the systems described in these patents pre sent computer architectures to allow fast retrieval of articles distributed across many computers. None of the systems described in these patents address issues of using such article retrieval and matching methods for purposes of commerce or of matching users with common interests or developing records of users' interests. U.S. Pat. No. 5,321,833 issued to Chang et al. teaches a method in which users choose terms to use in an information retrieval query, and specify the relative weightings of the different terms. The Chang system then calculates multiple levels of weighting criteria. U.S. Pat. No. 5,301,109 issued to Landauer et al. teaches a method for retrieving articles in a multiplicity of languages by constructing "latent vectors" (SVD or PCA vectors) which represent correlations between the different words. U.S. Pat. No. 5,331,554 issued to Graham et al. discloses a method for retrieving segments of a manual by comparing a query with nodes in a decision tree. U.S. Pat. No. 5,331,556 addresses techniques for deriving morphological part-of-speech information and thus to make use of the similarities of different forms of the same word (e.g. "article" and "articles").

Therefore, there presently is no information retrieval and delivery system operable in an electronic media environment that enables a user to access information of relevance and interest to the user without requiring the user to expend an excessive amount of time and energy.

SOLUTION

The above-described problems are solved and a technical advance achieved in the field by the system for customized electronic identification of desirable objects in an electronic media environment, which system enables a user to access target objects of relevance and interest to the user without requiring the user to expend an excessive amount of time and energy. Profiles of the target objects are stored on electronic media and are accessible via a data communication network. In many applications, the target objects are informational I n nature, and so may themselves be stored on electronic media and be accessible via a data communication network.

Relevant definitions of terms for the purpose of this description include: (a.) an object available for access by the user, which may be either physical or electronic in nature, is termed a "target object", (b.) a digitally represented profile indicating that target object's attributes is termed a "target profile", (c.) the user looking for the target object is termed a "user", (d.) a profile holding that user's attributes, including age/zip code/etc. is termed a "user profile", (e.) a summary of digital profiles of target objects that a user likes and/or dislikes, is termed the "target profile interest summary" of that user, (f.) a profile consisting of a collection of attributes, such that a user likes target objects whose profiles are similar to this collection of attributes, is termed a "search profile" or in some contexts a "query" or "query profile," (g.) a specific embodiment of the target profile interest summary which comprises a set of search profiles is termed the "search profile set" of a user, (h.) a collection of target objects with similar profiles, is termed a "cluster," (i.) an aggregate profile formed by averaging the attributes of all tar get objects in a cluster, termed a "cluster profile," (j.) a real number determined by calculating the statistical variance of the profiles of all target objects in a cluster, is termed a "cluster variance," (k.) a real number determined by calculating the maximum distance between the profiles of any two target objects in a cluster, is termed a "cluster diameter."

The system for electronic identification of desirable objects of the present invention automatically constructs both a target profile for each target object in the electronic media based, for example, on the frequency with which each word appears in an article relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects available on the electronic media.

Because people have multiple interests, a target profile interest summary for a single user must represent multiple areas of interest, for example, by consisting of a set of individual search profiles, each of which identifies one of the user's areas of interest. Each user is presented with those target objects whose profiles most closely match the user's interests as described by the user's target profile interest summary. Users' target profile interest summaries are automatically updated on a continuing basis to reflect each user's changing interests. In addition, target objects can be grouped into clusters based on their similarity to each other, for example, based on similarity of their topics in the case where the target objects are published articles, and menus automatically generated for each cluster of target objects to allow users to navigate throughout the clusters and manually locate target objects of interest. For reasons of confidentiality and privacy, a particular user may not wish to make public all of the interests recorded in the user's target profile interest summary, particularly when these interests are determined by the user's purchasing patterns. The user may desire that all or part of the target profile interest summary be kept confidential, such as information relating to the user's political, religious, financial or purchasing behavior; indeed, confidentiality with respect to purchasing behavior is the user's legal right in many states. It is therefore necessary that data in a user's target profile interest summary be protected from unwanted disclosure except with the user's agreement. At the same time, the user's target profile interest summaries must be accessible to the relevant servers that perform the matching of target objects to the users, if the benefit of this matching is desired by both providers and consumers of the target objects. The disclosed system provides a solution to the privacy problem by using a proxy server which acts as an intermediary between the information provider and the user. The proxy server dissociates the user's true identity from the pseudonym by the use of cryptographic techniques. The proxy server also permits users to control access to their target profile interest summaries and/or user profiles, including provision of this information to marketers and advertisers if they so desire, possibly in exchange for cash or other considerations. Marketers may purchase these profiles in order to target advertisements to particular users, or they may purchase partial user profiles, which do not include enough information to identify the individual users in question, in order to carry out standard kinds of demographic analysis and market research on the resulting database of partial user profiles.

In the preferred embodiment of the invention, the system for customized electronic identification of desirable objects uses a fundamental methodology for accurately and efficiently matching users and target objects by automatically calculating, using and updating profile information that describes both the users' interests and the target objects' characteristics. The target objects may be published articles, purchasable items, or even other people, and their properties are stored, and/or represented and /or denoted on the electronic media as (digital) data. Examples of target objects can include, but are not limited to: a newspaper story of potential interest, a movie to watch, an item to buy, e-mail to receive, or another person to correspond with. In all these cases, the information delivery process in the preferred embodiment is based on determining the similarity between a profile for the target object and the profiles of target objects for which the user (or a similar user) has provided positive feedback in the past. The individual data that describe a target object and constitute the target object's profile are herein termed "attributes" of the target object. Attributes may include, but are not limited to, the following: (1) long pieces of text ( a newspaper story, a movie review, a product description or an advertisement), (2) short pieces of text (name of a movie's director, name of town from which an advertisement was placed, name of the language in which an article was written), (3) numeric measurements (price of a product, rating given to a movie, reading level of a book), (4) associations with other types of objects (list of actors in a movie, list of persons who have read a document). Any of these attributes, but especially the numeric ones, may correlate with the quality of the target object, such as measures of its popularity (how often it is accessed) or of user satisfaction (number of complaints received).

The preferred embodiment of the system for customized electronic identification of desirable objects operates in an electronic media environment for accessing these target objects, which may be news, electronic mail, other published documents, or product descriptions. The system in its broadest construction comprises three conceptual modules, which may be separate entities distributed across many implementing systems, or combined into a lesser subset of physical entities. The specific embodiment of this system disclosed herein illustrates the use of a first module which automatically constructs a "target profile" for each target object in the electronic media based on various descriptive attributes of the target object. A second module uses interest feedback from users to construct a "target profile interest summary" for each user, for example in the form of a "search profile set" consisting of a plurality of search profiles, each of which corresponds to a single topic of high interest for the user. The system further includes a profile processing module which estimates each user's interest in various target objects by reference to the users' target profile interest summaries, for example by comparing the target profiles of these target objects against the search profiles in users' search profile sets, and generates for each user a customized rank-ordered listing of target objects most likely to be of interest to that user. Each user's target profile interest summary is automatically updated on a continuing basis to reflect the user's changing interests.

Target objects may be of various sorts, and it is sometimes advantageous to use a single system that delivers and/or clusters target objects of several distinct sorts at once, in a unified framework. For example, users who exhibit a strong interest in certain novels may also show an interest in certain movies, presumably of a similar nature. A system in which some target objects are novels and other target objects are movies can discover such a correlation and exploit it in order to group particular novels with particular movies, e.g., for clustering purposes, or to recommend the movies to a user who has demonstrated interest in the novels. Similarly, if users who exhibit an interest in certain World Wide Web sites also exhibit an interest in certain products, the system can match the products with the sites and thereby recommend to the marketers of those products that they place advertisements at those sites, e.g., in the form of hypertext links to their own sites.

The ability to measure the similarity of profiles describing target objects and a user's interests can be applied in two basic ways: filtering and browsing. Filtering is useful when large numbers of target objects are described in the electronic media s pace. These target objects can for example be articles that are received or potentially received by a user, who only has time to read a small fraction of them. For example, one might potentially receive all items on the AP news wire service, all items posted to a number of news groups, all advertisements in a set of newspapers, or all unsolicited electronic mail, but few people have the time or inclination to read so many articles. A filtering system in the system for customized electronic identification of desirable objects automatically selects a set of articles that the user is likely to wish to read. The accuracy of this filtering system improves over time by noting which articles the user reads and by generating a measurement of the depth to which the user reads each article. This information is then us ed to update the user's target profile interest summary. Browsing provides an alternate method of selecting a small subset of a large number of target objects, such as articles. Articles are organized so that users can actively navigate among groups of articles by moving from one group to a larger, more general group, to a smaller, more specific group, or to a closely related group. Each individual article forms a one-member group of its own, so that the user can navigate to and from individual article s as well as larger groups. The methods used by the system for customized electronic identification of desirable objects allow articles to be grouped into clusters and the clusters to be grouped and merged into larger and larger clusters. These hierarchies of clusters then form the basis for menuing and navigational systems to allow the rapid searching of large numbers of articles. This same clustering technique is applicable to any type of target objects that can be profiled on the electronic media.

There are a number of variations on the theme of developing and using profiles for article retrieval, with the basic implementation of an on-line news clipping service representing the preferred embodiment of the invention. Variations of this basic system are disclosed and comprise a system to filter electronic mail, an extension for retrieval of target objects such as purchasable items which may have more complex descriptions, a system to automatically build and alter menuing systems for browsing and searching through large numbers of target objects, and a system to construct virtual communities of people with common interests. These intelligent filters and browsers are necessary to provide a truly passive, intelligent system interface. A user interface that permits intuitive browsing and filtering represents for the first time an intelligent system for determining the affinities between users and target objects. The detailed, comprehensive target profiles and user-specific target profile interest summaries enable the system to provide responsive routing of specific queries for user information access. The information maps so produced and the application of users' target profile interest summaries to predict the information consumption patterns of a user allows for pre-caching of data at locations on the data communication network and at times that minimize the traffic flow in the communication network to thereby efficiently provide the desired information to the user and/or conserve valuable storage space by only storing those target objects (or segments thereof) which are relevant to the user's interests.

DETAILED DESCRIPTION

Measuring Similarity

Figure 1:
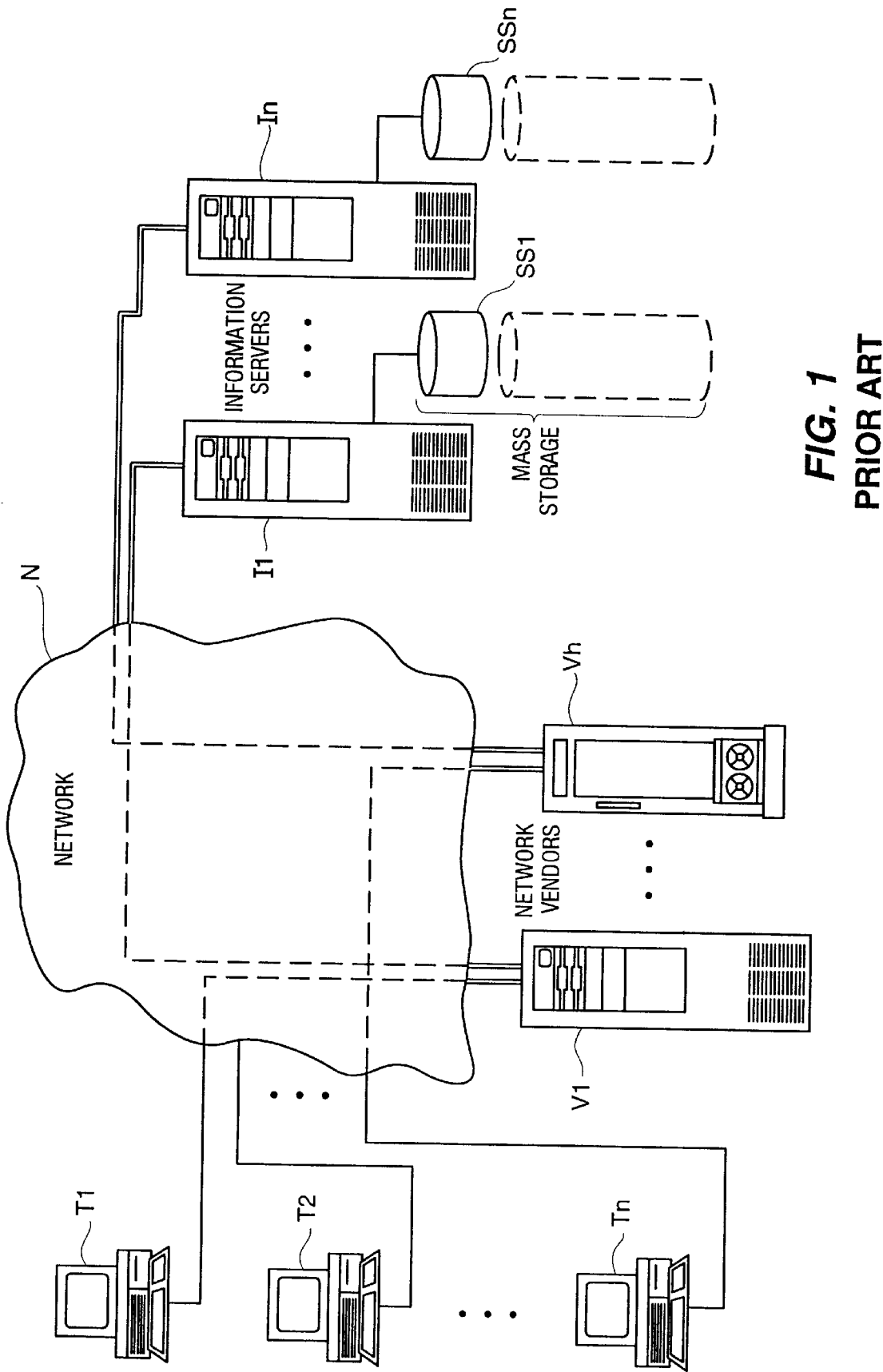
FIG. 1 illustrates in block diagram form a typical architecture of an electronic media system in which the system for customized electronic identification of desirable objects of the present invention can be implemented as part of a user server system.

This section describes a general procedure for automatically measuring the similarity between two target objects, or, more precisely, between target profiles that are automatically generated for each of the two target objects. This similarity determination process is applicable to target objects in a wide variety of contexts. Target objects being compared can be, as an example but not limited to: textual documents, human beings, movies, or mutual funds. It is assumed that the target profiles which describe the target objects are stored at one or more locations in a data communication network on data storage media associated with a computer system. The computed similarity measurements serve as input to additional processes, which function to enable human users to locate desired target objects using a large computer system. These additional processes estimate a human user's interest in various target objects, or else cluster a plurality of target objects in to logically coherent groups. The methods used by these additional processes might in principle be implemented on either a single computer or on a computer network. Jointly or separately, they form the underpinning for various sorts of database systems and information retrieval systems.

Target Objects and Attributes

In classical Information Retrieval (IR) technology, the user is a literate human and the target objects in question are textual documents stored on data storage devices interconnected to the user via a computer network. That is, the target objects consist entirely of text, and so are digitally stored on the data storage devices within the computer network. However, there are other target object domains that present related retrieval problems that are not capable of being solved by present information retrieval technology:

(a.) the user is a film buff and the target objects are movies available on videotape.

(b.) the user is a consumer and the target objects are used cars being sold.

(c.) the user is a consumer and the target objects are products being sold through promotional deals.

(d.) the user is an investor and the target objects are publicly traded stocks, mutual funds and/or real estate properties.

(e.) the user is a student and the target objects are classes being offered.

(f.) the user is an activist and the target objects are Congressional bills of potential concern.

(g.) the user is a direct-mail marketer and the target objects are potential customers.

(h.) the user is a net-surfer and the target objects are pages, servers, or newsgroups available on the World Wide Web.

(i.) the user is a philanthropist and the target objects are charities.

(j.) the user is ill and the target objects are medical specialists.

(k.) the user is an employee and the target objects are potential employers.

(l.) the user is an employer and the target objects are potential employees.

(m.) the user is an beleaguered executive and the target objects are electronic mail messages addressed to the user.

(n.) the user is a lonely heart and the target objects are potential conversation partners.

(o.) the user is in search of an expert and the target objects are users, with known retrieval habits, of an document retrieval system.

(p.) the user is a social worker and the target objects are families that may need extra visits.

(q.) the user is an oncologist and the target objects are women for whom mammograms may be advisable.

(r.) the user is an auto insurance company and the target objects are potential customers In all these cases, the user wishes to locate some small subset of the target objects—such as the target objects that the user most desires to rent, buy, investigate, meet, read, give mammograms to, insure, and so forth. The task is to help the user identify the most interesting target objects, where the user's interest in a target object is defined to be a numerical measurement of the users relative desire to locate that object rather than others.

The generality of this problem motivates a general approach to solving the information retrieval problems noted above. It is assumed that many target objects are known to the system for customized electronic identification of desirable objects, and that specifically, the system stores (or has the ability to reconstruct) several pieces of information about each target object. These pieces of information are termed "attributes": collectively, they are said to form a profile of the target object, or a "target profile." For example, where the system for customized electronic identification of desirable objects is activated to identify movies of interest, the system is likely be concerned with the values of attributes such as these:

(a.) title of movie, (b.) name of director, (c.) Motion Picture Association of America (MPAA) child-appropriateness rating (0=G, 1=PG, . . . ), (d.) date of release, (e.) number of stars granted by a particular critic, (f.) number of stars granted by a second critic, (g.) number of stars granted by a third critic, (h.). full text of review by the third critic, (i.). list of customers who have previously rented this movie, (j.) list of actors.

Each movie has a different set of values for these attributes. This example conveniently illustrates three kinds of attributes. Attributes c–g are numeric attributes, of the sort that might be found in a database record. It is evident that they can be used to help the user identify target objects (movies) of interest. For example, the user might previously have rented many Parental Guidance (PG) films, and many films made in the 1970's. This generalization is useful: new films with values for one or both attributes that are numerically similar to these (such as MPAA rating of 1, release date of 1975) are judged similar to the films the user already likes, and therefore of probable interest. Attributes a–b and h are textual attributes. They too are important for helping the user locate desired films. For example, perhaps the user has shown a past interest in films whose review text (attribute h) contains words like "chase," "explosion," "explosions," "hero," "gripping, " and "superb." This generalization is again useful in identifying new films of interest. Attribute i is an associative attribute. It records associations between the target objects in this domain, namely movies, and ancillary target objects of an entirely different sort, namely humans. A good indication that the user wants to rent a particular movie is that the user has previously rented other movies with similar attribute values, and this holds for attribute I just as it does for attributes a–h. For example, if the user has often liked movies that customer $C_{17}$ and customer $C_{190}$ have rented, then the user may like other such movies, which have similar values for attribute i. Attribute j is another example of an associative attribute, recording associations between target objects and actors. Notice that any of these attributes can be made subject to authentication when the profile is constructed, through the use of digital signatures; for example, the target object could be accompanied by a digitally signed note from the MPAA, which note names the target object and specifies its authentic value for attribute c.

These three kinds of attributes are common: numeric, textual, and associative. In the classical information retrieval problem, where the target objects are documents (or more generally, coherent document sections extracted by a text segmentation method), the system might only consider a single, textual attribute when measuring similarity: the full text of the target object. However, a more sophisticated system would consider a longer target profile, including numeric and associative attributes:

(a.) full text of document (textual), (b.) title (textual), (c.) author (textual), (d.) language in which document is written (textual), (e.) date of creation (numeric), (f.) date of last update (numeric), (g.) length in words (numeric), (h.) reading level (numeric), (i.) quality of document as rated by a third\_party editorial agency (numeric), (j.) list of other readers who have retrieved this document (associative).

As another domain example, consider a domain where the user is an advertiser and the target objects are potential customers. The system might store the following attributes for each target object (potential customer):

(a.) first two digits of zip code (textual), (b.) first three digits of zip code (textual), (c.) entire five-digit zip code (textual), (d.) distance of residence from advertiser's nearest physical storefront (numeric), (e.) annual family income (numeric), (f.) number of children (numeric), (g.) list of previous items purchased by this potential customer (associative), list of filenames stored on this potential customer's client computer (associative), list of movies rented by this potential customer (associative), list of investments in this potential customer's investment portfolio (associative), list of documents retrieved by this potential customer (associative), written response to Rorschach inkblot test (textual), multiple-choice responses by this customer to 20 self-image questions (20 textual attributes).

As always, the notion is that similar consumers buy similar products. It should be noted that diverse sorts of information are being used here to characterize consumers, from their consumption patterns to their literary tastes and psychological peculiarities, and that this fact illustrates both the flexibility and power of the system for customized electronic identification of desirable objects of the present invention. Diverse sorts of information can be used as attributes in other domains as well (as when physical, economic, psychological and interest-related questions are used to profile the applicants to a dating service, which is indeed a possible domain for the present system), and the advertiser domain is simply an example.

As a final domain example, consider a domain where the user is an stock market investor and the target objects are publicly traded corporations. A great many attributes might be used to characterize each corporation, including but not limited to the following:

(a.) type of business (textual), (b.) corporate mission statement (textual), (c.) number of employees during each of the last 10 years (ten separate numeric attributes), (d.) percentage growth in number of employees during each of the last 10 years, (e.) dividend payment issued in each of the last 40 quarters, as a percentage of current share price, (f.) percentage appreciation of stock value during each of the last 40 quarters, list of shareholders (associative), (g.) composite text of recent articles about the corporation in the financial press (textual).

It is worth noting some additional attributes that are of interest in some domains. In the case of documents and certain other domains, it is useful to know the source of each target object (for example, refereed journal article vs. UPI newswire article vs. Usenet newsgroup posting vs. question-answer pair from a question-and-answer list vs. tabloid newspaper article vs. . . . ); the source may be represented as a single-term textual attribute. Important associative attributes for a hypertext document are the list of documents that it links to, and the list of documents that link to it. Documents with similar citations are similar with respect to the former attribute, and documents that are cited in the same places are similar with respect to the latter. A convention may optionally be adopted that any document also links to itself. Especially in systems where users can choose whether or not to retrieve a target object, a target object's popularity (or circulation) can be usefully measured as a numeric attribute specifying the number of users who have retrieved that object. Related measurable numeric attributes that also indicate a kind of popularity include the number of replies to a target object, in the domain where target objects are messages posted to an electronic community such as an computer bulletin board or newsgroup, and the number of links leading to a target object, in the domain where target objects are interlinked hypertext documents on the World Wide Web or a similar system. A target object may also receive explicit numeric evaluations (another kind of numeric attribute) from various groups, such as the Motion Picture Association of America (MPAA), as above, which rates movies' appropriateness for children, or the American Medical Association, which might rate the accuracy and novelty of medical research papers, or a random survey sample of users (chosen from all users or a selected set of experts), who could be asked to rate nearly anything. Certain other types of evaluation, which also yield numeric attributes, may be carried out mechanically. For example, the difficulty of reading a text can be assessed by standard procedures that count word and sentence lengths, while the vulgarity of a text could be defined as (say) the number of vulgar words it contains, and the expertise of a text could be crudely assessed by counting the number of similar texts its author had previously retrieved and read using the invention, perhaps confining this count to texts that have high approval ratings from critics. Finally, it is possible to synthesize certain textual attributes mechanically, for example to reconstruct the script of a movie by applying speech recognition techniques to its soundtrack or by applying optical character recognition techniques to its closed-caption subtitles.

Decomposing Complex Attributes

Although textual and associative attributes are large and complex pieces of data, for information retrieval purposes they can be decomposed into smaller, simpler numeric attributes. This means that any set of attributes can be replaced by a (usually larger) set of numeric attributes, and hence that any profile can be represented as a vector of numbers denoting the values of these numeric attributes. In particular, a textual attribute, such as the full text of a movie review, can be replaced by a collection of numeric attributes that represent scores to denote the presence and significance of the words "aardvark," "aback," "abacus," and so on through "zymurgy" in that text. The score of a word in a text may be defined in numerous ways. The simplest definition is that the score is the rate of the word in the text, which is computed by computing the number of times the word occurs in the text, an d dividing this number by the total number of words in the text. This sort of score is often called the "term frequency" (TF) of the word. The definition of term frequency may optionally be modified to weight different portions of the text unequally: for example, any occurrence of a word in the text's title might be counted as a 3-fold or more generally k-fold occurrence (as if the title had been repeated k times within the text), in order to reflect a heuristic assumption that the words in the title are particularly important indicators of the text's content or topic.

However, for lengthy textual attributes, such as the text of an entire document, the score of a word is typically defined to be not merely its term frequency, but its term frequency multiplied by the negated logarithm of the word's "global frequency," as measured with respect to the textual attribute in question. The global frequency of a word, which effectively measures the word's uninformativeness, is a fraction between 0 and 1, defined to be the fraction of all target objects for which the textual attribute in question contains this word. This adjusted score is often known in the art as TF/IDF ("term frequency times inverse document frequency"). When global frequency of a word is taken into account in this way, the common, uninformative words have scores comparatively close to zero, no matter how often or rarely they appear in the text. Thus, their rate has little influence on the object's target profile. Alternative methods of calculating word scores include latent semantic indexing or probabilistic models.

Instead of breaking the text into its component words, one could alternatively break the text into overlapping word bigrams (sequences of 2 adjacent words), or more generally, word n-grams. These word n-grams may be scored in the same way as individual words. Another possibility is to use character n-grams. For example, this sentence contains a sequence of overlapping character 5-grams which starts "for e", "or ex", "r exa", "exam", "examp", etc. The sentence may be characterized, imprecisely but usefully, by the score of each possible character 5-gram ("aaaaa", "aaaab", . . . "zzzzz") in the sentence. Conceptually speaking, in the character 5-gram case, the textual attribute would be decomposed into at least $26^5=11,881,376$ numeric attributes. Of course, for a given target object, most of these numeric attributes have values of 0, since most 5-grams do not appear in the target object attributes. These zero values need not be stored anywhere. For purposes of digital storage, the value of a textual attribute could be characterized by storing the set of character 5-grams that actually do appear in the text, together with the nonzero score of each one. Any 5-gram that is not included in the set can be assumed to have a score of zero. The decomposition of textual attributes is not limited to attributes whose values are expected to be long texts. A simple, one-term textual attribute can be replaced by a collection of numeric attributes in exactly the same way. Consider again the case where the target objects are movies. The "name of director" attribute, which is textual, can be replaced by numeric attributes giving the scores for "Federico-Fellini," "Woody-Allen," "Terence-Davies," and so forth, in that attribute. For these one-term textual attributes, the score of a word is usually defined to be its rate in the text, without any consideration of global frequency. Note that under these conditions, one of the scores is 1, while the other scores are 0 and need not be stored. For example, if Davies did direct the film, then it is "Terence-Davies" whose score is 1, since "Terence-Davies" constitutes 100% of the words in the textual value of the "name of director" attribute. It might seem that nothing has been gained over simply regarding the textual attribute as having the string value "Terence-Davies." However, the trick of decomposing every non-numeric attribute into a collection of numeric attributes proves useful for the clustering and decision tree methods described later, which require the attribute values of different objects to be averaged and/or ordinally ranked. Only numeric attributes can be averaged or ranked in this way.

Just as a textual attribute may be decomposed into a number of component terms (letter or word n-grams), an associative attribute may be decomposed into a number of component associations. For instance, in a domain where the target objects are movies, a typical associative attribute used in profiling a movie would be a list of customers who have rented that movie. This list can be replaced by a collection of numeric attributes, which give the "association scores" between the movie and each of the customers known to the system. For example, the 165th such numeric attribute would be the association score between the movie and customer #165, where the association score is defined to be 1 if customer #165 has previously rented the movie, and 0 otherwise. In a subtler refinement, this association score could be defined to be the degree of interest, possibly zero, that customer #165 exhibited in the movie, as determined by relevance feedback (as described below). As another example, in a domain where target objects are companies, an associative attribute indicating the major shareholders of the company would be decomposed into a collection of association scores, each of which would indicate the percentage of the company (possibly zero) owned by some particular individual or corporate body. Just as with the term scores used in decomposing lengthy textual attributes, each association score may optionally be adjusted by a multiplicative factor: for example, the association score between a movie and customer #165 might be multiplied by the negated logarithm of the "global frequency" of customer #165, i.e., the fraction of all movies that have been rented by customer #165. Just as with the term scores used in decomposing textual attributes, most association scores found when decomposing a particular value of an associative attribute are zero, and a similar economy of storage may be gained in exactly the same manner by storing a list of only those ancillary objects with which the target object has a nonzero association score, together with their respective association scores.

Similarity Measures

What does it mean for two target objects to be similar? More precisely, how should one measure the degree of similarity? Many approaches are possible and any reasonable metric that can be computed over the set of target object profiles can be used, where target objects are considered to be similar if the distance between their profiles is small according to this metric. Thus, the following preferred embodiment of a target object similarity measurement system has many variations.

First, define the distance between two values of a given attribute according to whether the attribute is a numeric, associative, or textual attribute. If the attribute is numeric, then the distance between two values of the attribute is the absolute value of the difference between the two values. (Other definitions are also possible: for example, the distance between prices p1 and p2 might be defined by $|(p1-p2)|/(max(p1,p2)+1)$, to recognize that when it comes to customer interest, $5000 and $5020 are very similar, whereas $3 and $23 are not.) If the attribute is associative, then its value V may be decomposed as described above into a collection of real numbers, representing the association scores between the target object in question and various ancillary objects. V may therefore be regarded as a vector with components $V_1$, $V_2$, $V_3$, etc., representing the association scores between the object and ancillary objects 1, 2, 3, etc., respectively. The distance between two vector values V and U of an associative attribute is then computed using the angle distance measure, arccos $(VU^t/\sqrt{(Vv^t)(UU^t)})$. (Note that the three inner products in this expression have the form $XY^t = X_1 Y_1 + X_2 Y_2 + X_3 Y_3 + \ldots$, and that for efficient computation, terms of the form $X_i Y_i$ may be omitted from this sum if either of the scores $X_i$ and $Y_i$ is zero.) Finally, if the attribute is textual, then its value V may be decomposed as described above into a collection of real numbers, representing the scores of various word n-grams or character n-grams in the text. Then the value V may again be regarded as a vector, and the distance between two values is again defined via the angle distance measure. Other similarity metrics between two vectors, such as the dice measure, may be used instead. It happens that the obvious alternative metric, Euclidean distance, does not work well: even similar texts tend not to overlap substantially in the content words they use, so that texts encountered in practice are all substantially orthogonal to each other, assuming that TF/IDF scores are used to reduce the influence of non-content words. The scores of two words in a textual attribute vector may be correlated; for example, "Kennedy" and "JFK" tend to appear in the same documents. Thus it may be advisable to alter the text somewhat before computing the scores of terms in the text, by using a synonym dictionary that groups together similar words. The effect of this optional pre-alteration is that two texts using related words are measured to be as similar as if they had actually used the same words. One technique is to augment the set of words actually found in the article with a set of synonyms or other words which tend to co-occur with the words in the article, so that "Kennedy" could be added to every article that mentions "JFK." Alternatively, words found in the article may be wholly replaced by synonyms, so that "JFK" might be replaced by "Kennedy" or by "John F. Kennedy" wherever it appears. In either case, the result is that documents about Kennedy and documents about JFK are adjudged similar. The synonym dictionary may be sensitive to the topic of the document as a whole; for example, it may recognize that "crane" is likely to have a different synonym in a document that mentions birds than in a document that mentions construction. A related technique is to replace each word by its morphological stem, so that "staple", "stapler", and "staples" are all replaced by "staple." Common function words ("a", "and", "the" . . . ) c an influence the calculated similarity of texts without regard to their topics, and so are typically removed from the text before the scores of terms in the text are computed. A more general approach to recognizing synonyms is to use a revised measure of the distance between textual attribute vectors V and U, namely arccos $(AV(AU)^t/\sqrt{(AV(AV)^t \, AU(AU)^t)})$, where the matrix A is the dimensionality-reducing linear transformation (or an approximation thereto) determined by collecting the vector values of the textual attribute, for all target objects known to the system, and applying singular value decomposition to the resulting collection. The same approach can be applied to the vector values of associative attributes. The above definitions allow us to determine how close together two target objects are with respect to a single attribute, whether numeric, associative, or textual. The distance between two target objects X and Y with respect to their entire multi-attribute profiles $P_x$ and $P_y$ is then denoted d(XY) or $d(P_x, P_y)$ and defined as:

$$(((\text{distance with respect to attribute a})(\text{weight of attribute a}))^k + \\ ((\text{distance with respect to attribute b})(\text{weight of attribute b}))^k + \\ ((\text{distance with respect to attribute c})(\text{weight of attribute c}))^k + \\ \ldots)^k$$

where k is a fixed positive real number, typically 2, and the weights are non- negative real numbers indicating the relative importance of the various attributes. For example, if the target objects are consumer goods, and the weight of the "color" attribute is comparatively very small, then price is not a consideration in determining similarity: a user who likes a brown massage cushion is predicted to show equal interest in the same cushion manufactured in blue, and vice-versa. On the other hand, if the weight of the "color" attribute is comparatively very high, then users are predicted to show interest primarily in products whose colors they have liked in the past: a brown massage cushion and a blue massage cushion are not at all the same kind of target object, however similar in other attributes, and a good experience with one does not by itself inspire much interest in the other. Target objects may be of various sorts, and it is sometimes advantageous to use a single system that is able to compare tar get objects of distinct sorts. For example, in a system where some target objects are novels while other target objects are movies, it is desirable to judge a novel and a movie similar if their profiles show that similar users like them (an associative attribute). However, it is important to note that certain attributes specified in the movie's target profile are undefined in the novel's target profile, and vice versa: a novel has no "cast list" associative attribute and a movie has no "reading level" numeric attribute. In general, a system in which target objects fall into distinct sorts may sometimes have to measure the similarity of two target objects for which somewhat different sets of attributes are defined. This requires an extension to the distance metric d(*,*) defined above. In certain applications, it is sufficient when carrying out such a comparison simply to disregard attributes that are not defined for both target objects: this allows a cluster of novels to be matched with the most similar cluster of movies, for example, by considering only those attributes that novels and movies have in common. However, while this method allows comparisons between (say) novels and movies, it does not define a proper metric over the combined space of novel s and movies and therefore does not allow clustering to be applied to the set of all target objects. When necessary for clustering or other purposes, a metric that allows comparison of any two target objects (whether of the same or different sorts) can b e defined as follows. If a is an attribute, then let Max(a) be an upper bound on the distance between two values of attribute a; notice that if attribute a is an associative or textual attribute, this distance is an angle determined by arccos, so that Max(a) may be chosen to be 180 degrees, while if attribute a is a numeric attribute, a sufficiently large number must be selected by the system designers. The distance between two values of attribute a is given as before in the case where both values are defined; the distance between two undefined values is taken to be zero; finally, the distance between a defined value and an undefined value is always taken to be Max(a)/2. This allows us to determine how close together two target objects are with respect to an attribute a, even if attribute a does not have a defined value for both target objects. The distance d(*,*) between two target objects with respect to their entire multi-attribute profiles is then given in terms of these individual attribute distances exactly as before. It is assumed that one attribute in such a system specifies the sort of target object ("movie", "novel", etc.), and that this attribute may be highly weighted if target objects of different sorts are considered to be very different despite any attributes they may have in common.

UTILIZING THE SIMILARITY MEASUREMENT

Matching Buyers and Sellers

A simple application of the similarity measurement is a system to match buyers with sellers in small-volume markets, such as used cars and other used goods, artwork, or employment. Sellers submit profiles of the goods (target objects) they want to sell, and buyers submit profiles of the goods (target objects) they want to buy. Participants may submit or withdraw these profiles at any time. The system for customized electronic identification of desirable objects computes the similarities between seller-submitted profiles and buyer-submitted profiles, and when two profiles match closely (i.e., the similarity is above a threshold), the corresponding seller and buyer are notified of each other's identities. To prevent users from being flooded with responses, it may be desirable to limit the number of notifications each user receives to a fixed number, such as ten per day.

Filtering: Relevance Feedback

A filtering system is a device that can search through many target objects and estimate a given user's interest in each target object, so as to identify those that are of greatest interest to the user. The filtering system uses relevance feed back to refine its knowledge of the user's interests: whenever the filtering system identifies a target object as potentially interesting to a user, the user (if an on-line user) provides feedback as to whether or not that target object really is of interest. Such feedback is stored long-term in summarized form, as part of a database of user feedback information, and may be provided either actively or passively. In active feedback, the user explicitly indicates his or her interest, for instance, on a scale of −2 (active distaste) through 0 (no special interest) to 10 (great interest). In passive feedback, the system infers the user's interest from the user's behavior. For example, if target objects are textual documents, the system might monitor which documents the user chooses to read, or not to read, and how much time the user spends reading them. A typical formula for assessing interest in a document via passive feedback, in this domain, on a scale of 0 to 10, might be:

+2 if the second page is viewed,

+2 if all pages are viewed,

+2 if more than 30 seconds was spent viewing the document,

+2 if more than one minute was spent viewing the document,

+2 if the minutes spent viewing the document are greater than half the number of pages.

If the target objects are electronic mail messages, interest points might also be added in the case of a particularly lengthy or particularly prompt reply. If the target objects are purchasable goods, interest points might be added for target objects that the user actually purchases, with further points in the case of a large-quantity or high-price purchase. In any domain, further points might be added for target objects that the user accesses early in a session, on the grounds that users access the object s that most interest them first. Other potential sources of passive feedback include an electronic measurement of the extent to which the user's pupils dilate while the user views the target object or a description of the target object. It is possible to combine active and passive feedback. One option is to take a weighted average of the two ratings. Another option is to use passive feedback by default, but to allow the user to examine and actively modify the passive feedback score. In the scenario above, for instance, an uninteresting article may sometimes remain on the display device for a long period while the user is engaged in unrelated business; the passive feedback score is then inappropriately high, and the user may wish to correct it before continuing. In the preferred embodiment of the invention, a visual indicator, such as a sliding bar or indicator needle on the user's screen, can be used to continuously display the passive feedback score estimated by the system for the target object being viewed, unless the user has manually adjusted the indicator by a mouse operation or other means in order to reflect a different score for this target object, after which the indicator displays the active feedback score selected by the user, and this active feedback score is used by the system instead of the passive feedback score. In a variation, the user cannot see or adjust the indicator until just after the user has finished viewing the target object. Regardless how a user's feedback is computed, it is stored long-term as part of that user's target profile interest summary.

Filtering: Determining Topical Interest Through Similarity

Relevance feedback only determines the user's interest in certain target objects: namely, the target objects that the user has actually had the opportunity to evaluate (whether actively or passively). For target objects that the user has not yet seen, the filtering system must estimate the user's interest. This estimation task is the heart of the filtering problem, and the reason that the similarity measurement is important. More concretely, the preferred embodiment of the filtering system is a news clipping service that periodically presents the user with news articles of potential interest. The user provides active and/or passive feedback to the system relating to these presented articles. However, the system does not have feedback information from the user for articles that have never been presented to the user, such as new articles that have just been added to the database, or old articles that the system chose not to present to the user. Similarly, in the dating service domain where target objects are prospective romantic partners, the system has only received feedback on old flames, not on prospective new loves.

Figure 12:
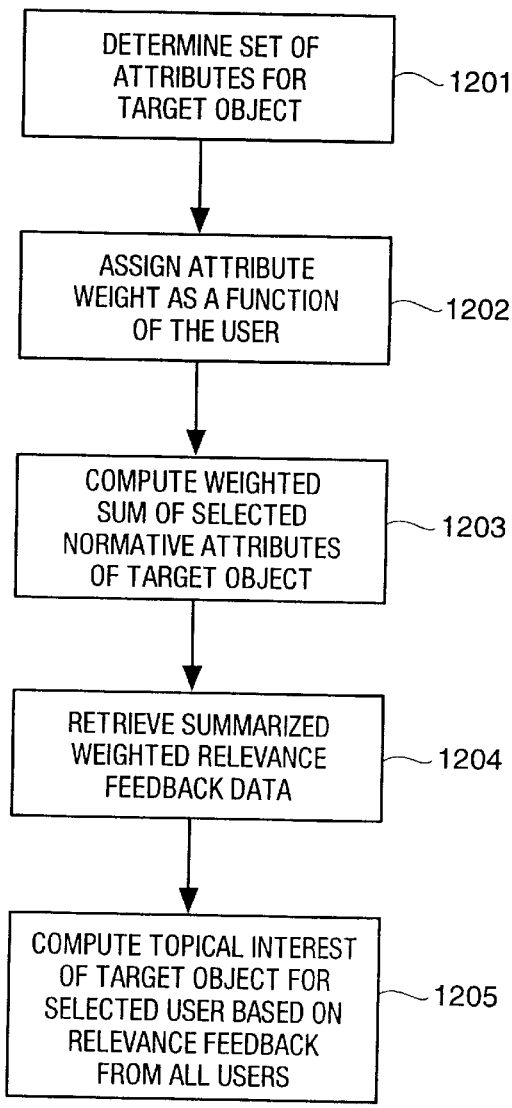
FIG. 12 illustrates in flow diagram form the process for determination of likelihood of interest by a specific user in a selected target object.

As shown in flow diagram form in FIG. 12, the evaluation of the likelihood of interest in a particular target object for a specific user can automatically be computed. The interest that a given target object X holds for a user U is assumed to be a sum of two quantities: $q(U, X)$, the intrinsic "quality" of X plus $f(U, X)$, the "topical interest" that users like U have in target objects like X. For any target object X the intrinsic quality measure $q(U, X)$ is easily estimated at steps 1201–1203 directly from numeric attributes of the target object X. The computation process begins at step 1201, where certain designated numeric attributes of target object X are specifically selected, which attributes by their very nature should be positively or negatively correlated with users' interest. Such attributes, termed "quality attributes," have the normative property that the higher (or in some cases lower) their value, the more interesting a user is expected to find them. Quality attributes of target object X may include, but are not limited to, target object X's popularity among users in general, the rating a particular reviewer has given target object X, the age (time since authorship—also known as outdatedness) of target object X, the number of vulgar words used in target object X the price of target object X, and the amount of money that the company selling target object X has donated to the user's favorite charity. At step 1202, each of the selected attributes is multiplied by a positive or negative weight indicative of the strength of user U's preference for those target objects that have high values for this attribute, which weight must be retrieved from a data file storing quality attribute weights for the selected user. At step 1203, a weighted sum of the identified weighted selected attributes is computed to determine the intrinsic quality measure q(U, X). At step 1204, the summarized weighted relevance feedback data is retrieved, wherein some relevance feedback points are weighted more heavily than others and the stored relevance data can be summarized to some degree, for example by the use of search profile sets. The more difficult part of determining user U's interest in target object X is to find or compute at step 1205 the value of f(U, X), which denotes the topical interest that users like U generally have in target objects like X. The method of determining a user's interest relies on the following heuristic: when X and Y are similar target objects (have similar attributes), and U and V are similar users (have similar attributes), then topical interest f(U, X) is predicted to have a similar value to the value of topical interest f(V, Y). This heuristic leads to an effective method because estimated values of the topical interest function f(*, *) are actually know n for certain arguments to that function: specifically, if user V has provided a relevance-feedback rating of r(V, Y) for target object Y, then insofar as that rating represents user Vs true interest in target object Y, we have r(V, Y)=q(V, Y)+f(V, Y) and can estimate f(V, Y) as r(V, Y)−q(V, Y). Thus, the problem of estimating topical interest at all points becomes a problem of interpolating among these estimates of topical interest at selected points, such as the feedback estimate of f(V, Y) as r(V, Y)−q(V, Y). This interpolation can be accomplished with any standard smoothing technique, using as input the known point estimates of the value of the topical interest function f(*, *), and determining as output a function that approximates the entire topical interest function f(*, *).

Not all point estimates of the topical interest function f(*, *) should be given equal weight as inputs to the smoothing algorithm. Since passive relevance feedback is less reliable than active relevance feedback, point estimates made from passive relevance feedback should be weighted less heavily than point estimates made from active relevance feedback, or even not used at all. In most domains, a user's interests may change over time and, therefore, estimates of topic al interest that derive from more recent feedback should also be weighted more heavily. A user's interests may vary according to mood, so estimates of topical interest that derive from the current session should be weighted more heavily for the duration of the current session, and past estimates of topical interest made at approximately the current time of day or on the current weekday should be weighted more heavily. Finally, in domains where users are trying to locate target objects of long-term interest (investments, romantic partners, pen pals, employers, employees, suppliers, service providers) from the possibly meager information provided by the target profiles, the users are usually not in a position to provide reliable immediate feedback on a target object, but can provide reliable feedback at a later date. An estimate of topical interest f(V, Y) should be weighted more heavily if user V has had more experience with target object Y. Indeed, a useful strategy is for the system to track long-term feedback for such target objects. For example, if target profile Y was created in 1990 to describe a particular investment that was available in 1990, and that was purchased in 1990 by user V, then the system solicits relevance feedback from user V in the years 1990, 1991, 1992, 1993, 1994, 1995, etc., and treats these as successively stronger indications of user V's true interest in target profile Y, and thus as indications of user V's likely interest in new investments whose current profiles resemble the original 1990 investment profile Y. In particular, if in 1994 and 1995 user V is well-disposed toward his or her 1990 purchase of the investment described by target profile Y, then in those years and later, the system tends to recommend additional investments when they have profiles like target profile Y, on the grounds that they too will turn out to be satisfactory in 4 to 5 years. It makes these recommendations both to user V and to users whose investment portfolios and other attributes are similar to user Vs. The relevance feedback provided by user V in this case may be either active (feedback=satisfaction ratings provided by the investor V) or passive (feedback=difference between average annual return of the investment and average annual return of the Dow Jones index portfolio since purchase of the investment, for example).

To effectively apply the smoothing technique, it is necessary to have a definition of the similarity distance between (U, x) and (V, Y), for any users U and V and any target objects X and Y. We have already seen how to define the distance d(X Y) between two target objects X and Y, given their attributes. We may regard a pair such as (U, X) as an extended object that bears all the attributes of target X and all the attributes of user U; then the distance between (U, X) and (V, Y) may be computed in exactly the same way. This approach requires user U, user V, and all other users to have some attributes of their own stored in the system: for example, age (numeric), social security number (textual), and list of documents previously retrieved (associative). It is these attributes that determine the notion of "similar users." Thus it is desirable to generate profiles of users (termed "user profiles") as well as profiles of target objects (termed "target profiles"). Some attributes employed for profiling users may be related to the attributes employed for profiling target objects: for example, using associative attributes, it is possible to characterize target objects such as X by the interest that various users have shown in them, and simultaneously to characterize users such as U by the interest that they have shown in various target objects. In addition, user profiles may make use of any attributes that are useful in characterizing humans, such as those suggested in the example domain above where target objects are potential consumers. Notice that user U's interest can be estimated even if user U is a new user or an off-line user who has never provided any feedback, because the relevance feedback of users whose attributes are similar to Us attributes is taken into account.

For some uses of filtering systems, when estimating topical interest, it is appropriate to make an additional "presumption of no topical interest" (or "bias toward zero"). To understand the usefulness of such a presumption, suppose the system needs to determine whether target object X is topically interesting to the user U, but that users like user U have never provided feedback on target objects even remotely like target object X. The presumption of no topical interest says that if this is so, it is because users like user U are simply not interested in such target objects and therefore do not seek them out and interact with them. On this presumption, the system should estimate topical interest f(U, X) to be low. Formally, this example has the characteristic that (U, X) is far away from all the points (V, Y) where feedback is available. In such a case, topical interest f(U, X) is presumed to be close to zero, even if the value of the topical interest function f(*, *) is high at all the faraway surrounding points at which its value is known. When a smoothing technique is used, such a presumption of no topical interest can be introduced, if appropriate, by manipulating the input to the smoothing technique. In addition to using observed values of the topical interest function f(*, *) as input, the trick is to also introduce fake observations of the form topical interest f(V, Y)=0 for a lattice of points (V, Y) distributed throughout the multidimensional space. These fake observations should be given relatively low weight as inputs to the smoothing algorithm. The more strongly they are weighted, the stronger the presumption of no interest.

The following provides another simple example of an estimation technique that has a presumption of no interest. Let g be a decreasing function from non-negative real numbers to nonnegative real numbers, such as $g(x)=e^x$ or $g(x)=\min(1, x^{-k})$ where $k>1$. Estimate topical interest $f(U, X)$ with the following g-weighted average:

$$f(U,X) = \frac{\Sigma((r(V,Y) - q(V,Y))*g(\text{distance } \iota(U,X)\Lambda(V,Y))}{\Sigma g(\text{distance } \iota(U,V)\Lambda(V,Y))}$$

Here the summations are over all pairs (V, Y) such that user V has provided feedback r(V, Y) on target object Y, i.e., all pairs (V, Y) such that relevance feedback r(V, Y) is defined. Note that both with this technique and with conventional smoothing techniques, the estimate of the topical interest f(U, X) is not necessarily equal to r(U, X)-q(U, X), even when r(U, X) is defined.

Filtering: Adjusting Weights and Residue Feedback

The method described above requires the filtering system to measure distances between (user, target object) pairs, such as the distance between (U, X) and (V, Y). Given the means described earlier for measuring the distance between two multi-attribute profiles, the method must therefore associate a weight with each attribute used in the profile of (user, target object) pairs, that is, with each attribute used to profile either users or target objects. These weights specify the relative importance of the attributes in establishing similarity or difference, and therefore, in determining how topical interest is generalized from one (user, target object) pair to another. Additional weights determine which attributes of a target object contribute to the quality function q, and by how much.

It is possible and often desirable for a filtering system to store a different set of weights for each user. For example, a user who thinks of two-star films as having materially different topic and style from four-star films wants to assign a high weight to "number of stars" for purposes of the similarity distance measure d(*, *); this means that interest in a two-star film does not necessarily signal interest in an otherwise similar four-star film, or vice-versa. If the user also agrees with the critics, and actually prefers four-star films, the user also wants to assign "number of stars" a high positive weight in the determination of the quality function q. In the same way, a user who dislikes vulgarity wants to assign the "vulgarity score" attribute a high negative weight in the determination of the quality function q, although the "vulgarity score" attribute does not necessarily have a high weight in determining the topical similarity of two films.

Attribute weights (of both sorts) may be set or adjusted by the system administrator or the individual user, on either a temporary or a permanent basis. However, it is often desirable for the filtering system to learn attribute weights automatically, based on relevance feedback. The optimal attribute weights for a user U are those that allow the most accurate prediction of user U's interests. That is, with the distance measure and quality function defined by these attribute weights, user U's interest in target object X, q(J, X)+f(U, X), can be accurately estimated by the techniques above. The effectiveness of a particular set of attribute weights for user U can therefore be gauged by seeing how well it predicts user U's known interests.

Formally, suppose that user U has previously provided feedback on target objects $X_1, X_2, X_3, \ldots$, and that the feedback ratings are r(U, X), r(U, X), r(U, $X_3$), . . . r(U, $X_i$).

Values of feedback ratings r(*,*) for other users and other target objects may also be known. The system may use the following procedure to gauge the effectiveness of the set of attribute weights it currently stores for user U: () For each $1<=i<=n$, use the estimation techniques to estimate q(U, $X_1$)+f(U, $X_i$) from all known values of feedback ratings r. Call this estimate $a_i$. (ii) Repeat step (i), but this time make the estimate for each $1<=i<=n$ without using the feedback ratings r(U, $X_j$) as input, for any j such that the distance d($X_i$, $X_j$) is smaller than a fixed threshold. That is, estimate each q(U,$X_i$)+f(U, $X_i$) from other values of feedback rating r only; in particular, do not use r(U, $X_i$) itself. Call this estimate $b_i$. The difference $a_i$-$b_i$ is herein termed the "residue feedback $r_{res}$(U, $X_i$) of user U on target object $X_i$." (iii) Compute user U's error measure, $(a_1-b_1)^2+(a_2-b_2)^2+(a_3-b_3)^2+\ldots+(a_n-b_n)^2$.

A gradient-descent or other numerical optimization method may be used to adjust user U's attribute weights so that this error measure reaches a (local) minimum. This approach tends to work best if the smoothing technique used in estimation is such that the value of f(V, Y) is strongly affected by the point estimate r(V,Y)-q(V,Y) when the latter value is provided as input. Otherwise, the presence or absence of the single input feedback rating r(U, $X_i$), in steps (i)-(ii) may not make $a_i$ and $b_i$ very different from each other. A slight variation of this learning technique adjusts a single global set of at tribute weights for all users, by adjusting the weights so as to minimize not a particular user's error measure but rather the total error measure of all users. These global weights are used as a default initial setting for a new user who has not yet provided any feedback. Gradient descent can then be employed to adjust this user's individual weights over time. Even when the attribute weights are chosen to minimize the error measure for user U, the error measure is generally still positive, meaning that residue feedback from user U has not been reduced to 0 on all target objects. It is useful to note that high residue feedback from a user U on a target object X indicates that user U liked target object X unexpectedly well given its profile, that is, better than the smoothing model could predict from user U's opinions on target objects with similar profiles. Similarly, low residue feedback indicates that user U liked target object X less than was expected. By definition, this unexplained preference or dispreference cannot be the result of topical similarity, and therefore must be regarded as an indication of the intrinsic quality of target object X. It follows that a useful quality attribute for a target object X is the average amount of residue feedback $r_{res}$(V, X) from users on that target object, averaged over all users V who have provided relevance feedback on the target object. In a variation of this idea, residue feedback is never averaged indiscriminately over all users to form a new attribute, but instead is smoothed to consider users' similarity to each other. Recall that the quality measure q(U, X) depends on the user U as well as the target object X, so that a given target object X may be perceived by different users to have different quality. In this variation, as before, q(U, X) is calculated as a weighted sum of various quality attributes that are dependent only on X, but then an additional term is added, namely an estimate of $r_{res}$(U, X) found by applying a smoothing algorithm to known values of $r_{res}$(V, X). Here V ranges over all users who have provided relevance feedback on target object X, and the smoothing algorithm is sensitive to the distances d(U, V) from each such user V to user U.

Using the Similarity Computation for Clustering

A method for defining the distance between any pair of target objects was disclosed above. Given this distance measure, it is simple to apply a standard clustering algorithm, such as k-means, to group the target objects into a number of clusters, in such a way that similar target objects tend to be grouped in the same cluster. It is clear that the resulting clusters can be used to improve the efficiency of matching buyers and sellers in the application described in section "Matching Buyers and Sellers" above: it is not necessary to compare every buy profile to every sell profile, but only to compare buy profiles and sell profiles that are similar enough to appear in the same cluster. As explained below, the results of the clustering procedure can also be used to make filtering more efficient, and in the service of querying and browsing tasks.

The k-means clustering method is familiar to those skilled in the art. Briefly put, it finds a grouping of points (target profiles, in this case, whose numeric coordinates are given by numeric decomposition of their attributes as described above) to minimize the distance between points in the clusters and the centers of the clusters in which they are located. This is done by alternating between assigning each point to the cluster which has the nearest center and then, once the points have been assigned, computing the (new) center of each cluster by averaging the coordinates of the points (target profiles) located in this cluster. Other clustering methods can be used, such as "soft" or "fuzzy" k-means clustering, in which objects are allowed to belong to more than one cluster. This can be cast as a clustering problem similar to the k-means problem, but now the criterion being optimized is a little different:

$$\Sigma_i \Sigma_c i_{ic} d(x_i, \bar{x}_c)$$

where C ranges over cluster numbers, i ranges over target objects, $x_i$ is the numeric vector corresponding to the profile of target object number i, $\bar{x}_c$ is the mean of all the numeric vectors corresponding to target profiles of target objects in cluster number C, termed the "cluster profile" of cluster C, d(*, *) is the metric used to measure distance between two target profiles, and $i_{iC}$ is a value between 0 and 1 that indicates how much target object number i is associated with cluster number C, where i is an indicator matrix with the property that for each i, SUM SUB C I SUB iC =1. For k-means clustering, $i_{ic}$ is either 0 or 1.

Any of these basic types of clustering might be used by the system:

1) Association-based clustering, in which profiles contain only associative attributes, and thus distance is defined entirely by associations. This kind of clustering generally (a) clusters target objects based on the similarity of the users who like them or (b) clusters users based on the similarity of the target objects they like. In this approach, the system does not need any information about target objects or users, except for their history of interaction with each other.

2) Content-based clustering, in which profiles contain only non-associative attributes. This kind of clustering (a) clusters target objects based on the similarity of their non-associative attributes (such as word frequencies) or (b) clusters users base d on the similarity of their non-associative attributes (such as demographics and psychographics). In this approach, the system does not need to record any information about users' historical patterns of information access, but it does need information about the intrinsic properties of users and/or target objects.

3) Uniform hybrid method, in which profiles may contain both associative and non-associative attributes. This method combines 1a and 2a, or 1b and 2b. The distance $d(P_x, P_y)$ between two profiles $P_x$ and $P_y$ may be computed by the general similarity-measurement methods described earlier.

4) Sequential hybrid method. First apply the k-means procedure to do 1a, so that articles are labeled by cluster based on which user read them, then use supervised clustering (maximum likelihood discriminant methods) using the word frequencies to do the process of method 2a described above. This tries to use knowledge of who read what to do a better job of clustering based on word frequencies. One could similarly combine the methods 1b and 2b described above.

Figures 6, 7:
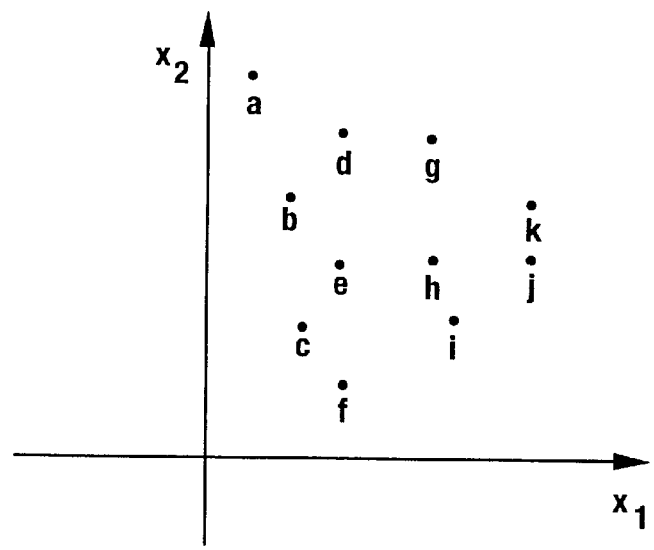
FIGS. 6–9 illustrate examples of menu generating process.
Figure 8:
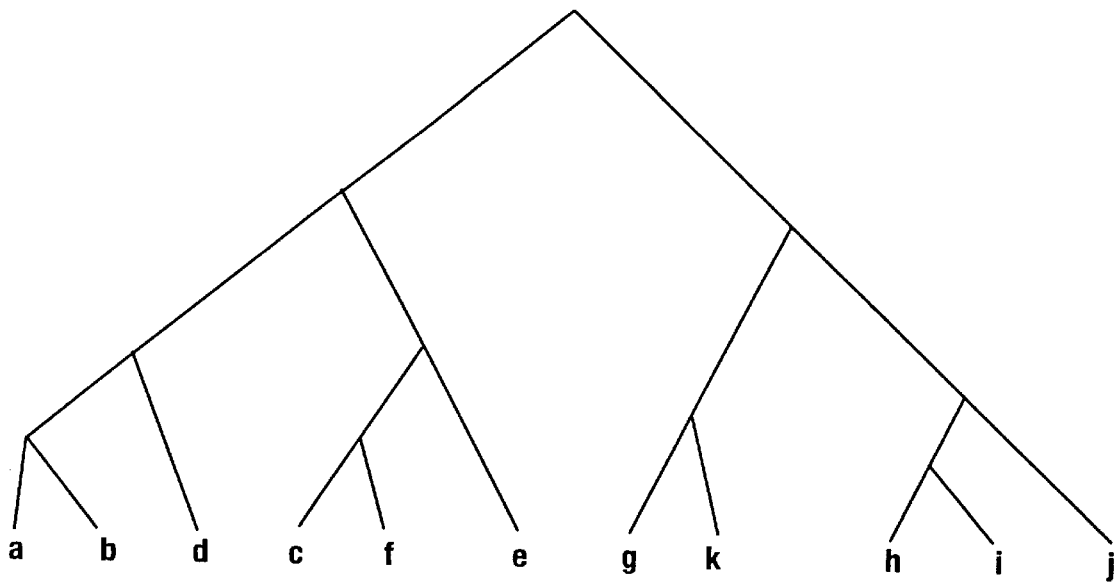

Hierarchical clustering of target objects is often useful. Hierarchical clustering produces a tree which divides the target objects first into two large clusters of roughly similar objects; each of these clusters is in turn divided into two or more smaller clusters, which in turn are each divided into yet smaller clusters until the collection of target objects has been entirely divided into "clusters" consisting of a single object each, as diagrammed in FIG. 8 In this diagram, the node d denotes a particular target object d, or equivalently, a single-member cluster consisting of this target object. Target object d is a member of the cluster (a, b, d), which is a subset of the cluster (a, b, c, d, e, f), which in turn is a subset of all target objects. The tree shown in FIG. 8 would be produced from a set of target objects such as those shown geometrically in FIG. 7. In FIG. 7, each letter represents a target object, and axes x1 and x2 represent two of the many numeric attributes on which the target objects differ. Such a cluster tree may be created by hand, using human judgment to form clusters and subclusters of similar objects, or may be created automatically in either of two standard ways: top-down or bottom-up. In top-down hierarchical clustering, the set of all target objects in FIG. 7 would be divided into the clusters (a, b, c, d, e, f) and (g, h, i, j, k). The clustering algorithm would then be reapplied to the target objects in each cluster, so that the cluster (g, h, i, j, k) is subpartitioned into the clusters (g, k) and (h, i, j), and so on to arrive at the tree shown in FIG. 8. In bottom-up hierarchical clustering, the set of all target objects in FIG. 7 would be grouped into numerous small clusters, namely (a, b), d, (c, f), e, (g,k), (h, i), and j. These clusters would then themselves be grouped into the larger clusters (a, b, d), (c, e, f), (g, k), and (b, i, j), according to their cluster profiles. These larger clusters would themselves be grouped into (a, b, c, d, e, f) and (g, k, h, i, j), and so on until all target objects had been grouped together, resulting in the tree of FIG. 8. Note that for bottom-up clustering to work, it must be possible to apply the clustering algorithm to a set of existing clusters. This requires a notion of the distance between two clusters. The method disclosed above for measuring the distance between target objects can be applied directly, provided that clusters are profiled in the same way as target objects. It is only necessary to adopt the convention that a cluster's profile is the average of the target profiles of all the target objects in the cluster; that is, to determine the cluster's value for a given attribute, take the mean value of that attribute across all the target objects in the cluster. For the mean value to be well-defined, all attributes must be numeric, so it is necessary as usual to replace each textual or associative attribute with its decomposition into numeric attributes (scores), as described earlier. For example, the target profile of a single Woody Allen film would assign "Woody-Allen" a score of 1 in the "name-of-director" field, while giving "Federico-Fellini" and "Terence-Davies" scores of 0. A cluster that consisted of 20 films directed by Allen and 5 directed by Fellini would be profiled with scores of 0.8, 0.2, and 0 respectively, because, for example, 0.8 is the average of 20 ones and 5 zeros.

Searching for Target Objects

Figure 13A:
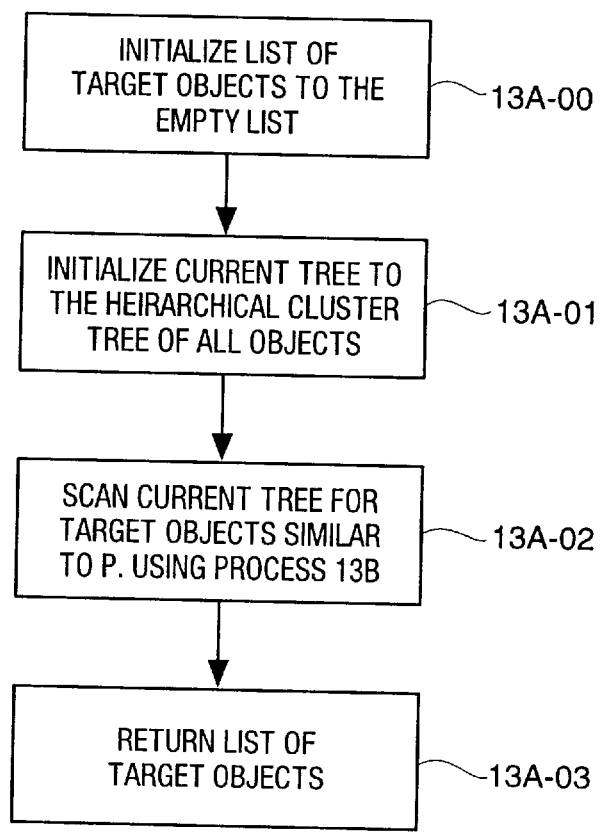
FIGS. 13A–B illustrate in flow diagram form the automatic clustering process.
Figure 13B:
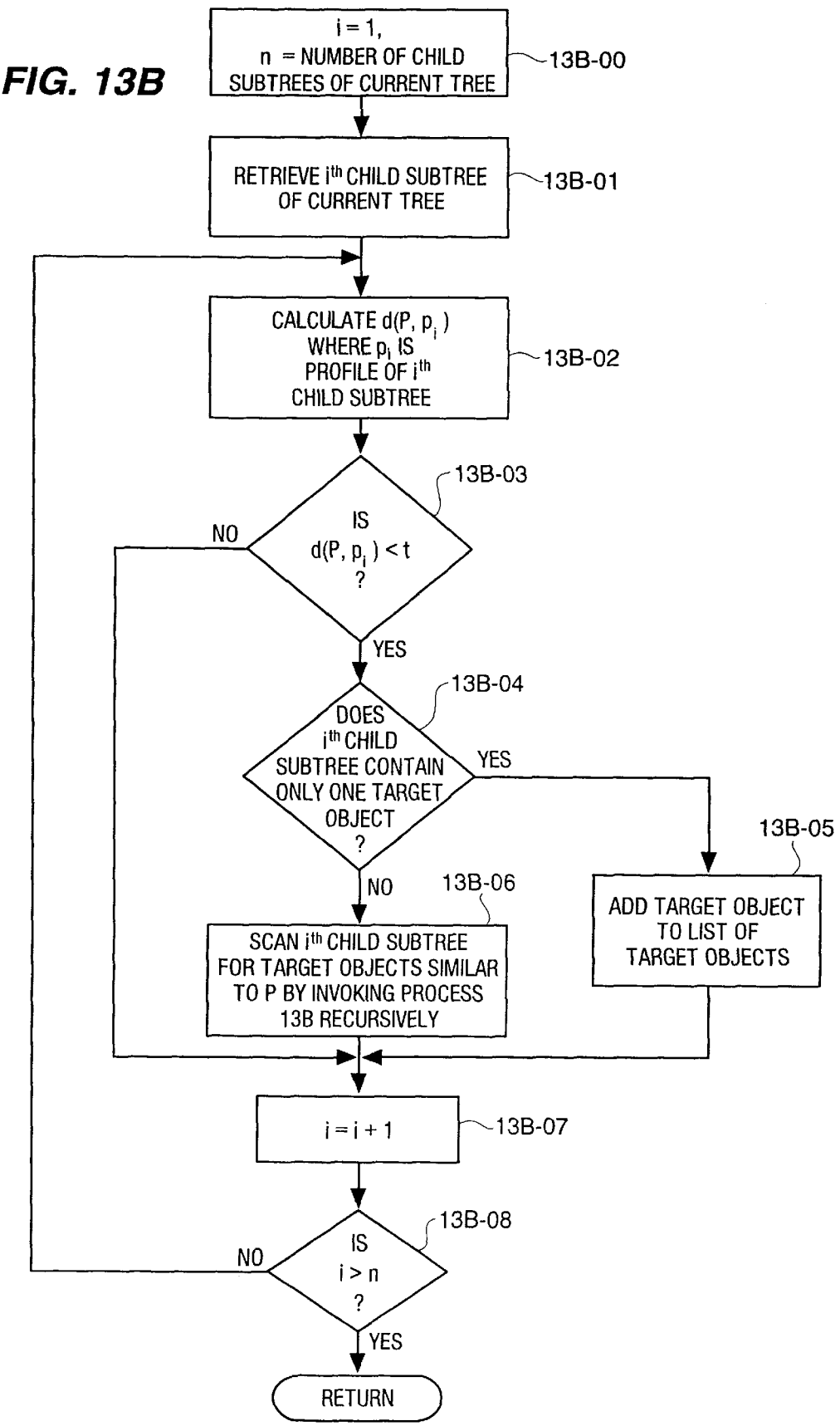
Figure 14:
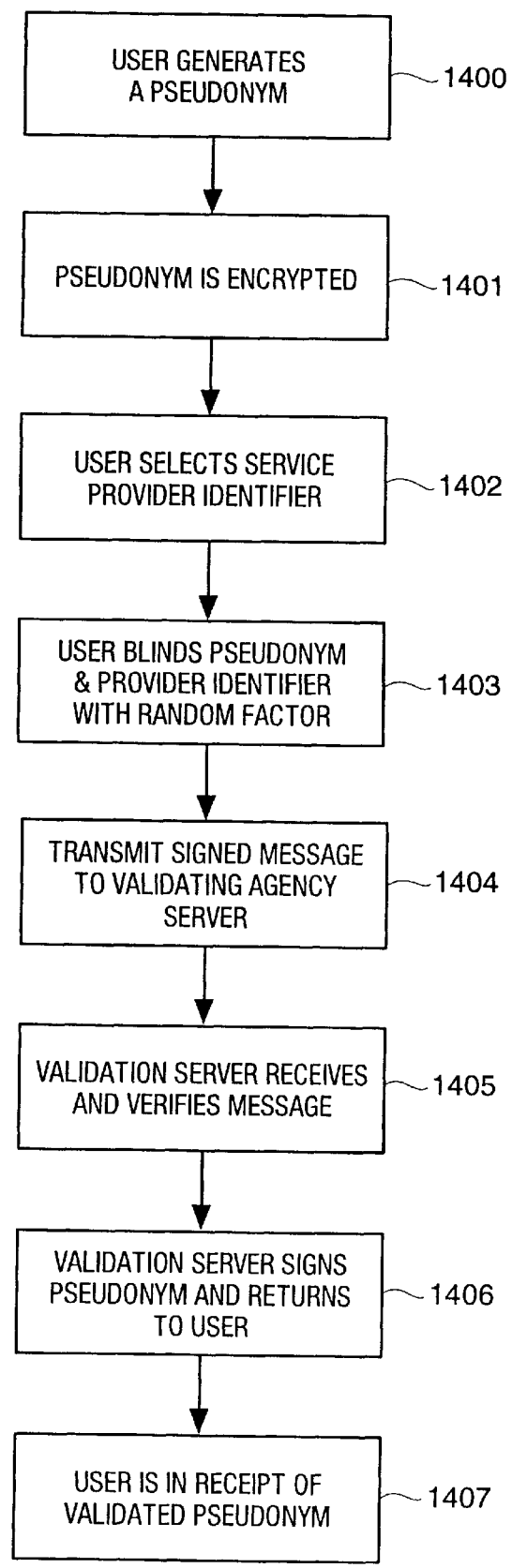
FIG. 14 illustrates in flow diagram form the use of the pseudonymous server.
Figure 15:
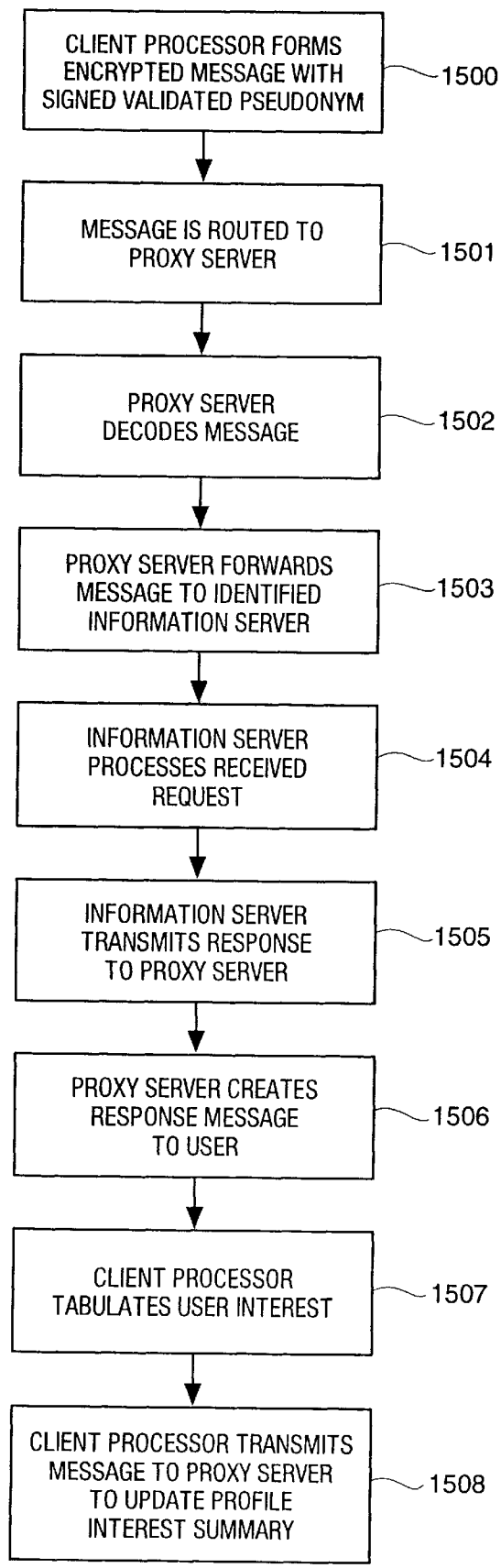
FIG. 15 illustrates in flow diagram form the use of the system for accessing information in response to a user query.
Figure 16:
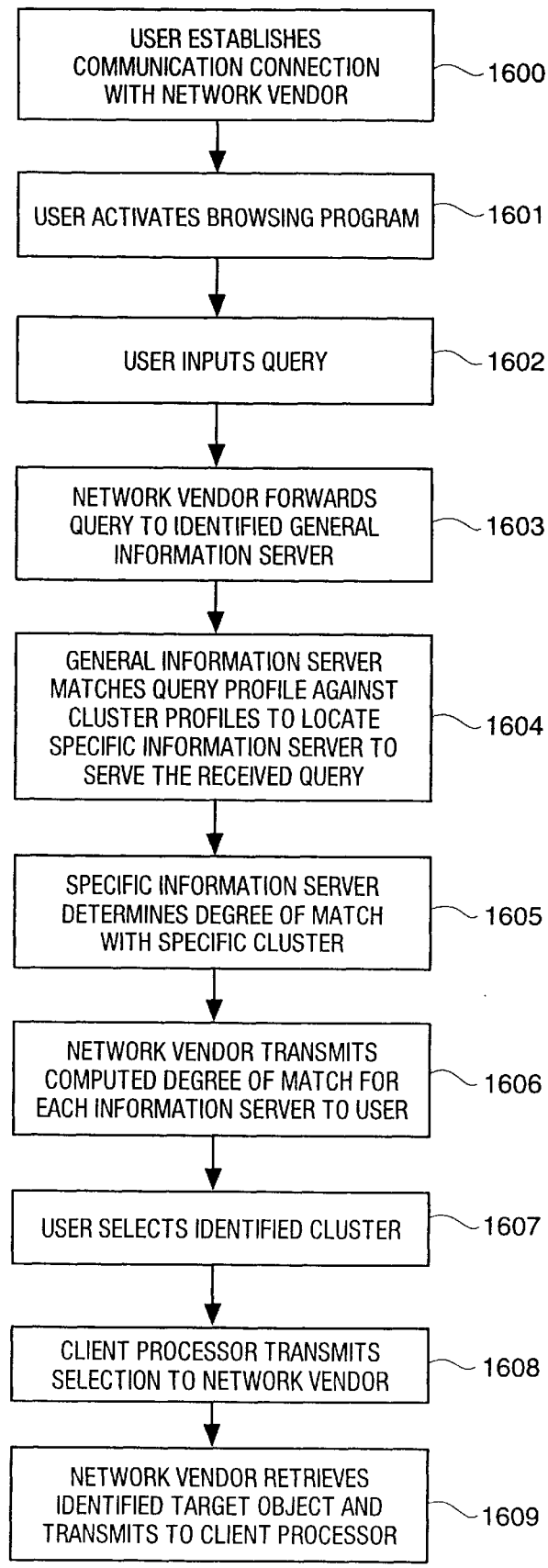
FIG. 16 illustrates in flow diagram form the use of the system for accessing information in response to a user query when the system is a distributed network implementation.

Given a target object with target profile P, or alternatively given a search profile P, a hierarchical cluster tree of target objects makes it possible for the system to search efficiently for target objects with target profiles similar to P. It is only necessarily to navigate through the tree, automatically, in search of such target profiles. The system for customized electronic identification of desirable objects begins by considering the largest, top-level clusters, and selects the cluster whose profile is most similar to target profile P. In the event of a near-tie, multiple clusters may be selected. Next, the system considers all subclusters of the selected clusters, and this time selects the subcluster or subclusters whose profiles are closest to target profile P. This refinement process is iterated until the clusters selected on a given step are sufficiently small, and these are the desired clusters of target objects with profiles most similar to target profile P. Any hierarchical cluster tree therefore serves as a decision tree for identifying target objects. In pseudo-code form, this process is as follows (and in flow diagram form in FIGS. 13A and 13B):

1. Initialize list of identified target objects to the empty list at step 13A00
2. Initialize the current tree T to be the hierarchical cluster tree of all objects at step 13A01 and at step 13A02 scan the current cluster tree for target objects similar to P, using the process detailed in FIG. 13B. At step 13A03, the list of target objects is returned.
3. At step 13B00, the variable I is set to 1 and for each child subtree Ti of the root of tree T, is retrieved.
4. At step 13B02, calculate d(P, pi), the similarity distance between P and $p_i$,
5. At step 13B03, if d(P, $p_i$)<t, a threshold, brach to one of two options
6. If tree Ti contains only one target object at step 13B04, add that target object to list of identified target objects at step 13B05 and advance to step 13B07.
7. If tree Ti contains multiple target objects at step 13B04, scan the ith child subtree for target objects similar to P by invoking the steps of the process of FIG. 13B recursively and then recurse to step 3 (step 13A01 in FIG. 13A) with T bound for the duration of the recursion to tree Ti, in order to search in tree Ti for target objects with profiles similar to P.

In step 5 of this pseudo-code, smaller thresholds are typically used at lower levels of the tree, for example by making the threshold an affine function or other function of the cluster variance or cluster diameter of the cluster pi. If the cluster tree is distributed across a plurality of servers, as described in the section of this description titled "Network Context of the Browsing System", this process may be executed in distributed fashion as follows: steps 3–7 are executed by the server that stores the root node of hierarchical cluster tree T, and the recursion in step 7 to a subcluster tree $T_i$ involves the transmission of a search request to the server that stores the root node of tree $T_i$, which server carries out the recursive step upon receipt of this request. Steps 1–2 are carried out by the processor that initiates the search, and the server that executes step 6 must send a message identifying the target object to this initiating processor, which adds it to the list.

Assuming that low-level clusters have been already been formed through clustering, there are alternative search methods for identifying the low-level cluster whose profile is most similar to a given target profile P. A standard back-propagation neural net is one such method: it should be trained to take the attributes of a target object as input, and produce as output a unique pattern that can be used to identify the appropriate low-level cluster. For maximum accuracy, low-level clusters that are similar to each other (close together in the cluster tree) should be given similar identifying patterns. Another approach is a standard decision tree that considers the attributes of target profile P one at a time until it can identify the appropriate cluster. If profiles are large, this may be more rapid than considering all attributes. A hybrid approach to searching uses distance measurements as described above to navigate through the top few levels of the hierarchical cluster tree, until it reaches an cluster of intermediate size whose profile is similar to target profile P, and then continues by using a decision tree specialized to search for low-level subclusters of that intermediate cluster.

One use of these searching techniques is to search for target objects that match a search profile from a user's search profile set. This form of searching is used repeatedly in the news clipping service, active navigation, and Virtual Community Service applications, described below. Another use is to add a new target object quickly to the cluster tree. An existing cluster that is similar to the new target object can be located rapidly, and the new target object can be added to this cluster. If the object is beyond a certain threshold distance from the cluster center, then it is advisable to start a new cluster. Several variants of this incremental clustering scheme can be used, and can be built using variants of subroutines available in advanced statistical packages. Note that various methods can be used to locate the new target objects that must be added to the cluster tree, depending on the architecture used. In one method, a "webcrawler" program running on a central computer periodically scans all servers in search of new target objects, calculates the target profiles of these objects, and adds them to the hierarchical cluster tree by the above method. In another, whenever a new target object is added to any of the servers, a software "agent" at that server calculates the target profile and adds it to the hierarchical cluster tree by the above method.

Rapid Profiling

In some domains, complete profiles of target objects are not always easy to construct automatically. When target objects are wallpaper patterns, for example, an attribute such as "genre" (a single textual term such as "Art-Deco," "Children's," "Rustic," etc.) may be a matter of judgment and opinion, difficult to determine except by consulting a human. More significantly, if each wallpaper pattern has an associative attribute that records the positive or negative relevance feedback to that pattern from various human users (consumers), then all the association scores of any newly introduced pattern are initially zero, so that it is initially unclear what other patterns are similar to the new pattern with respect to the users who like them. Indeed, if this associative attribute is highly weighted, the initial lack of relevance feedback information may be difficult to remedy, due to a vicious circle in which users of moderate-to-high interest are needed to provide relevance feedback but relevance feedback is needed to identify users of moderate-to-high interest. Fortunately, however, it is often possible in principle to determine certain attributes of a new target object by extraordinary methods, including but not limited to methods that consult a human. For example, the system can in principle determine the genre of a wallpaper pattern by consulting one or more randomly chosen individuals from a set of known human experts, while to determine the numeric association score between a new wallpaper pattern and a particular user, it can in principle show the pattern to the that user and obtain relevance feedback. Since such requests inconvenience people, however, it is important not to determine all difficult attributes this way, but only the ones that are most important for purposes of classifying the document. "Rapid profiling" is a method for selecting those numeric attributes that are most important to determine. (Recall that all attributes can be decomposed into numeric attributes, such as association scores or term scores.) First, a set of existing target objects that already have complete or largely complete profiles are clustered using a k-means algorithm. Next, each of the resulting clusters is assigned a unique identifying number, and each clustered target object is labeled with the identifying number of its cluster. Standard methods then allow construction of a single decision tree that can determine any target object's cluster number, with substantial accuracy, by considering the attributes of the target object, one at a time. Only attributes that can if necessary be determined for any new target object are used in the construction of this decision tree. To profile a new target object, the decision tree is traversed downward from its root as far as is desired. The root of the decision tree considers some attribute of the target object. If the value of this attribute is not yet known, it is determined by a method appropriate to that attribute; for example, if the attribute is the association score of the target object with user #4589, then relevance feedback (to be used as the value of this attribute) is solicited from user #4589, perhaps by the ruse of adding the possibly uninteresting target object to a set of objects that the system recommends to the user's attention, in order to find out what the user thinks of it. Once the root attribute is determined, the rapid profiling method descends the decision tree by one level, choosing one of the decision subtrees of the root in accordance with the determined value of the root attribute. The root of this chosen subtree considers another attribute of the target object, whose value is likewise determined by an appropriate method. The process c an be repeated to determine as many attributes as desired, by whatever methods are available, although it is ordinarily stopped after a small number of attributes, to avoid the burden of determining too many attributes.

It should be noted that the rapid profiling method can be used to identify important attributes in any sort of profile, and not just profiles of target objects. In particular, recall that the disclosed method for determining topical interest through similarity requires users as well as target objects to have profiles. New users, like new target objects, may be profiled or partially profiled through the rapid profiling process. For example, when user profiles include an associative attribute that records the user's relevance feedback on a 11 target objects in the system, the rapid profiling procedure can rapidly form a rough characterization of a new user's interests by soliciting the user's feedback on a small number of significant target objects, and perhaps also by determining a small n umber of other key attributes of the new user, by on-line queries, telephone surveys, or other means. Once the new user has been partially profiled in this way, the methods disclosed above predict that the new user's interests resemble the known interests of other users with similar profiles. In a variation, each user's user profile is subdivided into a set of long-term attributes, such as demographic characteristics, and a set of short-term attributes that help to identify the user's temporary desires and emotional state, such as the user's textual or multiple-choice answers to questions whose answers reflect the user's mood. A subset of the user's long-term attributes are determined when the user first registers with the system, through the use of a rapid profiling tree of long-term attributes. In addition, each time the user logs on to the system, a subset of the user's short-term attributes are additionally determined, through the use of a separate rapid profiling tree that asks about short-term attributes.

Market Research

A technique similar to rapid profiling is of interest in market research (or voter research). Suppose that the target objects are consumers. A particular attribute in each target profile indicates whether the consumer described by that target profile h as purchased product X. A decision tree can be built that attempts to determine what value a consumer has for this attribute, by consideration of the other attributes in the consumer's profile. This decision tree may be traversed to determine whether additional users are likely to purchase product X. More generally, the top few levels of the decision tree provide information, valuable to advertisers who are planning mass-market or direct-mail campaigns, about the most significant characteristics of consumers of product X.

Similar information can alternatively be extracted from a collection of consumer profiles without recourse to a decision tree, by considering attributes one at a time, and identifying those attributes on which product X's consumers differ significantly from its non-consumers. These techniques serve to characterize consumers of a particular product; they can be equally well applied to voter research or other survey research, where the objective is to characterize those individuals from a given set of surveyed individuals who favor a particular candidate, hold a particular opinion, belong to a particular demographic group, or have some other set of distinguishing attributes. Researchers may wish to purchase batches of analyzed or unanalyzed user profiles from which personal identifying information has been removed. As with any statistical database, statistical conclusions can be drawn, and relationships between attributes can be elucidated using knowledge discovery techniques which are well known in the art.

SUPPORTING ARCHITECTURE

The following section describes the preferred computer and network architecture for implementing the methods described in this patent.

Electronic Media System Architecture

FIG. 1 illustrates in block diagram form the overall architecture of an electronic media system, known in the art, in which the system for customized electronic identification of desirable objects of the present invention can be used to provide user customized access to target objects that are available via the electronic media system. In particular, the electronic media system comprises a data communication facility that interconnects a plurality of users with a number of information servers. The users are typically individuals, whose personal computers (terminals) $T_{1-Tn}$ are connected via a data communications link, such as a modem and a telephone connection established in well-known fashion, to a telecommunication network N. User information access software is resident on the user's personal computer and serves to communicate over the data communications link and the telecommunication network N with one of the plurality of network vendors $V_1-V_k$ (America Online, Prodigy, CompuServe, other private companies or even universities) who provide data interconnection service with selected ones of the information servers $I_1-I_m$. The user can, by use of the user information access software, interact with the information servers $I_1-I_m$ to request and obtain access to data that resides on mass storage systems —$SS_m$ that are part of the information server apparatus. New data is input to this system y users via their personal computers $T_1-T_n$ and by commercial information services by populating their mass storage systems $SS_1-SS_m$ with commercial data. Each user terminal $T_1-T_n$ and the information servers $I_1-I_m$ have phone numbers or IP addresses on the network N which enable a data communication link to be established between a particular user terminal $T_1-T_n$ and the selected information server $I_1-I_m$. A user's electronic mail address also uniquely identifies the user and the user's network vendor $V_1-V_k$ in an industry-standard format such as: username@aol.com or username@netcom.com. The network vendors $V_1-V_k$ provide access passwords for their subscribers (selected users), through which the users can access the information servers $I_1-I_m$. The subscribers pay the network vendors $V_1-V_k$ for the access services on a fee schedule that typically includes a monthly subscription fee and usage based charges. A difficulty with this system is that there are numerous information servers $I_1-I_m$ located around the world, each of which provides access to a set of information of differing format, content and topics and via a cataloging system that is typically unique to the particular information server $I_1-I_m$. The information is comprised of individual "files," which can contain audio data, video data, graphics data, text data, structured database data and combinations thereof. In the terminology of this patent, each target object is associated with a unique file: for target objects that are informational in nature and can be digitally represented, the file directly stores the informational content of the target object, while for target objects that are not stored electronically, such as purchasable goods, the file contains an identifying description of the target object. Target objects stored electronically as text files can include commercially provided news articles, published documents , letters, user-generated documents, descriptions of physical objects, or combinations of these classes of data. The organization of the files containing the information and the native format of the data contained in files of the same conceptual type may vary by information server $I_1-I_m$.

Thus, a user can have difficulty in locating files that contain the desired information, because the information may be contained in files whose information server cataloging may not enable the user to locate them. Furthermore, there is no standard catalog that defines the presence and services provided by all information servers $I_1-I_m$. A user therefore does not have simple access to information but must expend a significant amount of time and energy to excerpt a segment of the information that may be relevant to the user from the plethora of information that is generated and populated on this system. Even if the user commits the necessary resources to this task, existing information retrieval processes lack the accuracy and efficiency to ensure that the user obtains the desired information. It is obvious that within the constructs of this electronic media system, the three modules of the system for customized electronic identification of desirable objects can be implemented in a distributed manner, even with various modules being implemented on and/or by different vendors within the electronic media system. For example, the information servers $I_1-I_m$ can include the target profile generation module while the network vendors $V_1-V_k$ may implement the user profile generation module, the target profile interest summary generation module, and/or the profile processing module. A module can itself be implemented in a distributed manner, with numerous nodes being present in the network N, each node serving a population of users in a particular geographic area. The totality of these nodes comprises the functionality of the particular module. Various other partitions of the modules and their functions are possible and the examples provided herein represent illustrative examples and are not intended to limit the scope of the claimed invention. For the purposes of pseudonymous creation and update of users' target profile interest summaries (as described below), the vendors $V_1-V_k$ may be augmented with some number of proxy servers, which provide a mechanism for ongoing pseudonymous access and profile building through the method described herein. At least one trusted validation server must be in place to administer the creation of pseudonyms in the system.

An important characteristic of this system for customized electronic identification of desirable objects is its responsiveness, since the intended use of the system is in an interactive mode. The system utility grows with the number of the users and this increases the number of possible consumer/product relationships between users and target objects. A system that serves a large group of users must maintain interactive performance and the disclosed method for profiling and clustering target objects and users can in turn be used for optimizing the distribution of data among the members of a virtual community and through a data communications network, based on users' target profile interest summaries.

Network Elements and System Characteristics

Figure 2:
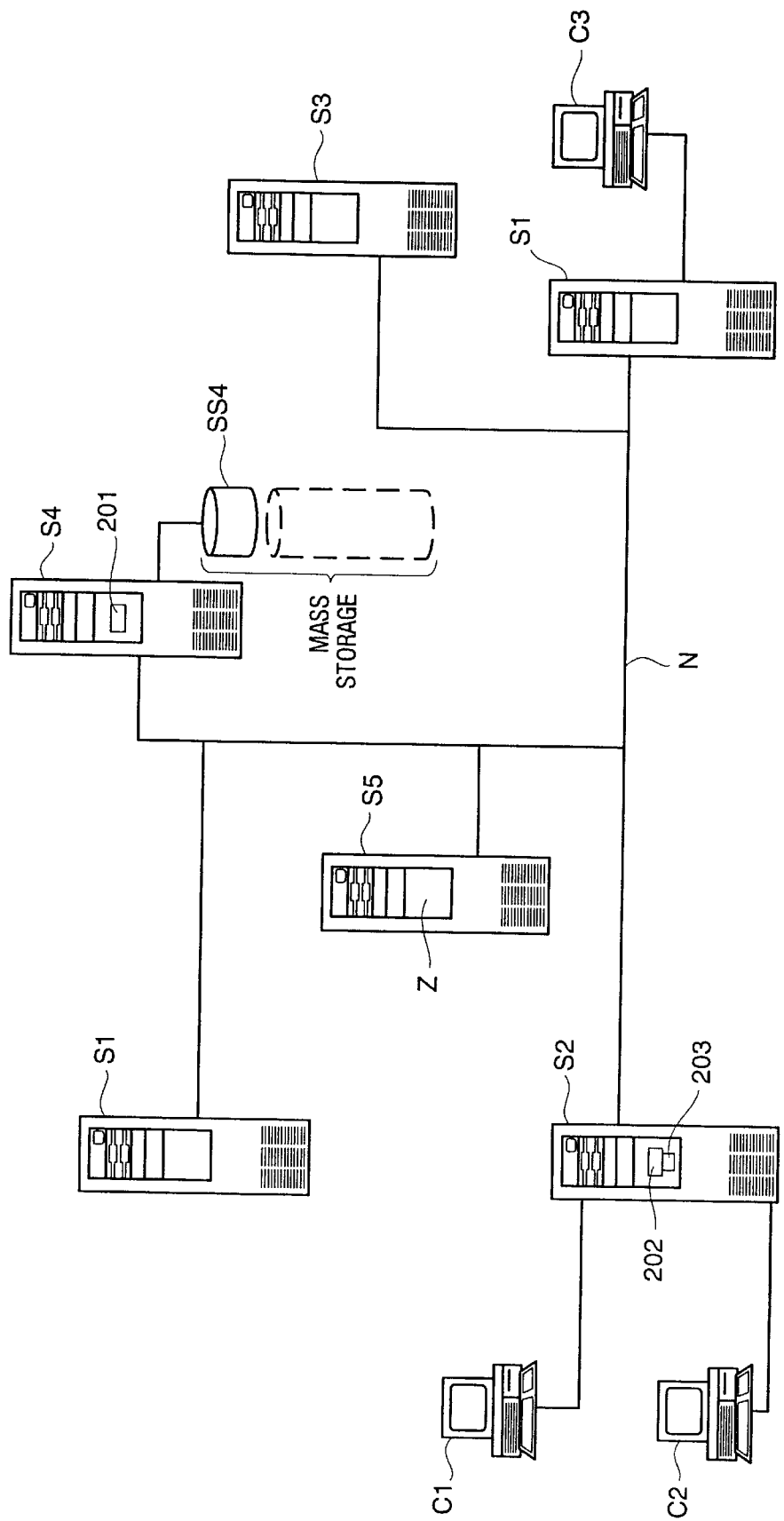
FIG. 2 illustrates in block diagram form one embodiment of the system for customized electronic identification of desirable objects.
Figure 3:
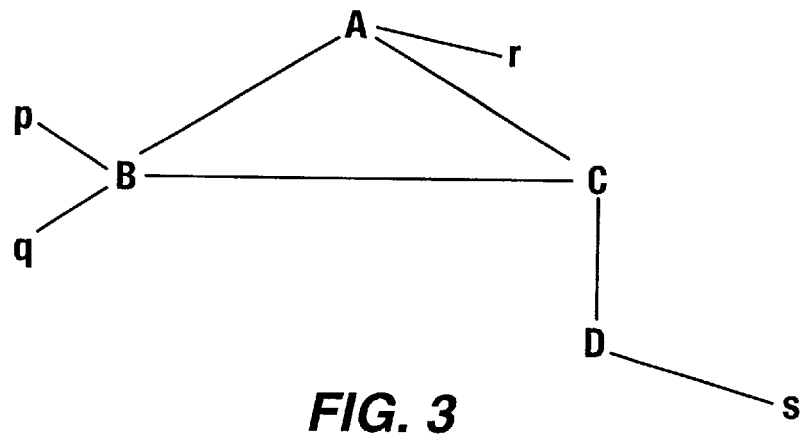
FIGS. 3 and 4 illustrate typical network trees.

The various processors interconnected by the data communication network N as shown in FIG. 1 can be divided into two classes and grouped as illustrated in FIG. 2: clients and servers. The clients C1–Cn are individual user's computer systems which are connected to servers S1–S5 at various times via data communications links. Each of the clients Ci is typically associated with a single server Sj, but these associations can change over time. The clients C1–Cn both interface with users and produce and retrieve files to and from servers. The clients C1–Cn are not necessarily continuously on-line, since they typically serve a single user and can be movable systems, such as laptop computers, which can be connected to the data communications network N at any of a number of locations. Clients could also be a variety of other computers, such as computers and kiosks providing access to customized information as well as targeted advertising to many users, where the users identify themselves with passwords or with smart cards. A server Si is a computer system that is presumed to be continuously on-line and functions to both collect files from various sources on the data communication network N for access by local clients C1–Cn and collect files from local clients C1–Cn for access by remote clients. The server Si is equipped with persistent storage, such as a magnetic disk data storage medium, and are interconnected with other servers via data communications links. The data communications links can be of arbitrary topology and architecture, and are described herein for the purpose of simplicity as point-to-point links or, more precisely, as virtual point-to-point links. The servers S1–S5 comprise the network vendors V1–Vk as well as the information servers $I_1-I_m$ of FIG. 1 and the functions performed by these two classes of modules can be merged to a greater or lesser extent in a single server Si or distributed over a number of servers in the data communication network N. Prior to proceeding with the description of the preferred embodiment of the invention, a number of terms are defined. FIG. 3 illustrates in block diagram form a representation of an arbitrarily selected network topology for a plurality of servers A–D, each of which is interconnected to at least one other server and typically also to a plurality of clients p–s. Servers A–D are interconnected by a collection of point to point data communications links, and server A is connected to client r, server B is connected to clients p–q, while server D is connected to client s. Servers transmit encrypted or unencrypted messages amongst themselves: a message typically contains the textual and/or graphic information stored in a particular file, and also contains data which describe the type and origin of this file, the name of the server that is supposed to receive the message, and the purpose for which the file contents are being transmitted. Some messages are not associated with any file, but are sent by one server to other servers for control reasons, for example to request transmission of a file or to announce the availability of a new file. Messages can be forwarded by a server to another server, as in the case where server A transmits a message to server D via a relay node of either server C or servers B, C. It is generally preferable to have multiple paths through the network, with each path being characterized by its performance capability and cost to enable the network N to optimize traffic routing.

Proxy Servers and Pseudonymous Transactions

While the method of using target profile interest summaries presents many advantages to both target object providers and users, there are important privacy issues for both users and providers that must be resolved if the system is to be used freely and without inhibition by users without fear of invasion of privacy. It is likely that user s desire that some, if not all, of the user-specific information in their user profiles and target profile interest summaries remain confidential, to be disclosed only under certain circumstances related to certain types of transactions and according to t heir personal wishes for differing levels of confidentiality regarding their purchases and expressed interests.

However, complete privacy and inaccessibility of user transactions and profile summary information would hinder implementation of the system for customized electronic identification of desirable objects and would deprive the user of many of the ad vantages derived through the system's use of user-specific information. In many cases, complete and total privacy is not desired by all parties to a transaction. For example, a buyer may desire to be targeted for certain mailings that describe products that are related to his or her interests, and a seller may desire to target users who are predicted to be interested in the goods and services that the seller provides. Indeed, the usefulness of the technology described herein is contingent upon the ability of the system to collect and compare data about many users and many target objects. A compromise between total user anonymity and total public disclosure of the user's search profiles or target profile interest summary is a pseudonym. A pseudonym is an artifact that allows a service provider to communicate with users and build and accumulate records of their preferences over time, while at the same time remaining ignorant of the users' true identities, so that users can keep their purchases or preferences private. A second and equally important requirement of a pseudonym system is that it provide for digital credentials, which are used to guarantee that the user represented by a particular pseudonym has certain properties. These credentials may be granted on the basis of result of activities and transactions conducted by means of the system for customized electronic identification of desirable objects, or on the basis of other activities and transactions conducted on the network N of the present system, on the basis of users' activities outside of network N. For example, a service provider may require proof that the purchaser has sufficient funds on deposit at his/her bank, which might possibly not be on a network before agreeing to transact business with that user. The user, therefore, must provide the service provider with proof of funds (a credential) from the bank, while still not disclosing the user's true identity to the service provider.

Our method solves the above problems by combining the pseudonym granting and credential transfer methods taught by D. Chaum and J. H. Evertse, in the paper titled "A secure and privacy-protecting protocol for transmitting personal information between organizations," with the implementation of a set of one or more proxy servers distributed throughout the network N. Each proxy server, for example S2 in FIG. 2, is a server which communicates with clients and other servers S5 in the network either directly or through anonymizing mix paths as detailed in the paper by D. Chaum titled "Untraceable Electronic Mail, Return Addresses, and Digital Pseudonyms," published in Communications of the ACM, Volume 24, Number 2, February 1981. Any server in the network N may be configured to act as a proxy server in addition to its other functions. Each proxy server provides service to a set of users, which set is termed the "user base" of that proxy server. A given proxy server provides three sorts of service to each user U in its user base, as follows:

1. The first function of the proxy server is to bidirectionally transfer communications between user U and other entities such as information servers (possibly including the proxy server itself) and/or other users. Specifically, letting S denote the server that is directly associated with user U's client processor, the proxy server communicates with server S (and thence with user U), either through anonymizing mix paths that obscure the identity of server S and user U, in which case the proxy server knows user U only through a secure pseudonym, or else through a conventional virtual point-to-point connection, in which case the proxy server knows user U by user U's address at server S, which address may be regarded as a non-secure pseudonym for user U.

2. A second function of the proxy server is to record user-specific information associated with user U. This user-specific information includes a user profile and target profile interest summary for user U, as well as a list of access control instructions specified by user U, as described below, and a set of one-time return addresses provided by user U that can be used to send messages to user U without knowing user U's true identity. All of this user-specific information is stored in a database that is keyed by user U's pseudonym (whether secure or non-secure) on the proxy server.

3. A third function of the proxy server is to act as a selective forwarding agent for unsolicited communications that are addressed to user U: the proxy server forwards some such communications to user U and rejects others, in accordance with the access control instructions specified by user U.

Our combined method allows a given user to use either a single pseudonym in all transactions where he or she wishes to remain pseudonymous, or else different pseudonyms for different types of transactions. In the latter case, each service provider might transact with the user under a different pseudonym for the user. More generally, a coalition of service providers, all of whom match users with the same genre of target objects, might agree to transact with the user using a common pseudonym, so that the target profile interest summary associated with that pseudonym would be complete with respect to said genre of target objects. When a user employs several pseudonyms in order to transact with different coalitions of service providers, the user may freely choose a proxy server to service each pseudonym; these proxy servers may be the same or different.

From the service provider's perspective, our system provides security, in that it can guarantee that users of a service are legitimately entitled to the services used and that no user is using multiple pseudonyms to communicate with the same provider. This uniqueness of pseudonyms is important for the purposes of this application, since the transaction information gathered for a given individual must represent a complete and consistent picture of a single user's activities with respect to a given service provider or coalition of service providers; otherwise, a user's target profile interest summary and user profile would not be able to represent the user's interests to other parties as completely and accurately as possible.

The service provider must have a means of protection from users who violate previously agreed upon terms of service. For example, if a user that uses a given pseudonym engages in activities that violate the terms of service, then the service provider should be able to take action against the user, such as denying the user service and blacklisting the user from transactions with other parties that the user might be tempted to defraud. This type of situation might occur when a user employs a service provider for illegal activities or defaults in payments to the service provider. The method of the paper titled "Security without identification: Transaction systems to make Big-Brother obsolete", published in the Communications of the ACM, 28(10), October 1985; pp. 1030–1044, incorporated herein, provides for a mechanism to enforce protection against this type of behavior through the use of resolution credentials, which are credentials that are periodically provided to individuals contingent upon their behaving consistent with the agreed upon terms of service between the user and information provider and network vendor entities (such as regular payment for services rendered, civil conduct, etc.). For the user's safety, if the issuer of a resolution credential refuses to grant this resolution credential to the user, then the refusal may be appealed to an adjudicating third party. The integrity of the user profiles and target profile interest summaries stored on proxy servers is important: if a seller relies on such user-specific information to deliver promotional offers or other material to a particular class of users, but not to other users, then the user-specific information must be accurate and untampered with in any way. The user may likewise wish to ensure that other parties not tamper with the user's user profile and target profile interest summary, since such modification could degrade the system's ability to match the user with the most appropriate target objects. This is done by providing for the user to apply digital signatures to the control messages sent by the user to the proxy server. Each pseudonym is paired with a public cryptographic key and a private cryptographic key, where the private key is known only to the user who holds that pseudonym; when the user sends a control message to a proxy server under a given pseudonym, the proxy server uses the pseudonym's public key to verify that the message has been digitally signed by someone who knows the pseudonym's private key. This prevents other parties from masquerading as the user.

Our approach, as disclosed in this application, provides an improvement over the prior art in privacy-protected pseudonymy for network subscribers such as taught in U.S. Pat. No. 5,245,656, which provides for a name translator station to act as an intermediary between a service provider and the user. However, while U.S. Pat. No. 5,245,656 provides that the information transmitted between the end user U and the service provider be doubly encrypted, the fact that a relationship exists between user U and the service provider is known to the name translator, and this fact could be used to compromise user U, for example if the service provider specializes in the provision of content that is not deemed acceptable by user Us peers. The method of U.S. Pat. No. 5,245,656 also omits a method for the convenient updating of pseudonymous user profile information, such as is provided in this application, and does not provide for assurance of unique and credentialed registration of pseudonyms from a credentialing agent as is also provided in this application, and does not provide a means of access control to the user based on profile information and conditional access as will be subsequently described. The method described by Loeb et al. also does not describe any provision for credentials, such as might be used for authenticating a user's right to access particular target objects, such as target objects that are intended to be available only upon payment of a subscription fee, or target objects that are intend ed to be unavailable to younger users.

Proxy Server Description

In order that a user may ensure that some or all of the information in the user's user profile and target profile interest summary remain dissociated from the user's true identity, the user employs as an intermediary any one of a number of proxy servers available on the data communication network N of FIG. 2 (for example, server S2). The proxy servers function to disguise the true identity of the user from other parties on the data communication network N. The proxy server represents a given user to either single network vendors and information servers or coalitions thereof A proxy server, e.g. S2, is a server computer with CPU, main memory, secondary disk storage and network communication function and with a database function which retrieves the target profile interest summary and access control instructions associated with a particular pseudonym P, which represents a particular user U, and performs bi-directional routing of commands, target objects and billing information between the user at a given client (e.g. C3) and other network entities such as network vendors V1–Vk and information servers I1–Im. Each proxy server maintains an encrypted target profile interest summary associated with each allocated pseudonym in its pseudonym database D. The actual user-specific information and the associated pseudonyms need not be stored locally on the proxy server, but may alternatively be stored in a distributed fashion and be remotely addressable from the proxy server via point-to-point connections.

The proxy server supports two types of bi-directional connections: point-to-point connections and pseudonymous connections through mix paths, as taught by D. Chaum in the paper titled "Untraceable Electronic Mail Return Addresses, and Digital Pseudonyms", Communications of the ACM, Volume 24, Number 2, February 1981. The normal connections between the proxy server and information servers, for example a connection between proxy server S2 and information server S4 in FIG. 2, are accomplished through the point-to-point connection protocols provided by network N as described in the "Electronic Media System Architecture" section of this application. The normal type of point-to-point connections may be used between S2–S4, for example, since the dissociation of the user and the pseudonym need only occur between the client C3 and the proxy server S2, where the pseudonym used by the user is available. Knowing that an information provider such as S4 communicates with a given pseudonym P on proxy server S2 does not compromise the true identity of user U. The bidirectional connection between the user and the proxy server S2 can also be a normal point-to-point connection, but it may instead be made anonymous and secure, if the user desires, though the consistent use of an anonymizing mix protocol as taught by D. Chaum in the paper titled "Untraceable Electronic Mail, Return Addresses, and Digital Pseudonyms", Communications of the ACM, Volume 24, Number 2, February 1981. This mix procedure provides untraceable secure anonymous mail between to parties with blind return addresses through a set of forwarding and return routing servers termed "mixes". The mix routing protocol, as taught in the Chaum paper, is used with the proxy server S2 to provide a registry of persistent secure pseudonyms that can be employed by users other than user U, by information providers I1–Im, by vendors V1–Vk and by other proxy servers to communicate with the users in the proxy servers user base on a continuing basis. The security provided by this mix path protocol is distributed and resistant to traffic analysis attacks and other known forms of analysis which may be used by malicious parties to try and ascertain the true identity of a pseudonym bearer. Breaking the protocol requires a large number of parties to maliciously collude or be cryptographically compromised. In addition an extension to the method is taught where the user can include a return path definition in the message so the information server S4 can return the requested information to the user's client processor C3. We utilize this feature in a novel fashion to provide for access and reachability control under user and proxy server control.

Validation and Allocation of a Unique Pseudonym

Chaum's pseudonym and credential issuance system, as described in a publication by D. Chaum and J. H. Evertse, titled "A secure and privacy-protecting protocol for transmitting personal information between organizations," has several desirable properties for use as a component in our system. The system allows for individuals to use different pseudonyms with different organizations (such as banks and coalitions of service providers). The organizations which are presented with a pseudonym have no more information about the individual than the pseudonym itself and a record of previous transactions carried out under that pseudonym. Additionally, credentials, which represent facts about a pseudonym that an organization is willing to certify, can be granted to a particular pseudonym, and transferred to other pseudonyms that the same user employs. For, example, the user can use different pseudonyms with different organizations (or disjoint sets of organizations), yet still present credentials that were granted by one organization, under one pseudonym, in order to transact with another organization under another pseudonym, without revealing that the two pseudonyms correspond to the same user. Credentials may be granted to provide assurances regarding the pseudonym bearer's age, financial status, legal status, and the like. For example, credentials signifying "legal adult" may be issued to a pseudonym based on information known about the corresponding user by the given is suing organization. Then, when the credential is transferred to another pseudonym that represents the user to another disjoint organization, presentation of this credential on the other pseudonym can be taken as proof of legal adulthood, which might satisfy a condition of terms of service. Credential-issuing organizations may also certify particular facts about a user's demographic profile or target profile interest summary, for example by granting a credential that asserts "the bearer of this pseudonym is either well-read or is middle-aged and works for a large company"; by presenting this credential to another entity, the user can prove eligibility for (say) a discount without revealing the user's personal data to that entity.

Additionally, the method taught by Chaum provides for assurances that no individual may correspond with a given organization or coalition of organizations using more than one pseudonym; that credentials may not be feasibly forged by the user; and t hat credentials may not be transferred from one user's pseudonym to a different user's pseudonym. Finally, the method provides for expiration of credentials and for the issuance of "black marks" against Individuals who do not act according to the terms of service that they are extended. This is done through the resolution credential mechanism as described in Chaum's work, in which resolutions are issued periodically by organizations to pseudonyms that are in good standing. If a user is not issued this resolution credential by a particular organization or coalition of organization, then this user cannot have it available to be transferred to other pseudonyms which he uses with other organizations. Therefore, the user cannot convince these other organizations that he has acted accordance with terms of service in other dealings. If this is the case, then the organization can use this lack of resolution credential to infer that the user is not in good standing in his other dealings. In one approach organizations (or other users) may issue a list of quality related credentials based upon the experience of transaction (or interaction) with the user which may act similarly to a letter of recommendation as in a resume. If such a credential is issued from multiple organizations, their values become averaged. In an alternative variation organizations may be issued credentials from users such as customers which may be used to indicate to other future users quality of service which can be expected by subsequent users on the basis of various criteria.

In our implementation, a pseudonym is a data record consisting of two fields. The first field specifies the address of the proxy server at which the pseudonym is registered. The second field contains a unique string of bits (e.g., a random binary number) that is associated with a particular user; credentials take the form of public-key digital signatures computed on this number, and the number itself is issued by a pseudonym administering server Z, as depicted in FIG. 2, and detailed in a generic form in the paper by D. Chaum and J. H. Evertse, titled "A secure and privacy-protecting protocol for transmitting personal information between organizations.". It is possible to send information to the user holding a given pseudonym, by enveloping the information in a control message that specifies the pseudonym and is addressed to the proxy server that is named in the first field of the pseudonym; the proxy server may forward the information to the user upon receipt of the control message.

While the user may use a single pseudonym for all transactions, in the more general case a user has a set of several pseudonyms, each of which represents the user in his or her interactions with a single provider or coalition of service providers. Each pseudonym in the pseudonym set is designated for transactions with a different coalition of related service providers, and the pseudonyms used with one provider or coalition of providers cannot be linked to the pseudonyms used with other disjoint coalitions of providers . All of the user's transactions with a given coalition can be linked by virtue of the fact that they are conducted under the same pseudonym, and therefore can be combined to define a unified picture, in the form of a user profile and a target profile interest summary, of the user's interests vis-a-vis the service or services provided by said coalition. There are other circumstances for which the use of a pseudonym may be useful and the present description is in no way intended to limit the scope of the claimed invention for example, the previously described rapid profiling tree could be used to pseudonymously acquire information about the user which is considered by the user to be sensitive such as that information which is of interest to such entitites as insurance companies, medical specialists, family counsellors or dating services.

Detailed Protocol

In our system, the organizations that the user U interacts with are the servers S1–Sn on the network N. However, rather than directly corresponding with each server, the user employs a proxy server, e.g. S2, as an intermediary between the local server of the user's own client and the information provider or network vendor. Mix paths as described by D. Chaum in the paper titled "Untraceable Electronic Mail, Return Addresses, and Digital Pseudonyms", Communications of the ACM, Volume 24, Number 2, February 1981 allow for untraceability and security between the client, such as C3, and the proxy server, e.g. S2. Let S(M,K) represent the digital signing of message M by modular exponentiation with key K as detailed in a paper by Rivest, R. L., Shamir, A., and Adleman, L. Titled "A method for obtaining digital signatures and public-key cryptosystems", published in the Comm. ACM 21, 2 February 120–126. Once a user applies to server Z for a pseudonym P and is granted a signed pseudonym signed with the private key $SK_z$ of server Z, the following protocol takes place to establish an entry for the user U in the proxy server S2's database D. 1. The user now sends proxy server S2 the pseudonym, which has been signed by Z to indicate the authenticity and uniqueness of the pseudonym. The user also generates a $PK_P$, $SK_P$ key pair for use with the granted pseudonym, where is the private key associated with the pseudonym and $PK_P$ is the public key associated with the pseudonym. The user forms a request to establish pseudonym P on proxy server S2, by sending the signed pseudonym $S(P, SK_Z)$ to the proxy server S2 along with a request to create a new database entry, indexed by P, and the public key $PK_P$. It envelopes the message and transmits it to a proxy server S2 through an anonymizing mix path, along with an anonymous return envelope header. 2. The proxy server S2 receives the database creation entry request and associated certified pseudonym message. The proxy server S2 checks to ensure that the requested pseudonym P is signed by server Z and if so grants the request and creates a database entry for the pseudonym, as well as storing the user's public key $PK_P$ to ensure that only the user U can make requests in the future using pseudonym P. 3. The structure of the user's database entry consists of a user profile as detailed herein, a target profile interest summary as detailed herein, and a Boolean combination of access control criteria as detailed below, along with the associated public key for the pseudonym P. 4. At any time after database entry for Pseudonym P is established, the user U may provide proxy server S2 with credentials on that pseudonym, provided by third parties, which credentials make certain assertions about that pseudonym. The proxy server may verify those credentials and make appropriate modifications to the users profile as required by these credentials. such as recording the user's new demographic status as an adult. It may also store those credentials, so that it can present them to service providers on the user's behalf.

The above steps may be repeated, with either the same or a different proxy server, each time user U requires a new pseudonym for use with a new and disjoint coalition of providers. In practice there is an extremely small probability that a given pseudonym may have already been allocated by due to the random nature of the pseudonym generation process carried out by Z. If this highly unlikely event occurs, then the proxy server S2 may reply to the user with a signed message indicating that the generated pseudonym has already been allocated, and asking for a new pseudonym to be generated.

Pseudonymous Control of an Information Server

Once a proxy server S2 has authenticated and registered a user's pseudonym, the user may begin to use the services of the proxy server S2, in interacting with other network entities such as service providers, as exemplified by server S4 in FIG. 2, an information service provider node connected to the network. The user controls the proxy server S2 by forming digitally encoded requests that the user subsequently transmits to the proxy server S2 over the network N. The nature and format of these requests will vary, since the proxy server may be used for any of the services described in this application, such as the browsing, querying, and other navigational functions described below.

In a generic scenario, the user wishes to communicate under pseudonym P with a particular information provider or user at address A, where P is a pseudonym allocated to the user and A is either a public network address at a server such as S4, or another pseudonym that is registered on a proxy server such as S4. (in the most common version of this scenario, address A is the address of an information provider, and the user is requesting that the in formation provider send target objects of interest.) The user must form a request R to proxy server S2, that requests proxy server S2 to send a message to address A and to forward the response back to the user. The user may thereby communicate with other parties, either non-pseudonymous parties, in the case where address A is a public network address, or pseudonymous parties, in the case where address A is a pseudonym held by, for example, a business or another user who prefers to operate pseudonymously.

In other scenarios, the request R to proxy server S2 formed by the user may have different content. For example, request R may instruct proxy server S2 to use the methods described later in this description to retrieve from the most convenient server a particular piece of information that has been multicast to many servers, and to send this information to the user. Conversely, request R may instruct proxy server S2 to multicast to many servers a file associated with a new target object provided by the user, as described below. If the user is a subscriber to the news clipping service described below, request R may instruct proxy server S2 to forward to the user all target objects that the news clipping service has sent to proxy server S2 for the user's attention. If the user is employing the active navigation service described below, request R may instruct proxy server S2 to select a particular cluster from the hierarchical cluster tree and provide a menu of its subclusters to the user, or to activate a query that temporarily affects proxy server S2's record of the user's target profile interest summary. If the user is a member of a virtual community as described below, request R may instruct proxy server S2 to forward to the user all messages that have been sent to the virtual community.

Regardless of the content of request R, the user, at client C3, initiates a connection to the user's local server SI, and instructs server SI to send the request R along a secure mix path to the proxy server S2, initiating the following sequence of actions:

1. The user's client processor C3 forms a signed message $S(R, SK_P)$, which is paired with the user's pseudonym P and (if the request R requires a response) a secure one-time set of return envelopes, to form a message M. It protects the message M with an multiply enveloped route for the outgoing path. The enveloped route s provide for secure communication between S1 and the proxy server S2. The message M is enveloped in the most deeply nested message and is therefore difficult to recover should the message be intercepted by an eavesdropper.

2. The message M is sent by client C3 to its local server S1, and is then routed by the data communication network N from server S1 through a set of mixes as dictated by the outgoing envelope set and arrives at the selected proxy server S2.

3. The proxy server S2 separates the received message M into the request message R, the pseudonym P, and (if included) the set of envelopes for the return path. The proxy server S2 uses pseudonym P to index and retrieve the corresponding record in proxy server S2's database, which record is stored in local storage at the proxy server S2 or on other distributed storage media accessible to proxy server S2 via the network N. This record contains a public key $PK_P$, user-specific information, and credentials associated with pseudonym P. The proxy server S2 uses the public key $PK_P$ to check that the signed version $S(R, SK_P)$ of request message R is valid.

4. Provided that the signature on request message R is valid, the proxy server S2 acts on the request R. For example, in the generic scenario described above, request message R includes an embedded message M1 and an address A to whom message M1 should be sent; in this case, proxy server S2 sends message M1 to the server named in address A, such as server S4. The communication is done using signed and optionally encrypted messages over the normal point to point connections provided by the data communication network N. When necessary in order to act on embedded message M1, server S4 may exchange or be caused to exchange further signed and optionally encrypted messages with proxy server S2, still over normal point to point connections, in order to negotiate the release of user-specific information and credentials from proxy server S2. In particular, server S4 may require server S2 to supply credentials proving that the user is entitled to the information requested—for example, proving that the user is a subscriber in good standing to a particular information service, that the user is old enough to legally receive adult material, and that the user has been offered a particular discount (by means of a special discount credential issued to the user's pseudonym).

5. If proxy server S2 has sent a message to a server S4 and server S4 has created a response M2 to message M1 to be sent to the user, then server S4 transmits the response M2 to the proxy server S2 using normal network point-to-point connections.

6. The proxy server S2, upon receipt of the response M2, creates a return message Mr comprising the response NM embedded in the return envelope set that was earlier transmitted to proxy server S2 by the user in the original message M. It transmits the return message Mr along the pseudonymous mix path specified by this return envelope set, so that the response M2 reaches the user at the user's client processor C3.

7. The response M2 may contain a request for electronic payment to the information server S4. The user may then respond by means of a message M3 transmitted by the same means as described for message M1 above, which message M3 encloses some form of anonymous payment. Alternatively, the proxy server may respond automatically with such a payment, which is debited from an account maintained by the proxy server for this user.

8. Either the response message M2 from the information server S4 to the user, or a subsequent message sent by the proxy server S2 to the user, may contain advertising material that is related to the user's request and/or is targeted to the user. Typically, if the user has just retrieved a target object X, then (a) either proxy server S2 or information server S4 determines a weighted set of advertisements that are "associated with" target object X, (b) a subset of this set is chosen randomly, where the weight of an advertisement is proportional to the probability that it is included in the subset, and (c) proxy server S2 selects from this subset just those advertisements that the user is most likely to be interested in. In the variation where proxy server S2 determines the set of advertisements associated with target object x then this set typically consists of all advertisements that the proxy servers owner has been paid to disseminate and whose target profiles are within a threshold similarity distance of the target profile of target object X. In the variation where proxy server S4 determines the set of advertisements associated with target object X, advertisers typically purchase the right to include advertisements in this set. In either case, the weight of an advertisement is determined by the amount that an advertiser is willing to pay. Following step (c), proxy server S2 retrieves the selected advertising material and transmits it to the users client processor C3, where it will be displayed to the user, within a specified length of time after it is received, by a trusted process running on the user's client processor C3. When proxy server S2 transmits an advertisement, it sends a message to the advertiser, indicating that the advertisement has been transmitted to a user with a particular predicted level of interest. The message may also indicate the identity of target object X. In return, the advertiser may transmit an electronic payment to proxy server S2; proxy server S2 retains a service fee for itself optionally forwards a service fee to information server S4, and the balance is forwarded to the user or used to credit the user's account on the proxy server.

9. If the response M2 contains or identifies a target object, the passive and/or active relevance feedback that the user provides on this object is tabulated by a process on the user's client processor C3. A summary of such relevance feedback information, digitally signed by client processor C3 with a proprietary private key $SK_{C3}$, is periodically transmitted through an a secure mix path to the proxy server S2, whereupon the search profile generation module 202 resident on server S2 updates the appropriate target profile interest summary associated with pseudonym P, provided that the signature on the summary message can be authenticated with the corresponding public key $PK_{C3}$ which is available to all tabulating process that are ensured to have integrity.

When a consumer enters into a financial relationship with a particular information server based on both parties agreeing to terms for the relationship, a particular pseudonym may be extended for the consumer with respect to the given provider as detailed in the previous section. When entering into such a relationship, the consumer and the service provider agree to certain terms. However, if the user violates the terms of this relationship, the service provider may decline to provide service to the pseudonym under which it transacts with the user. In addition, the service provider has the recourse of refusing to provide resolution credentials to the pseudonym, and may choose to do so until the pseudonym bearer returns to good standing.

Pre-Fetching of Target Objects

In some circumstances, a user may request access in sequence to many files, which are stored on one or more information servers. This behavior is common when navigating a hypertext system such as the World Wide Web, or when using the target object browsing system described below.

In general, the user requests access to a particular target object or menu of target objects; once the corresponding file has been transmitted to the user's client processor, the user views its contents and makes another such request, and so on. Each request may take many seconds to satisfy, due to retrieval and transmission delays. However, to the extent that the sequence of requests is predictable, the system for customized electronic identification of desirable objects can respond more quickly to each request, by retrieving or starting to retrieve the appropriate files even before the user requests them. This early retrieval is termed "pre-fetching of files."

Pre-fetching of locally stored data has been heavily studied in memory hierarchies, including CPU caches and secondary storage (disks), for several decades. A leader in this area has been A. J. Smith of Berkeley, who identified a variety of schemes and analyzed opportunities using extensive traces in both databases and CPU caches. His conclusion was that general schemes only really paid off where there was some reasonable chance that sequential access was occurring, e.g, in a sequential read of data. As the balances between various latencies in the memory hierarchy shifted during the late 1980's and early 1990's, J. M. Smith and others identified further opportunities for pre-fetching of both locally stored data and network data. In particular, deeper analysis of patterns in work by Blaha showed the possibility of using expert systems for deep pattern analysis that could be used for pre-fetching. Work by J. M. Smith proposed the use of reference history trees to anticipate references in storage hierarchies where there was some historical data. Recent work by Touch and the Berkeley work addressed the case of data on the World-Wide Web, where the large size of images and the long latencies provide extra incentive to pre-fetch; Touch's technique is to pre-send when large bandwidths permit some speculation using HTML storage references embedded in WEB pages, and the Berkeley work uses techniques similar to J. M. Smith's reference histories specialized to the semantics of HTML data.

Successful pre-fetching depends on the ability of the system to predict the next action or actions of the user. In the context of the system for customized electronic identification of desirable objects, it is possible to cluster users into groups according to the similarity of their user profiles. Any of the well-known pre-fetching methods that collect and utilize aggregate statistics on past user behavior, in order to predict future user behavior, may then be implemented in so as to collect and utilize a separate set of statistics for each cluster of users. In this way, the system generalizes its access pattern statistics from each user to similar users, without generalizing among users who have substantially different interests. The system may further collect and utilize a similar set of statistics that describes the aggregate behavior of all users; in cases where the system cannot confidently make a prediction as to what a particular user will do, because the relevant statistics concerning that user's user cluster are derived from only a small amount of data, the system may instead make its predictions based on the aggregate statistics for all users, which are derived from a larger amount of data. For the sake of concreteness, we now describe a particular instantiation of a pre-fetching system, that both employs these insights and that makes its pre-fetching decisions through accurate measurement of the expected cost and benefit of each potential pre-fetch.

Pre-fetching exhibits a cost-benefit tradeoff. Let t denote the approximate number of minutes that pre-fetched files are retained in local storage (before they are deleted to make room for other pre-fetched files). If the system elects to pre-fetch a file corresponding to a target object X, then the user benefits from a fast response at no extra cost, provided that the user explicitly requests target object X soon thereafter. However, if the user does not request target object X within t minutes of the pre-fetch, then the pre-fetch was worthless, and its cost is an added cost that must be borne (directly or indirectly) by the user. The first scenario therefore provides benefit at no cost, while the second scenario incurs a cost at no benefit. The system tries to favor the first scenario by pre-fetching only those files that the user will access anyway. Depending on the user's wishes, the system may pre-fetch either conservatively, where it controls costs by pre-fetching only files that the user is extremely likely to request explicitly (and that are relatively cheap to retrieve), or more aggressively, where it also pre-fetches files that the user is only moderately likely to request explicitly, thereby increasing both the total cost and (to a lesser degree) the total benefit to the user.

In the system described herein, pre-fetching for a user U is accomplished by the user's proxy server S. Whenever proxy server S retrieves a user-requested file F from an information server, it uses the identity of this file F and the characteristics of the user, as described below, to identify a group of other files G1 . . . Gk that the user is likely to access soon. The user's request for file F is said to "trigger" files G1. . . Gk. Proxy server S pre-fetches each of these triggered files Gi as follows:

1. Unless file Gi is already stored locally (e.g., due to previous pre-fetch), proxy server S retrieves file Gi from an appropriate information server and stores it locally.
2. Proxy server S timestamps its local copy of file Gi as having just been pre-fetched, so that file Gi will be retained in local storage for a minimum of approximately t minutes before being deleted.

Whenever user U (or, in principle, any other user registered with proxy server S) requests proxy server S to retrieve a file that has been pre-fetched and not yet deleted, proxy server S can then retrieve the file from local storage rather than from another server. In a variation on steps 1–2 above, proxy server S pre-fetches a file Gi somewhat differently, so that pre-fetched files are stored on the user's client processor q rather than on server S:

1. If proxy server S has not pre-fetched file Gi in the past t minutes, it retrieves file Gi and transmits it to user U's client processor q.
2. Upon receipt of the message sent in step 1, client q stores a local copy of file Gi if one is not currently stored.
3. Proxy server S notifies client q that client q should timestamp its local copy of file Gi; this notification may be combined with the message transmitted in step 1, if any.
4. Upon receipt of the message sent in step 3, client q timestamps its local copy of file Gi as having just been pre-fetched, so that file Gi will be retained in local storage for a minimum of approximately t minutes before being deleted.

During the period that client q retains file Gi in local storage, client q can respond to any request for file Gi (by user U or, in principle, any other user of client q) immediately and without the assistance of proxy server S.

The difficult task is for proxy server S, each time it retrieves a file F in response to a request, to identify the files G1 . . . Gk that should be triggered by the request for file F and pre-fetched immediately. Proxy server S employs a cost-benefit analysis, performing each pre-fetch whose benefit exceeds a user-determined multiple of its cost; the user may set the multiplier low for aggressive prefetching or high for conservative prefetching. These pre-fetches may be performed in parallel. The benefit of pre-fetching file Gi immediately is defined to be the expected number of seconds saved by such a pre-fetch, as compared to a situation where Gi is left to be retrieved later (either by a later pre-fetch, or by the user's request) if at all. The cost of pre-fetching file Gi immediately is defined to be the expected cost for proxy server S to retrieve file Gi, as determined for example by the network locations of server S and file Gi and by information provider charges, times 1 minus the probability that proxy server S will have to retrieve file Gi within t minutes (to satisfy either a later pre-fetch or the user's explicit request) if it is not pre-fetched now.

The above definitions of cost and benefit have some attractive properties. For example, if users tend to retrieve either file F1 or file F2 (say) after file F, and tend only in the former case to subsequently retrieve file G1, then the system will generally not pre-fetch G1 immediately after retrieving file F: for, to the extent that the user is likely to retrieve file F2, the cost of the pre-fetch is high, and to the extent that the user is likely to retrieve file F1 instead, the benefit of the pre-fetch is low, since the system can save as much or nearly as much time by waiting until the user chooses F1 and pre-fetching G1 only then.

The proxy server S may estimate the necessary costs and benefits by adhering to the following discipline:

1. Proxy server S maintains a set of disjoint clusters of the users in its user base, clustered according to their user profiles.
2. Proxy server S maintains an initially empty set PFT of "pre-fetch triples" <C,F,G>, where F and G are files, and where C identifies either a cluster of users or the set of all users in the user base of proxy server S. Each pre-fetch triple in the set PFT is associated with several stored values specific to that triple. Pre-fetch triples and their associated values are maintained according to the rules in 3 and 4.
3. Whenever a user U in the user base of proxy server S makes a request R2 for a file G, or a request R2 that triggers file G, then proxy server S takes the following actions:
   a. For C being the user cluster containing user U, and then again for C being the set of all users:
   b. For any request R0 for a file, say file F, made by user U during the t minutes strictly prior to the request R2:
   c. If the triple <C,F,G> is not currently a member of the set PFT, it is added to the set PFT with a count of 0, a trigger-count of 0, la target-count of 0, a total benefit of 0, and a timestamp whose value is the current date and time.
   d. The count of the triple <C,F,G> is increased by one.
   e. If file G was not triggered or explicitly retrieved by any request that user U made strictly in between requests R0 and R2, then the target-count of the triple <C,F,G> is increased by one.
   f. If request R2 was a request for file G, then the total benefit of triple <C,F,G> is increased either by the time elapsed between request R0 and request R2, or by the expected time to retrieve file G, whichever is less.
   g. If request R2 was a request for file G, and G was triggered or explicitly retrieved by one or more requests that user U made strictly in between requests R0 and R2, with R1 denoting the earliest such request, then the total benefit of triple <C,F,G> is decreased either by the time elapsed between request R1 and request R2, or by the expected time to retrieve file G, whichever is less.
4. If a user U requests a file F, then the trigger-count is incremented by one for each triple currently in the set PFT such that the triple has form <C,F,G>, where user U is in the set or cluster identified by C.
5. The "age" of a triple <C,F,G> is defined to be the number of days elapsed between its timestamp and the current date and time. If the age of any triple <C,F,G> exceeds a fixed constant number of days, and also exceeds a fixed constant multiple of the triple's count, then the triple may be deleted from the set PFT.

Proxy server S can therefore decide rapidly which files G should be triggered by a request for a given file F from a given user U, as follows.

1. Let C0 be the user cluster containing user U, and C1 be the set of all users.
2. Server S constructs a list L of all triples <C0,F,G> such that <C0,F,G> appears in set PFT with a count exceeding a fixed threshold.
3. Server S adds to list L all triples <C1,F,G> such that <C0,F,G> does not appear on list L and <C1,F,G> appears in set PFT with a count exceeding another fixed threshold.
4. For each triple <C,F,G> on list L:
5. Server S computes the cost of triggering file G to be expected cost of retrieving file Gi, times 1 minus the quotient of the target-count of <C,F,G> by the trigger-count of <C,F,G>.
6. Server S computes the benefit of triggering file G to be the total benefit of <C,F,G> divided by the count of <C,F,G>.
7. Finally, proxy server S uses the computed cost and benefit, as described earlier, to decide whether file G should be triggered. The approach to pre-fetching just described has the advantage that all data storage and manipulation concerning pre-fetching decisions by proxy server S is handled locally at proxy server S. However, this "user-based" approach does lead to duplicated storage and effort across proxy servers, as well as incomplete data at each individual proxy server. That is, the information indicating what files are frequently retrieved after file F is scattered in an uncoordinated way across numerous proxy servers. An alternative, "file-based" approach is to store all such information with file F itself The difference is as follows. In the user-based approach, a pre-fetch triple <C,F,G> in server S's set PFT may mention any file F and any file G on the network, but is restricted to clusters C that are subsets of the user base of server S. By contrast, in the file-based approach, a pre-fetch triple <C,F,G> in server S's set PFT may mention any user cluster C and any file G on the network, but is restricted to files F that are stored on server S. (Note that in the file-based approach, user clustering is network wide, and user clusters may include users from different proxy servers.) When a proxy server S2 sends a request to server S to retrieve file F for a user U, server S2 indicates in this message the user Us user cluster C0, as well as the user U's value for the user-determined multiplier that is used in cost-benefit analysis. Server S can use this information, together with all its triples in its set PFT of the form <C0,F,G> and <C1,F,G>, where C1 is the set of all users everywhere on the network, to determine (exactly as in the user-based approach) which files G1 . . . Gk are triggered by the request for file F. When server S sends file F back to proxy server S2, it also sends this list of files G1 . . . Gk, so that proxy server S2 can proceed to pre-fetch files G1 . . . Gk.

The file-based approach requires some additional data transmission. Recall that under the user-based approach, server S must execute steps 3c–3g above for any ordered pair of requests R0 and R2 made within t minutes of each other by a user who employs server S as a proxy server. Under the file-based approach, server S must execute steps 3c–3g above for any ordered pair of requests R0 and R2 made within t minutes of each other, by any user on the network, such that R0 requests a file stored on server S. Therefore, when a user makes a request R2, the user's proxy server must send a notification of request R2 to all servers S such that, during the preceding t minutes (where the variable t may now depend on server S), the user has made a request R0 for a file stored on server S. This notification need not be sent immediately, and it is generally more efficient for each proxy server to buffer up such notifications and send them periodically in groups to the appropriate servers.

Access And Reachability Control of Users and User-Specific Information

Although users' true identities are protected by the use of secure mix paths, pseudonymity does not guarantee complete privacy. In particular, advertisers can in principle employ user-specific data to barrage users with unwanted solicitations. The general solution to this problem is for proxy server S2 to act as a representative on behalf of each user in its user base, permitting access to the user and the user's private data only in accordance with criteria that have been set by the user. Proxy server S2 can restrict access in two ways:

1. The proxy server S2 may restrict access by third parties to server S2's pseudonymous database of user-specific information. When a third party such as an advertiser sends a message to server S2 requesting the release of user-specific information for a pseudonym P, server S2 refuses to honor the request unless the message includes credentials for the accessor adequate to prove that the accessor is entitled to this information. The user associated with pseudonym P may at any time send signed control messages to proxy server S2, specifying the credentials or Boolean combinations of credentials that proxy server S2 should thenceforth consider to be adequate grounds for releasing a specified subset of the information associated with pseudonym P. Proxy server S2 stores these access criteria with its database record for pseudonym P. For example, a user might wish to proxy server S2 to release purchasing information only to selected information providers, to charitable organizations (that is, organizations that can provide a government-issued credential that is issued only to registered charities), and to market researchers who have paid user U for the right to study user U's purchasing habits.

2. The proxy server S2 may restrict the ability of third parties to send electronic messages to the user. When a third party such as an advertiser attempts to send information (such as a textual message or a request to enter into spoken or written real-time communication) to pseudonym P, by sending a message to proxy server S2 requesting proxy server S2 to forward the information to the user at pseudonym P, proxy server S2 will refuse to honor the request, unless the message includes credentials for the accessor adequate to meet the requirements the user has chosen to impose, as above, on third parties who wish to send information to the user. If the message does include adequate credentials, then proxy server S2 removes a single-use pseudonymous return address envelope from it s database record for pseudonym P, and uses the envelope to send a message containing the specified information along a secure mix path to the user of pseudonym P. If the envelope being used is the only envelope stored for pseudonym P, or more generally if the supply of such envelopes is low, proxy server S2 adds a notation to this message before sending it, which notation indicates to the user's local server that it should send additional envelopes to proxy server S2 for future use.

In a more general variation, the user may instruct the proxy server S2 to impose more complex requirements on the granting of requests by third parties, not simply boolean combinations of required credentials. The user may impose any Boolean combination of simple requirements that may include, but are not limited to, the following:

(a.) the accessor (third party) is a particular party (b.) the accessor has provided a particular credential (c.) satisfying the request would involve disclosure to the accessor of a certain fact about the user's user profile (d.) satisfying the request would involve disclosure to the accessor of the user's target profile interest summary (e.) satisfying the request would involve disclosure to the accessor of statistical summary data, which data are computed from the user's user profile or target profile interest summary together with the user profiles and target profile interest summaries of at least n other users in the user base of the proxy server (f.) the content of the request is to send the user a target object, and this target object has a particular attribute (such as high reading level, or low vulgarity, or an authenticated Parental Guidance rating from the MPAA)

(g.) the content of the request is to send the user a target object, and this target object has been digitally signed with a particular private key (such as the private key used by the National Pharmaceutical Association to certify approved documents)

(h.) the content of the request is to send the user a target object, and the target profile has been digitally signed by a profile authentication agency, guaranteeing that the target profile is a true and accurate profile of the target object it claims to describe, with all attributes authenticated.

(i.) the content of the request is to send the user a target object, and the target profile of this target object is within a specified distance of a particular search profile specified by the user (j.) the content of the request is to send the user a target object, and the proxy server S2, by using the user's stored target profile interest summary, estimates the user's likely interest in the target object to be above a specified threshold (k.) the accessor indicates its willingness to make a particular payment to the user in exchange for the fulfillment of the request The steps required to create and maintain the user's access-control requirements are as follows:

1. The user composes a boolean combination of predicates that apply to requests; the resulting complex predicate should be true when applied to a request that the user wants proxy server S2 to honor, and false otherwise. The complex predicate may be encoded in another form, for efficiency.

2. The complex predicate is signed with $SK_P$, and transmitted from the user's client processor C3 to the proxy server S2 through the mix path enclosed in a packet that also contains the user's pseudonym P.

3. The proxy server S2 receives the packet, verifies its authenticity using $PK_P$ and stores the access control instructions specified in the packet as part of its database record for pseudonym P.

The proxy server S2 enforces access control as follows:

1. The third party (accessor) transmits a request to proxy server S2 using the normal point-to-point connections provided by the network N. The request may be to access the target profile interest summaries associated with a set of pseudonyms P1 ... Pn, or to access the user profiles associated with a set of pseudonyms P1 ... Pn, or to forward a message to the users associated with pseudonyms P1 ... Pn. The accessor may explicitly specify the pseudonyms P1 ... Pn, or may ask that P1 ... Pn be chosen to be the set of all pseudonyms registered with proxy server S2 that meet specified conditions.

2. The proxy server S2 indexes the database record for each pseudonym Pi (1<=I<=n), retrieves the access requirements provided by the user associated with Pi, and determines whether and how the transmitted request should be satisfied for Pi. If the requirements are satisfied, S2 proceeds with steps 3a–3c.

3a. If the request can be satisfied but only upon payment of a fee, the proxy server S2 transmits a payment request to the accessor, and waits for the accessor to send the payment to the proxy server S2. Proxy server S2 retains a service fee and forwards the balance of the payment to the user associated with pseudonym Pi, via an anonymous return packet that this user has provided.

3b. If the request can be satisfied but only upon provision of a credential, the proxy server S2 transmits a credential request to the accessor, and waits for the accessor to send the credential to the proxy server S2.

3c. The proxy server S2 satisfies the request by disclosing user-specific information to the accessor, by providing the accessor with a set of single-use envelopes to communicate directly with the user, or by forwarding a message to the user, as requested.

4. Proxy server S2 optionally sends a message to the accessor, indicating why each of the denied requests for P1 ... Pn was denied, and/or indicating how many requests were satisfied.

5. The active and/or passive relevance feedback provided by any user U with respect to any target object sent by any path from the accessor is tabulated by the above-described tabulating process resident on user U's client processor C3. As described above, a summary of such information is periodically transmitted to the proxy server S2 to enable the proxy server S2 to update that user's target profile interest summary and user profile.

The access control criteria can be applied to solicited as well as unsolicited transmissions. That is, the proxy server can be used to protect the user from inappropriate or misrepresented target objects that the user may request. If the user requests a target object from an information server, but the target object turns out not to meet the access control criteria, then the proxy server will not permit the information server to transmit the target object to the user, or to charge the user for such transmission. For example, to guard against target objects whose profiles have been tampered with, the user may specify an access control criterion that requires the provider to prove the target profile's accuracy by means of a digital signature from a profile authentication agency. As another example, the parents of a child user may instruct the proxy server that only target objects that have been digitally signed by a recognized child protection organization may be transmitted to the user; thus, the proxy server will not let the user retrieve pornography, even from a rogue information server that is willing to provide pornography to users who have not supplied an adulthood credential.

Distribution of Information with Multicast Trees

Figure 4:
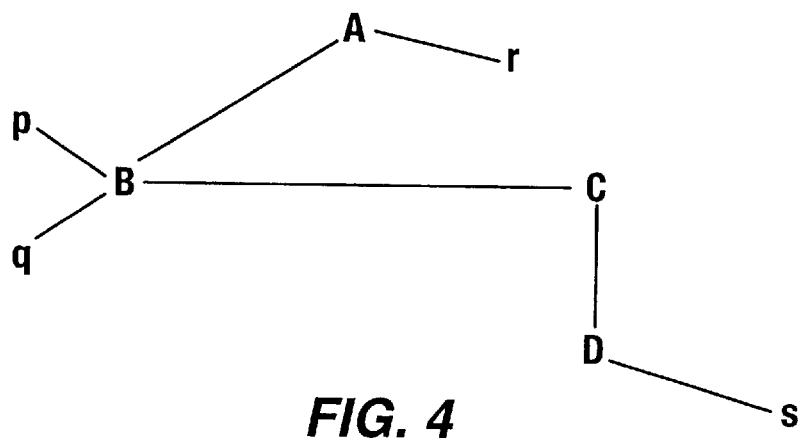

The graphical representation of the network N presented in FIG. 3 shows that at least one of the data communications links can be eliminated, as shown in FIG. 4, while still enabling the network N to transmit messages among all the servers A–D. By elimination, we mean that the link is unused in the logical design of the network, rather than a physical disconnection of the link. The graphs that result when all redundant data communications links are eliminated are termed "trees" or "connected acyclic graphs." A graph where a message could be transmitted by a server through other servers and then return to the transmitting server over a different originating data communications link is termed a "cycle." A tree is thus an acyclic graph whose edges (links) connect a set of graph "nodes" (servers). The tree can be used to efficiently broadcast any data file to selected servers in a set of interconnected servers.

The tree structure is attractive in a communications network because much information distribution is multicast in nature—that is, a piece of information available at a single source must be distributed to a multiplicity of points where the information can be accessed. This technique is widely known: for example, "FAX trees" are in common use in political organizations, and multicast trees are widely used in distribution of multimedia data in the Internet; for example, see "Scalable Feedback Control for Multicast Video Distribution in the Internet," (Jean - Chrysostome Bolot, Thierry Turletti, & Ian Wakeman, Computer Communication Review, Vol. 24, # 4, October '94, Proceedings of SIGCOMM'94, pp. 58–67) or "An Architecture For Wide-Area Multicast Routing," (Stephen Deering, Deborah Estrin, Dino Farinacci, Van Jacobson, Ching-Gung Liu, & Liming Wei, Computer Communication Review, Vol. 24, #4, October '94, Proceedings of SIGCOMM'94, pp. 126–135). While there are many possible trees that can be overlaid on a graph representation of a network, both the nature of the networks (e.g., the cost of transmitting data over a link) and their use (for example, certain nodes may exhibit more frequent intercommunication) can make one choice of tree better than another for use as a multicast tree. One of the most difficult problems in practical network design is the construction of "good" multicast trees, that is, tree choices which exhibit low cost (due to data not traversing links unnecessarily) and good performance (due to data frequently being close to where it is needed)

Constructing a Multicast Tree

Algorithms for constructing multicast trees have either been ad-hoc, as is the case of the Deering, et al. Internet multicast tree, which adds clients as they request service by grafting them into the existing tree, or by construction of a minimum cost spanning tree. A distributed algorithm for creating a spanning tree (defined as a tree that connects, or "spans," all nodes of the graph) on a set of Ethernet bridges was developed by Radia Perlman ("Interconnections: Bridges and Routers," Radia Perlman, Addison-Wesley, 1992). Creating a minimal-cost spanning tree for a graph depends on having a cost model for the arcs of the graph (corresponding to communications links in the communications network). In the case of Ethernet bridges, the default cost (more complicated costing models for path costs are discussed on pp. 72–73 of Perlman) is calculated as a simple distance measure to the root; thus the spanning tree minimizes the cost to the root by first electing a unique root and then constructing a spanning tree based on the distances from the root. In this algorithm, the root is elected by recourse to a numeric ID contained in "configuration messages": the server whose ID has minimum numeric value is chosen as the root. Several problems exist with this algorithm in general. First, the method of using an ID does not necessarily select the best root for the nodes interconnected in the tree. Second, the cost model is simplistic.

We first show how to use the similarity-based methods described above to select the servers most interested in a group of target objects, herein termed "core servers" for that group. Next we show how to construct an unrooted multicast tree that can be used to broadcast files to these core servers. Finally, we show how files corresponding to target objects are actually broadcast through the multicast tree at the initiative of a client, and how these files are later retrieved from the core servers when clients request them.

Since the choice of core servers to distribute a file to depends on the set of users who are likely to retrieve the file (that is, the set of users who are likely to be interested in the corresponding target object), a separate set of core servers and hence a separate multicast tree may be used for each topical group of target objects. Throughout the description below, servers may communicate among themselves through any path over which messages can travel; the goal of each multicast tree is to optimize the multicast distribution of files corresponding to target objects of the corresponding topic. Note that this problem is completely distinct from selecting a multiplicity of spanning trees for the complete set of interconnected nodes as disclosed by Sincoskie in U.S. Pat. No. 4,706,080 and the publication titled "Extended Bridge Algorithms for Large Networks" by W. D. Sincoskie and C. J. Cotton, published January 1988 in IEEE Network on pages 16–24. The trees in this disclosure are intentionally designed to interconnect a selected subset of nodes in the system, and are successful to the degree that this subset is relatively small.

Multicast Tree Construction Procedure

A set of topical multicast trees for a set of homogenous target objects may be constructed or reconstructed at any time, as follows. The set of target objects is grouped into a fixed number of topical clusters C1 . . . Cp with the methods described above, for example, by choosing C1 . . . Cp to be the result of a k-means clustering of the set of target objects, or alternatively a covering set of low-level clusters from a hierarchical cluster tree of these target objects. A multicast tree MT(c) is then constructed from each cluster C in C1 . . . Cp, by the following procedure:

1. Given a set of proxy servers, S1 . . . Sn, and a topical cluster C. It is assumed that a general multicast tree $MT_{full}$ that contains all the proxy servers S1 . . . Sn has previously been constructed by well-known methods.
2. Each pair <Si, C> is associated with a weight, w(Si, C), which is intended to covary with the expected number of users in the user base of proxy server Si who will subsequently access a target object from cluster C. This weight is computed by proxy server Si in any of several ways, all of which make use of the similarity measurement computation described herein.

One variation makes use of the following steps: (a) Proxy server Si randomly selects a target object T from cluster C. (b) For each pseudonym in its local database, with associated user U, proxy server Si applies the techniques disclosed above to user U's stored user profile and target profile interest summary in order to estimate the interest w(U, T) that user U has in t he selected target object T. The aggregate interest w(Si, T) that the user base of proxy server Si has in the target object T is defined to be the sum of these interest values w(U, T). Alternatively, w(Si, T) may be defined to be the sum of values s(w(U, T)) over all U in the user base. Here s(*) is a sigmoidal function that is close to 0 for small arguments and close to a constant $P_{max}$ for large arguments; thus s(w(U, T)) estimates the probability that user U will access target object T, which probability is assumed to be independent of the probability that any other user will access target object T. In a variation, w(Si T) is made to estimate the probability that at least one user from the user base of Si will access target object T: then w(Si, T) may be defined as the maximum of values w(U, T), or of 1 minus the product over the users U of the quantity (1−s(w(U, T))). (c)Proxy server Si repeats steps (a)–(b) for several target objects T selected randomly from cluster C, and averages the several values of w(Si, T) thereby computed in step (b) to determine the desired quantity w(Si, C), which quantity represents the expected aggregate interest by the user base of proxy server Si in the target objects of cluster C.

In another variation, where target profile interest summaries are embodied as search profile sets, the following procedure is followed to compute w(Si, C): (a). For each search profile $P_S$ in the locally stored search profile set of any user in the user base of proxy server Si, proxy server Si computes the distance $d(P_S, P_C)$ between the search profile and the cluster profile $P_C$ of cluster C. (b). w(SiC) is chosen to be the maximum value of $(-d(P_S, P_C)/r)$ across all such search profiles $P_S$, where r is computed as an affine function of the cluster diameter of cluster C. The slope and/or intercept of this affine function are chosen to be smaller (thereby increasing w(Si, C)) for servers Si for which the target object provider wishes to improve performance, as may be the case if the users in the user base of proxy server Si pay a premium for improved performance, or if performance at Si will otherwise be unacceptably low due to slow network connections.

In another variation, the proxy server Si is modified so that it maintains not only target profile interest summaries for each user in its user base, but also a single aggregate target profile interest summary for the entire user base. This aggregate target profile interest summary is determined in the usual way from relevance feedback, but the relevance feedback on a target object, in this case, is considered to be the frequency with which users in the user base retrieved the target object when it was new. Whenever a user retrieves a target object by means of a request to proxy server Si, the aggregate target profile interest summary for proxy server Si is updated. In this variation, $w(Si, C)$ is estimated by the following steps:

(a) Proxy server Si randomly selects a target object T from cluster C.

(b) Proxy server Si applies the techniques disclosed above to its stored aggregate target profile interest summary in order to estimate the aggregate interest $w(Si, T)$ that its aggregated user base had in the selected target object T, when new; this may be interpreted as an estimate of the likelihood that at least one member of the user base will retrieve a new target object similar to T.

(c) Proxy server Si repeats steps (a)–(b) for several target objects T selected randomly from cluster C, and averages the several values of $w(Si, T)$ thereby computed in step (b) to determine the desired quantity $w(Si, C)$, which quantity represents the expected aggregate interest by the user base of proxy server Si in the target objects of cluster C..

3. Those servers Si from among S1 ... Sn with the greatest weights $w(Si, C)$ are designated "core servers" for cluster C. In one variation, where it is desired to select a fixed number of core servers, those servers Si with the greatest values of $w(Si, C)$ are selected. In another variation, the value of $w(Si, C)$ for each server Si is compared against a fixed threshold $w_{min}$, and those servers Si such that $w(Si, C)$ equals or exceeds $w_{min}$ are selected as core servers. If cluster C represents a narrow and specialized set of target objects, as often happens when the clusters C1 ... Cp are numerous, it is usually adequate to select only a small number of core server cluster C, thereby obtaining substantial advantages in computational efficiency in steps 4–5 below 4. A complete graph $G(C)$ is constructed whose vertices are the designated core servers for cluster C. For each pair of core servers, the cost of transmitting a message between those core servers along the cheapest path is estimated, and the weight of the edge connecting those core servers is taken to be this cost. The cost is determined as a suitable function of average transmission charges, average transmission delay, and worst-case or near-worst-case transmission delay.

5. The multicast tree MTF(C) is computed by standard methods to be the minimum spanning tree (or a near-minimum spanning tree) for $G(C)$, where the weight of an edge between two core servers is taken to be the cost of transmitting a message between those two core servers. Note that MT(C) does not contain as vertices all proxy servers S1 ... Sn, but only the core servers for cluster C. p1 6. A message M is formed describing the cluster profile for cluster C, the core servers for cluster C and the topology of the multicast tree M(C) constructed on those core servers. Message M is broadcast to all proxy servers S1 ... Sn by means of the general multicast tree $MT_{full}$. Each proxy server Si, upon receipt of message M, extracts the cluster profile of cluster C, and stores it on a local storage device, together with certain other information that it determines from message M, as follows. If proxy server Si is named in message M as a core server for cluster C, then proxy server Si extracts and stores the subtree of MT(C) induced by all core servers whose path distance from Si in the graph MT(C) is less than or equal to d, where d is a constant positive integer (usually from 1 to 3). If message M does not name proxy server Si as a core server for MT(C), then proxy server Si extracts and stores a list of one or more nearby core servers that can be inexpensively contacted by proxy server Si over virtual point-to-point links.

In the network of FIG. 3, to illustrate the use of trees, as applied to the system of the present invention, consider the following simple example where it is assumed that client r provides on-line information for the network, such as an electronic newspaper. This information can be structured by client r into a prearranged form, comprising a number of files, each of which is associated with a different target object. In the case of an electronic newspaper, the files can contain textual representations of stock prices, weather forecasts, editorials, etc. The system determines likely demand for the target objects associated with these files in order to optimize the distribution of the files through the network N of interconnected clients p–s and proxy servers A–D. Assume that cluster C consists of text articles relating to the aerospace industry; further assume that the target profile interest summaries stored at proxy servers A and B for the users at clients p and r indicate that these users are strongly interested in such articles. Then the proxy servers A and B are selected as core servers for the multicast tree MT(C). The multicast tree MT(C) is then computed to consist of the core servers, A and B, connected by an edge that represents the least costly virtual point-to-point link between A and B (either the direct path A–B or the indirect path A-C-B, depending on the cost).

Global Requests to Multicast Trees

One type of message that may be transmitted to any proxy server S is termed a "global request message." Such a message M triggers the broadcast of an embedded request R to all core servers in a multicast tree MT(C). The content of request R and the identity of cluster C are included in the message M, as is a field indicating that message M is a global request message. In addition, the message M contains a field $S_{last}$ which is unspecified except under certain circumstances described below, when it names a specific core server. A global request message M may be transmitted to proxy server S by a user registered with proxy server S, which transmission may take place along a pseudonymous mix path, or it may be transmitted to proxy server S from another proxy server, along a virtual point-to-point connection.

When a proxy server S receives a message M that is marked as a global request message, it acts as follows: 1. If proxy server S is not a core server for topic C, it retrieves its locally stored list of nearby core servers for topic C, selects from this list a nearby core server S, and transmits a copy of message M over a virtual point-to-point connection to core server S'. If this transmission fails, proxy server S repeats the procedure with other core servers on its list. 2. If proxy server S is a core server for topic C, it executes the following steps: (a) Act on the request R that is embedded in message M. (b) Set $S_{curr}$ to be S(C) Retrieve the locally stored subtree of MT(C), and extract from it a list L of all core servers that are directly linked to $S_{curr}$ in this subtree. (d) If the message M specifies a value for $S_{last}$ and $S_{last}$ appears on the list L, remove $S_{last}$ from the list L. Note that list L may be empty before this step, or may become empty as a result of this step. (e) For each server Si in list L, transmit a copy of message M from server S to server Si over a virtual point-to-point connection, where the $S_{last}$ field of the copy of message M has been altered to $S_{curr}$. If Si cannot be reached in a reasonable amount of time by any virtual point-to-point connection (for example, server Si is broken), recurse to step (c) above with $S_{orig}$ bound to $S_{curr}$ and $S_{curr}$ bound to $S\{\sub I\}$ for the duration of the recursion.

When server S' in step 1 or a server Si in step 2(e) receives a copy of the global request message M, it acts according to exactly the same steps. As a result, all core servers eventually receive a copy of global request message M and act on the embedded request R, unless some core servers cannot be reached. Even if a core server is unreachable, step (e) ensures that the broadcast can continue to other core servers in most circumstances, provided that d>1; higher values of d provide additional insurance against unreachable core servers.

Multicasting Files

The system for customized electronic information of desirable objects executes the following steps in order to introduce a new target object into the system. These steps are initiated by an entity E, which may be either a user entering commands via a keyboard at a client processor q, as illustrated in FIG. 3, or an automatic software process resident on a client or server processor q. 1. Processor q forms a signed request R, which asks the receiver to store a copy of a file F on its local storage device. File F, which is maintained by client q on storage at client q or on storage accessible by client q over the network, contains the informational content of or an identifying description of a target object, as described above. The request R also includes an address at which entity E may be contacted (possibly a pseudonymous address at some proxy server D), and asks the receiver to store the fact that file F is maintained by an entity at said address. 2. Processor q embeds request R in a message M1, which it pseudonymously transmits to the entity E's proxy server D as described above. Message M1 instructs proxy server D to broadcast request R along an appropriate multicast tree. 3. Upon receipt of message M1, proxy server D examines the doubly embedded file F and computes a target profile P for the corresponding target object. It compares the target profile P to each of the cluster profiles for topical clusters C1 . . . Cp described above, and chooses Ck to be the cluster with the smallest similarity distance to profile P. 4. Proxy server D sends itself a global request message M instructing itself to broadcast request R along the topical multicast tree MT(Ck). 5. Proxy server D notifies entity E through a pseudonymous communication that file F has been multicast along the topical multicast tree for cluster Ck.

As a result of the procedure that server D and other servers follow for acting on global request messages, step 4 eventually causes all core servers for topic Ck to act on request R and therefore store a local copy of file F. In order to make room for file F on its local storage device, a core server Si may have to delete a less useful file. There are several ways to choose a file to delete. One option, well known in the art, is for Si to choose to delete the least recently accessed file. In another variation, Si deletes a file that it believes few users will access. In this variation, whenever a server Si stores a copy of a file F, it also computes and stores the weight $w(Si, C_F)$, where $C_F$ is a cluster consisting of the single target object associated with file F. Then, when server Si needs to delete a file, it chooses to delete the file F with the lowest weight $w(Si, C_F)$. To reflect the fact that files are accessed less as they age, server Si periodically multiplies its stored value of $w(Si, C_F)$ by a decay factor, such as 0.95, for each file F that it then stores. Alter natively, instead of using a decay factor, server Si may periodically recompute aggregate interest $w(Si, C_F)$ for each file F that it stores; the aggregate interest changes over time because target objects typically have an age attribute that the system considers in estimating user interest, as described above.

If entity E later wishes to remove file F from the network, for example because it has just multicast an updated version, it pseudonymously transmits a digitally signed global request message to proxy server D, requesting all proxy servers in the multicast tree MT(Ck) to delete any local copy of file F that they may be storing.

Queries to Multicast Trees

In addition to global request messages, another type of message that may be transmitted to any proxy server S is termed a "query message." When transmitted to a proxy server, a query message causes a reply to be sent to the originator of the message; this reply will contain an answer to a given query Q if any of the servers in a given multicast tree MT(C) are able to answer it, and will otherwise indicate that no answer is available. The query and the cluster C are named in the query message. In addition, the query message contains a field $S_{last}$ which is unspecified except under certain circumstances described below, when it names a specific core server. When a proxy server S receives a message M that is marked as a query message, it acts as follows: 1. Proxy server S sets $A_r$ to be the return address for the client or server that transmitted message M to server S. $A_r$ may be either a network address or a pseudonymous address 2. If proxy server S is not a core server for cluster C, it retrieves its locally stored list of nearby core servers for topic C, selects from this list a nearby core server S', and transmits a copy of the locate message M over a virtual point-to-point connection to core server S'. If this transmission fails, proxy server S repeats the procedure with other core servers on its list. Upon receiving a reply, it forwards this reply to address $A_r$. 3. If proxy server S is a core server for cluster C, and it is able to answer query Q using locally stored information, then it transmits a "positive" reply to $A_r$ containing the answer. 4. If proxy server S is a core server for topic C, but it is unable to answer query Q using locally stored information, then it carries out a parallel depth-first search by executing the following steps: (a) Set L to be the empty list. (b) Retrieve the locally stored subtree of MT(C). For each server Si directly linked to $S_{curr}$ in this subtree, other than $S_{last}$ (if specified), add the ordered pair (Si, S) to the list L. (c) If L is empty, transmit a "negative" reply to address $A_r$ saying that server S cannot locate an answer to query Q, and terminate the execution of step 4; otherwise proceed to step (d). (d) Select a list L1 of one or more server pairs (Ai, Bi) from the list L. For each server pair (Ai, Bi) on the list L1, form a locate message M(Ai, Bi), which is a copy of message M whose $S_{last}$ field has been modified to specify Bi, and transmit this message M(Ai, Bi) to server Ai over a virtual point-to-point connection. (e) For each reply received (by S) to a message sent in step (d), act as follows: (I) If a "positive" reply arrives to a locate message M(Ai, Bi), then forward this reply to $A_r$ and terminate step 4, immediately. (ii) If a "negative" reply arrives to a locate message M(Ai, Bi), then remove the pair (Ai, Bi) from the list L1. (iii) If the message M(Ai, Bi) could not be successfully delivered to Ai, then remove the pair (Ai, Bi) from the list L1, and add the pair (Ci, Ai) to the list L1 for each Ci other than Bi that is directly linked to Ai in the locally stored subtree of MT(C). (f) Once L1 no longer contains any pair (Ai, Bi) for which a message M(Ai, Bi) has been sent, or after a fixed period of time has elapsed, return to step (c).

Retrieving Files from a Multicast Tree

When a processor q in the network wishes to retrieve the file associated with a given target object, it executes the following steps. These steps are initiated by an entity E, which may be either a user entering commands via a keyboard at a client q, as illustrated in FIG. 3, or an automatic software process resident on a client or server processor q. 1. Processor q forms a query Q that asks whether the recipient (a core server for cluster C) still stores a file F that was previously multicast to the multicast tree MT(C); if so, the recipient server should reply with its own server name. Note that processor q must already know the name of file F and the identity of cluster C; typically, this information is provided to entity E by a service such as the news clipping service or browsing system described below, which must identify files to the user by (name, multicast topic) pair. 2. Processor q forms a query message M that poses query Q to the multicast tree MT(C). 3. Processor q pseudonymously transmits message M to the user's proxy server D, as described above. 4. Processor q receives a response M2 to message M. 5. If the response M2 is "positive," that is, it names a server S that still stores file F, then processor q pseudonymously instructs the user's proxy server D to retrieve file F from server S. If the retrieval fails because server S has deleted file F since it answered the query, then client q returns to step 1. 6. If the response M2 is "negative," that is, it indicates that no server in MT(C) still stores file F, then processor q forms a query Q that asks the recipient for the address A of the entity that maintains file F; this entity will ordinarily maintain a copy of file F indefinitely. All core servers in MT(C) ordinarily retain this information (unless instructed to delete it by the maintaining entity), even if they delete file F for space reasons. Therefore, processor q should receive a response providing address A, whereupon processor q pseudonymously instructs the user's proxy server D to retrieve file F from address A.

When multiple versions of a file F exist on local servers throughout the data communication network N, but are not marked as alternate versions of the same file, the system's ability to rapidly locate files similar to F (by treating them as target objects and applying the methods disclosed in "Searching for Target Objects" above) makes it possible to find all the alternate versions, even if they are stored remotely. These related data files may then be reconciled by any method. In a simple instantiation, all versions of the data file would be replaced with the version that had the latest date or version number. In another instantiation, each version would be automatically annotated with references or pointers to the other versions.

NEWS CLIPPING SERVICE

Figure 5:
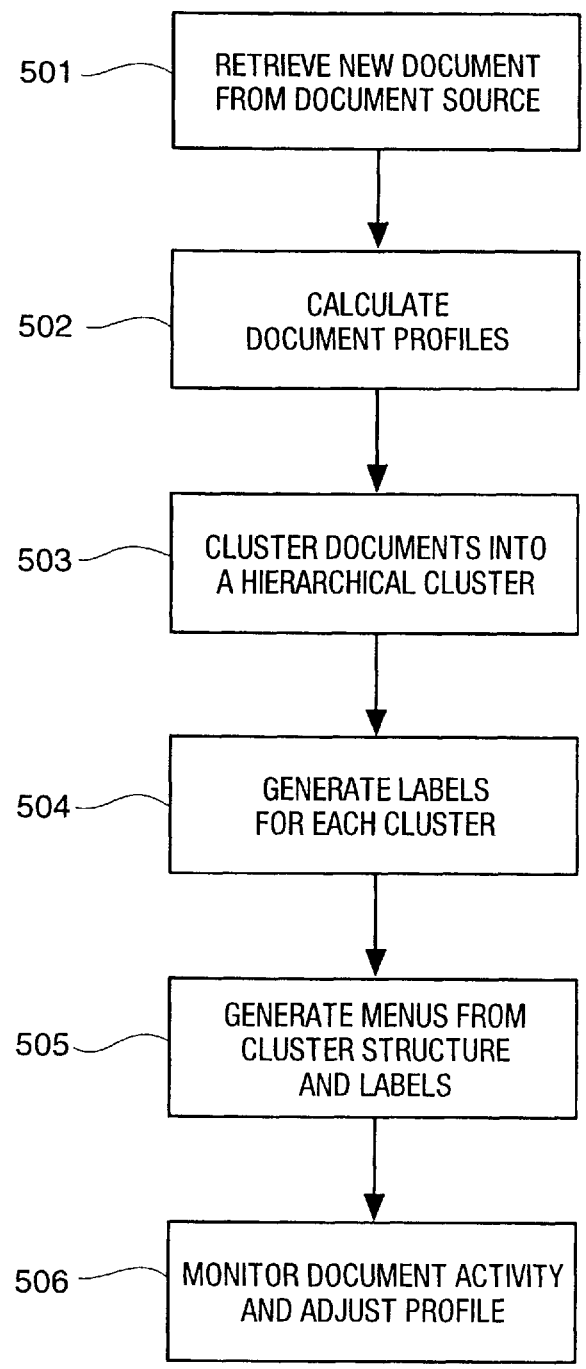
FIG. 5 illustrates in flow diagram form a method for automatically generating article profiles and an associated hierarchical menu system.

The system for customized electronic identification of desirable objects of the present invention can be used in the electronic media system of FIG. 1 to implement an automatic news clipping service which learns to select (filter) news articles to match a user's interests, based solely on which articles the user chooses to read. The system for customized electronic identification of desirable objects generates a target profile for each article that enters the electronic media system, based on the relative frequency of occurrence of the words contained in the article. The system for customized electronic identification of desirable objects also generates a search profile set for each user, as a function of the target profiles of the articles the user has accessed and the relevance feedback the user has provided on these articles. As new articles are received for storage on the mass storage systems $SS_1$–$SS_m$ of the information servers $I_1$–$I_m$, the system for customized electronic identification of desirable objects generates their target profiles. The generated target profiles are later compared to the search profiles in the users' search profile sets, and those new articles whose target profiles are closest (most similar) to the closest search profile in a user's search profile set are identified to that user for possible reading. The computer program providing the articles to the user monitors how much the user reads (the number of screens of data and the number of minutes spent reading), and adjusts the search profiles in the user's search profile set to more closely match what the user apparently prefers to read. The details of the method used by this system are disclosed in flow diagram form in FIG. 5. This method requires selecting a specific method of calculating user-specific search profile sets, of measuring similarity between two profiles, and of updating a user's search profile set (or more generally target profile interest summary) based on what the user read, and the examples disclosed herein are examples of the many possible implementations that can be used and should not be construed to limit the scope of the system.

Initialize Users' Search Profile Sets

The news clipping service instantiates target profile interest summaries as search profile sets, so that a set of high-interest search profiles is stored for each user. The search profiles associated with a given user change over time. As in any application involving search profiles, they can be initially determined for a new user (or explicitly altered by an existing user) by any of a number of procedures, including the following preferred methods: (1) asking the user to specify search profiles directly by giving keywords and/or numeric attributes, (2) using copies of the profiles of target objects or target clusters that the user indicates are representative of his or her interest, (3) using a standard set of search profiles copied or otherwise determined from the search profile sets of people who are demographically similar to the user.

Retrieve New Articles from Article Source

Articles are available on-line from a wide variety of sources. In the preferred embodiment, one would use the current days news as supplied by a news source, such as the AP or Reuters news wire. These news articles are input to the electronic media system by being loaded into the mass storage system $SS_4$ of an information server $S_4$. The article profile module 201 of the system for customized electronic identification of desirable objects can reside on the information server $S_4$ and operates pursuant to the steps illustrated in the flow diagram of FIG. 5, where, as each article is received at step 501 by the information server $S_4$, the article profile module 201 at step 502 generates a target profile for the article and stores the target profile in an article indexing memory (typically part of mass storage system $SS_4$ for later use in selectively delivering articles to users. This method is equally useful for selecting which articles to read from electronic news groups and electronic bulletin boards, and can be used as part of a system for screening and organizing electronic mail ("e-mail").

Calculate Article Profiles

A target profile is computed for each new article, as described earlier. The most important attribute of the target profile is a textual attribute that stands for the entire text of the article. This textual attribute is represented as described earlier, as a vector of numbers, which numbers in the preferred embodiment include the relative frequencies (TF/IDF scores) of word occurrences in this article relative to other comparable articles. The server must count the frequency of occurrence of each word in the article in order to compute the TF/IDF scores.

These news articles are then hierarchically clustered in a hierarchical cluster tree at step 503, which serves as a decision tree for determining which news articles are closest to the user's interest. The resulting clusters can be viewed as a tree in which the top of the tree includes all target objects and branches further down the tree represent divisions of the set of target objects into successively smaller subclusters of target objects. Each cluster has a cluster profile, so that at each node of the tree, the average target profile (centroid) of all target objects stored in the subtree rooted at that node is stored. This average of target profiles is computed over the representation of target profiles as vectors of numeric attributes, as described above.

Compare Current Articles' Target Profiles to a User's Search Profiles

Figure 11:
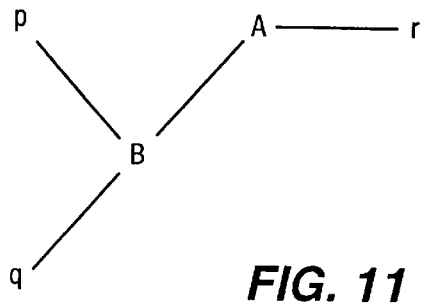
FIG. 11 illustrates a hierarchical cluster tree example.

The process by which a user employs this apparatus to retrieve news articles of interest is illustrated in flow diagram form in FIG. 11. At step 1101, the user logs into the data communication network N via their client processor $C_1$ and activates the news reading program. This is accomplished by the user establishing a pseudonymous data communications connection as described above to a proxy server $S_2$, which provides front-end access to the data communication network N. The proxy server $S_2$ maintains a list of authorized pseudonyms and their corresponding public keys and provides access and billing control. The user has a search profile set stored in the local data storage medium on the proxy server $S_2$. When the user requests access to "news" at step 1102, the profile matching module 203 resident on proxy server $S_2$ sequentially considers each search profile $P_k$ from the user's search profile set to determine which news articles are most likely of interest to the user. The news articles were automatically clustered into a hierarchical cluster tree at an earlier step so that the determination can be made rapidly for each user. The hierarchical cluster tree serves as a decision tree for determining which articles' target profiles are most similar to search profile $P_k$: the search for relevant articles begins at the top of the tree, and at each level of the tree the branch or branches are selected which have cluster profiles closest to $p_k$. This process is recursively executed until the leaves of the tree are reached, identifying individual articles of interest to the user, as described in the section "Searching for Target Objects" above.

A variation on this process exploits the fact that many users have similar interests. Rather than carry out steps 5–9 of the above process separately for each search profile of each user, it is possible to achieve added efficiency by carrying out these steps only once for each group of similar search profiles, thereby satisfying many users' needs at once. In this variation, the system begins by non-hierarchically clustering all the search profiles in the search profile sets of a large number of users. For each cluster k of search profiles, with cluster profile $P_k$, it uses the method described in the section "Searching for Target Objects" to locate articles with target profiles similar to $P_k$. Each located article is then identified as of interest to each user who has a search profile represented in cluster k of search profiles.

Notice that the above variation attempts to match clusters of search profiles with similar clusters of articles. Since this is a symmetrical problem, it may instead be given a symmetrical solution, as the following more general variation shows. At some point before the matching process commences, all the news articles to be considered are clustered into a hierarchical tree, termed the "target profile cluster tree," and the search profiles of all users to be considered are clustered into a second hierarchical tree, termed the "search profile cluster tree." The following steps serve to find all matches between individual target profiles from any target profile cluster tree and individual search profiles from any search profile cluster tree: 1. For each child subtree S of the root of the search profile cluster tree (or, let S be the entire search profile cluster tree if it contains only one search profile): 2. Compute the cluster profile $P_S$ to be the average of all search profiles in subtree S 3. For each subcluster (child subtree) T of the root of the target profile cluster tree (or, let T be the entire target profile cluster tree if it contains only one target profile): 4. Compute the cluster profile $P_T$ to be the average of all target profiles in subtree T 5. Calculate $d(P_S, P_T)$, the distance between $P_S$ and $P_T$ 6. If $d(P_S, P_T)<t$, a threshold, 7. If S contains only one search profile and T contains only one target profile, decl are a match between that search profile and that target profile, 8. otherwise recurse to step 1 to find all matches between search profiles in tree S and target profiles in tree T.

The threshold used in step 6 is typically an affine function or other function of the greater of the cluster variances (or cluster diameters) of S and T. Whenever a match is declared between a search profile and a target profile, the target object that contributed the target profile is identified as being of interest to the user who contributed the search profile. Notice that the process can be applied even when the set of users to be considered or the set of target objects to be considered is very small. In the case of a single user, the process reduces to the method given for identifying articles of interest to a single user. In the case of a single target object, the process constitutes a method for identifying users to whom that target object is of interest.

Present List of Articles to User

Once the profile correlation step is completed for a selected user or group of users, at step 1104 the profile processing module 203 stores a list of the identified articles for presentation to each user. At a user's request, the profile processing system 203 retrieves the generated list of relevant articles and presents this list of titles of the selected articles to the user, who can then select at step 1105 any article for viewing. (If no titles are available, then the first sentence(s) of each article can be used.) The list of article titles is sorted according to the degree of similarity of the article's target profile to the most similar search profile in the user's search profile set. The resulting sorted list is either transmitted in real time to the user client processor $C_1$, if the user is present at their client processor $C_1$, or can be transmitted to a user's mailbox, resident on the user's client processor $C_1$ or stored within the server $S_2$ for later retrieval by the user; other methods of transmission include facsimile transmission of the printed list or telephone transmission by means of a text-to-speech system. The user can then transmit a request by computer, facsimile, or telephone to indicate which of the identified articles the user wishes to review, if any. The user can still access all articles in any information server $S_4$ to which the user has authorized access, however, those lower on the generated list are simply further from the user's interests, as determined by the user's search profile set. The server $S_2$ retrieves the article from the local data storage medium or from an information server $S_4$ and presents the article one screen at a time to the user's client processor $C_1$. The user can at any time select another article for reading or exit the process.

Monitor Which Articles Are Read

The user's search profile set generator 202 at step 1107 monitors which articles the user reads, keeping track of how many pages of text are viewed by the user, how much time is spent viewing the article, and whether all pages of the article were viewed. This information can be combined to measure the depth of the user's interest in the article, yielding a passive relevance feedback score, as described earlier. Although the exact details depend on the length and nature of the articles being searched, a typical formula might be:

measure of article attractiveness =0.2 if the second page is accessed +0.2 if all pages are accessed +0.2 if more than 30 seconds was spent on the article +0.2 if more than one minute was spent on the article +0.2 if the minutes spent in the article are greater than half the number of pages.

The computed measure of article attractiveness can then be used as a weighting function to adjust the user's search profile set to thereby more accurately reflect the user's dynamically changing interests.

Update User Profiles

Updating of a user's generated search profile set can be done at step 1108 using the method described in copending U.S. patent application Ser. No. 08/346,425. When an article is read, the server $S_2$ shifts each search profile in the set slightly in the direction of the target profiles of those nearby articles for which the computed measure of article attractiveness was high. Given a search profile with attributes $u_{ik}$ from a user's search profile set, and a set of J articles available with attributes $d_{jk}$ (assumed correct for now), where I indexes users, j indexes articles, and k indexes attributes, user I would be predicted to pick a set of P distinct articles to minimize the sum of $d(u_I, b_j)$ over the chosen articles j. The user's desired attributes $u_{ik}$ and an article's attributes $d_{jk}$ would be some form of word frequencies such as TF/IDF and potentially other attributes such as the source, reading level, and length of the article, while $d(u_I, d_j)$ is the distance between these two attribute vectors (profiles) using the similarity measure described above. If the user picks a different set of P articles than was predicted, the user search profile set generation module should try to adjust u and/ord to more accurately predict the articles the user selected. In particular, $u_I$ and/or $d_j$ should be shifted to increase their similarity if user I was predicted not to select article j but did select it, and perhaps also to decrease their similarity if user I was predicted to select article j but did not. A preferred method is to shift u for each wrong prediction that user I will not select article j, using the formula: $U_{ik}' = u_{ik} - e(u_{ik} d_{jk})$ Here $u_I$ is chosen to be the search profile from user I's search profile set that is closest to target profile. If e is positive, this adjustment increases the match between user I's search profile set and the target profiles of the articles user I actually selects, by making $u_I$ closer to $d_j$ for the case where the algorithm failed to predict an article that the viewer selected. The size of e determines how many example articles one must see to change the search profile substantially. If e is too large, the algorithm becomes unstable, but for sufficiently small e, it drives u to its correct value. In general, e should be proportional to the measure of article attractiveness; for example, it should be relatively high if user I spends a long time reading article j. One could in theory also use the above formula to decrease the match in the case where the algorithm predicted an article that the user did not read, by making e negative in that case. However, there is no guarantee that u will move in the correct direction in that case. One can also shift the attribute weights $w_I$ of user I by using a similar algorithm: $W_{ik}' = (w_{ik} - e|u_{ik} - d_{jk}|)/\Sigma_k (w_{ik} - e|u_{ik} - d_{jk}|)$ This is particularly important if one is combining word frequencies with other attributes. As before, this increases the match if e is positive—for the case where the algorithm failed to predict an article that the user read, this time by decreasing the weights on those characteristics for which the user's target profile $u_I$ differs from the article's profile $d_j$. Again, the size of e determines how many example articles one must see to replace what was originally believed. Unlike the procedure for adjusting u, one also make use of the fact that the above algorithm decreases the match if e is negative—for the case where the algorithm predicted an article that the user did not read. The denominator of the expression prevents weights from shrinking to zero over time by renormalizing the modified weights $w_I'$ so that they sum to one. Both u and w can be adjusted for each article accessed. When e is small, as it should be, there is no conflict between the two parts of the algorithm. The selected user's search profile set is updated at step 1108.

Further Applications of the Filtering Technology

The news clipping service may deliver news articles (or advertisements and coupons for purchasables) to off-line users as well as to users who are on-line. Although the off-line users may have no way of providing relevance feedback, the user profile of an off-line user U may be similar to the profiles of on-line users, for example because user U is demographically similar to these other users, and the level of user U's interest in particular target objects can therefore be estimated via the general interest-estimation methods described earlier. In one application, the news clipping service chooses a set of news articles (respectively, advertisements and coupons) that are predicted to be of interest to user U, thereby determining the content of a customized newspaper (respectively, advertising/coupon circular) that may be printed and physically sent to user U via other methods. In general, the target objects included in the printed document delivered to user U are those with the highest median predicted interest among a group G of users, where group G consists of either the single off-line user U, a set of off-line users who are demographically similar to user U, or a set of off-line users who are in the same geographic area and thus on the same newspaper delivery route. In a variation, user group G is clustered into several subgroups G1 . . . Gk; an average user profile Pi is created from each subgroup Gi; for each article T and each user profile Pi, the interest in T by a hypothetical user with user profile Pi is predicted, and the interest of article T to group G is taken to be the maximum interest in article T by any of these k hypothetical users; finally, the customized newspaper for user group G is constructed from those articles of greatest interest to group G.

The filtering technology of the news clipping service is not limited to news articles provided by a single source, but may be extended to articles or target objects collected from any number of sources. For example, rather than identifying new news articles of interest, the technology may identify new or updated World Wide Web pages of interest. In a second application, termed "broadcast clipping," where individual users desire to broadcast messages to all interested users, the pool of news articles is replaced by a pool of messages to be broadcast, and these messages are sent to the broadcast-clipping-service subscribers most interested in them. In a third application, the system scans the transcripts of all real-time spoken or written discussions on the network that are currently in progress and designated as public, and employs the news-clipping technology to rapidly identify discussions that the user may be interested in joining, or to rapidly identify and notify users who may be interested in joining an ongoing discussion. In a fourth application, the method is used as a post-process that filters and ranks in order of interest the many target objects found by a conventional database search, such as a search for all homes selling for under $200,000 in a given area, for all 1994 news articles about Marcia Clark, or for all Italian-language films. In a fifth application, the method is used to filter and rank the links in a hypertext document by estimating the user's interest in the document or other object associated with each link. In a sixth application, paying advertisers, who may be companies or individuals, are the source of advertisements or other messages, which take the place of the news articles in the news clipping service. A consumer who buys a product is deemed to have provided positive relevance feedback on advertisements for that product, and a consumer who buys a product apparently because of a particular advertisement (for example, by using a coupon clipped from that advertisement) is deemed to have provided particularly high relevance feedback on that advertisement. Such feedback may be communicated to a proxy server by the consumer's client processor (if the consumer is making the purchase electronically), by the retail vendor, or by the credit-card reader (at the vendor's establishment) that the consumer uses to pay for the purchase. Given a database of such relevance feedback, the disclosed technology is then used to match advertisements with those users who are most interested in them; advertisements selected for a user are presented to that user by any one of several means, including electronic mail, automatic display on the users screen, or printing them on a printer at a retail establishment where the consumer is paying for a purchase. The threshold distance used to identify interest may be increased for a particular advertisement, causing the system to present that advertisement to more users, in accordance with the amount that the advertiser is willing to pay.

A further use of the capabilities of this system is to manage a user's investment portfolio. Instead of recommending articles to the user, the system recommends target objects that are investments. As illustrated above by the example of stock market investments, many different attributes can be used together to profile each investment. The user's past investment behavior is characterized in the user's search profile set or target profile interest summary, and this information is used to match the user with stock opportunities (target objects) similar in nature to past investments. The rapid profiling method described above may be used to determine a rough set of preferences for new users. Quality attributes used in this system can include negatively weighted attributes, such as a measurement of fluctuations in dividends historically paid by the investment, a quality attribute that would have a strongly negative weight for a conservative investor dependent on a regular flow of investment income. Furthermore, the user can set filter parameters so that the system can monitor stock prices and automatically take certain actions, such as placing buy or sell orders, or e-mailing or paging the user with a notification, when certain stock performance characteristics are met. Thus, the system can immediately notify the user when a selected stock reaches a predetermined price, without the user having to monitor the stock market activity. The user's investments can be profiled in part by a "type of investment" attribute (to be used in conjunction with other attributes), which distinguishes among bonds, mutual funds, growth stocks, income stocks, etc., to thereby segment the user's portfolio according to investment type. Each investment type can then be managed to identify investment opportunities and the user can identify the desired ratio of investment capital for each type.

E-mail Filter

In addition to the news clipping service described above, the system for customized electronic identification of desirable objects functions in an e\_mail environment in a similar but slightly different manner. The news clipping service selects and retrieves news information that would not otherwise reach its subscribers. But at the same time, large numbers of e-mail messages do reach users, having been generated and sent by humans or automatic programs. These users need an e-mail filter, which automatically processes the messages received. The necessary processing includes a determination of the action to be taken with each message, including, but not limited to: filing the message, notifying the user of receipt of a high priority message, automatically responding to a message. The e-mail filter system must not require too great an investment on the part of the user to learn and use, and the user must have confidence in the appropriateness of the actions automatically taken by the system. The same filter may be applied to voice mail messages or facsimile messages that have been converted into electronically stored text, whether automatically or at the user's request, via the use of well-known techniques for speech recognition or optical character recognition.

The filtering problem can be defined as follows: a message processing function MPF(*) maps from a received message (document) to one or more of a set of actions. The actions, which may be quite specific, may be either predefined or customized by the use r. Each action A has an appropriateness function $F_A$ (*,*) such that $F_A$ (U,D) returns a real number, representing the appropriateness of selecting action A on behalf of user U when user U is in receipt of message D. For example, if D comes from a credible source and is marked urgent, then discarding the message has a high cost to the user and has low appropriateness, so that $F_{discard}$ (U,D) is small, whereas alerting the user of receipt of the message is highly appropriate, so that $F_{alert}$ (U,D) is large. Given the determined appropriateness function, the function MPF(D) is used to automatically select the appropriate action or actions. As an example, the following set of actions might be useful:

1. Urgently notify user of receipt of message
2. Insert message into queue for user to read later
3. Insert message into queue for user to read later, and suggest that user reply
4. Insert message into queue for user to read later, and suggest that user forward it to individual R
5. Summarize message and insert summary into queue
6. Forward message to user's secretary
7. File message in directory X
8. File message in directory Y
9. Delete message (i.e., ignore message and do not save)
10. Notify sender that further messages on this subject are unwanted Notice that actions 8 and 9 in the sample list above are designed to filter out messages that are undesirable to the user or that are received from undesirable sources, such as pesky salespersons, by deleting the unwanted message and/ or sending a reply that indicates that messages of this type will not be read. The appropriateness functions must be tailored to describe the appropriateness of carrying out each action given the target profile for a particular document, and then a message processing function MPF can be found which is in some sense optimal with respect to the appropriateness function. One reasonable choice of MPF always picks the action with highest appropriateness, an d in cases where multiple actions are highly appropriate and are also compatible with each other, selects more than one action: for example, it may automatically reply to a message and also file the same message in directory X, so that the value of MPF(D) is the set \{reply, file in directory X\}. In cases where the appropriateness of even the most appropriate action falls below a user-specified threshold, as should happen for messages of an unfamiliar type, the system asks the user for confirmation of the action(s) selected by MPF. In addition, in cases where MPF selects one action over another action that is nearly as appropriate, the system also asks the user for confirmation: for example, mail should not be deleted if it is nearly as appropriate to let the user see it.

It is possible to write appropriateness functions manually, but the time necessary and lack of user expertise render this solution impractical. The automatic training of this system is preferable, using the automatic user profiling system described above. Each received document is viewed as a target object whose profile includes such attributes as the entire text of the document (represented as TF/IDF scores), document sender, date sent, document length, date of last document received from this sender, key words, list of other addressees, etc. It was disclosed above how to estimate an interest function on profiled target objects, using relevance feedback together with measured similarities among target objects and among users. In the con text of the e-mail filter, the task is to estimate several appropriateness functions $F_A$ (*,*), one per action. This is handled with exactly the same method as was used earlier to estimate the topical interest function f(*,*). Relevance feedback in this case is provided by the user's observed actions over time: whenever user U chooses action A on document D, either freely or by choosing or confirming an action recommended by the system, this is taken to mean that the appropriateness of action A on document D is high, particularly if the user takes this action A immediately after seeing document D. A presumption of no appropriateness (corresponding to the earlier presumption of no interest) is used so that action A is considered inappropriate on a document unless the user or similar users have taken action A on this document or similar documents. In particular, if no similar document has been seen, no action is considered especially appropriate, and the e-mail filter asks the user to specify the appropriate action or confirm that the action chosen by the e-mail filter is the appropriate one.

Thus, the e-mail filter learns to take particular actions on e-mail messages that have certain attributes or combinations of attributes. For example, messages from John Doe that originate in the (212) area code may prompt the system to forward a copy by fax transmission to a given fax number, or to file the message in directory X on the user's client processor. A variation allows active requests of this form from the user, such as a request that any message from John Doe be forwarded to a desired fax number until further notice. This active user input requires the use of a natural language or form-based interface for which specific commands are associated with particular attributes and combinations of attributes.

Update Notification

A very important and novel characteristic of the architecture is the ability to identify new or updated target objects that are relevant to the user, as determined by the user's search profile set or target profile interest summary. ("Updated target objects" include revised versions of documents and new models of purchasable goods.) The system may notify the user of these relevant target objects by an electronic notification such as an e-mail message or facsimile transmission. In the variation where the system sends an e-mail message, the user's e-mail filter can then respond appropriately to the notification, for instance, by bringing the notification immediately to the user's personal attention, or by automatically submitting an electronic request to purchase the target object named in the notification. A simple example of the latter response is for the e-mail filter to retrieve an on-line document at a nominal or zero charge, or request to buy a purchasable of limited quantity such as a used product or an auctionable.

ACTIVE NAVIGATION (BROWSING)

Browsing by Navigating Through a Cluster Tree

A hierarchical cluster tree imposes a useful organization on a collection of target objects. The tree is of direct use to a user who wishes to browse through all the target objects in the tree. Such a user may be exploring the collection with or without a well-specified goal. The tree's division of target objects into coherent clusters provides an efficient method whereby the user can locate a target object of interest. The user first chooses one of the highest level (largest) clusters from a menu, and is presented with a menu listing the subclusters of said cluster, whereupon the user may select one of these subclusters. The system locates the subcluster, via the appropriate pointer that was stored with the larger cluster, and allows the user to select one of its subclusters from another menu. This process is repeated until the user comes t o a leaf of the tree, which yields the details of an actual target object. Hierarchical trees allow rapid selection of one target object from a large set. In ten menu selections from menus of ten items (subclusters) each, one can reach $10^{10}$=10,000,000,000 (ten billion) items. In the preferred embodiment, the user views the menus on a computer screen or terminal screen and selects from them with a keyboard or mouse. However, the user may also make selections over the telephone, with a voice synthesizer reading the menus and the user selecting subclusters via the telephone's touch-tone keypad. In another variation, the user simultaneously maintains two connections to the server, a telephone voice connection and a fax connection; the server sends successive menus to the user by fax, while the user selects choices via the telephone's touch-tone keypad.

Just as user profiles commonly include an associative attribute indicating the user's degree of interest in each target object, it is useful to augment user profiles with an additional associative attribute indicating the user's degree of interest in each cluster in the hierarchical cluster tree. This degree of interest may be estimated numerically as the number of subclusters or target objects the user has selected from menus associated with the given cluster or its subclusters, expressed as a proportion of the total number of subclusters or target objects the user has selected. This associative attribute is particularly valuable if the hierarchical tree was built using "soft" or "fuzzy" clustering, which allows a subcluster or target object to appear in multiple clusters: if a target document appears in both the "sports" and the "humor" clusters, and the user selects it from a menu associated with the "humor" cluster, then the system increases its association between the user and the "humor" cluster but not its association between the user and the "sports" cluster.

Labeling Clusters

Since a user who is navigating the cluster tree is repeatedly expected to select one of several subclusters from a menu, these subclusters must be usefully labeled (at step 503), in such a way as to suggest their content to the human user. It is straightforward to include some basic information about each subcluster in its label, such as the number of target objects the subcluster contains (possibly just 1) and the number of these that have been added or updated recently. However, it is also necessary to display additional information that indicates the cluster's content. This content-descriptive information may be provided by a human, particularly for large or frequently accessed clusters, but it may also be generated automatically. The basic automatic technique is simply to display the cluster's "characteristic value" for each of a few highly weighted attributes. With numeric attributes, this may be taken to mean the cluster's average value for that attribute: thus, if the "year of release" attribute is highly weighted in predicting which movies a user will like, then it is useful to display average year of release as part of each cluster's label. Thus the user sees that one cluster consists of movies that were released around 1962, while another consists of movies from around 1982. For short textual attributes, such as "title of movie" or "title of document," the system can display the attribute's value for the cluster member (target object) whose profile is most similar to the cluster's profile (the mean profile for all members of the cluster), for example, the title of the most typical movie in the cluster. For longer textual attributes, a useful technique is to select those terms for which the amount by which the term's average TF/IDF score across members of the cluster exceeds the term's average TF/IDF score across all tar get objects is greatest, either in absolute terms or else as a fraction of the standard deviation of the term's TF/IDF score across all target objects. The selected terms are replaced with their morphological stems, eliminating duplicates (so that if both "slept" and "sleeping" were selected, they would be replaced by the single term "sleep") and optionally eliminating close synonyms or collocates (so that if both "nurse" and "medical" were selected, they might both be replaced by a single term such as "nurse," "medical," "medicine," or "hospital"). The resulting set of terms is displayed as part of the label. Finally, if freely redistributable thumbnail photographs or other graphical images are associated with some of the target objects in the cluster f or labeling purposes, then the system can display as part of the label the image or images whose associated target objects have target profiles most similar to the cluster profile.

Users' navigational patterns may provide some useful feedback as to the quality of the labels. In particular, if users often select a particular cluster to explore, but then quickly backtrack and try a different cluster, this may signal that the first cluster's label is misleading. Insofar as other terms and attributes can pro vide "next-best" alternative labels for the first cluster, such "next-best" labels can be automatically substituted for the misleading label. In addition, any user can locally relabel a cluster for his or her own convenience. Although a cluster label provided by a user is in general visible only to that user, it is possible to make global use of these labels via a "user labels" textual attribute for target objects, which attribute is defined for a given target object to be the concatenation of all label s provided by any user for any cluster containing that target object. This attribute influences similarity judgments: for example, it may induce the system to regard target articles in a cluster often labeled "Sports News" by users as being mildly similar to articles in an otherwise dissimilar cluster often labeled "International News" by users, precisely because the "user labels" attribute in each cluster profile is strongly associated with the term "News." The "user label" attribute is also used in the automatic generation of labels, just as other textual attributes are, so that if the user-generated labels for a cluster often include "Sports," the term "Sports" may be included in the automatically generated label as well.

It is not necessary for menus to be displayed as simple lists of labeled options; it is possible to display or print a menu in a form that shows in more detail the relation of the different menu options to each other. Thus, in a variation, the menu options are visually laid out in two dimensions or in a perspective drawing of three dimensions. Each option is displayed or printed as a textual or graphical label. The physical coordinates at which the options are displayed or printed are generated by the following sequence of steps: (1) construct for each option the cluster profile of the cluster it represents, (2) construct from each cluster profile its decomposition into a numeric vector, as described above, (3) apply singular value decomposition (SVD) to determine the set of two or three orthogonal linear axes along which these numeric vectors are most greatly differentiated, and (4) take the coordinates of each option to be the projected coordinates of that option's numeric vector along said axes. Step (3) may be varied to determine a set of, say, 6 axes, so that step (4) lays out the options in a 6-dimensional space; in this case the user may view the geometric projection of the 6-dimensional layout onto any plane passing through the origin, and may rotate this viewing plane in order to see differing configurations of the options, which emphasize similarity with respect to differing attributes in the profiles of the associated clusters. In the visual representation, the sizes of the cluster labels can be varied according to the number of objects contained in the corresponding clusters. In a further variation, all options from the parent menu are displayed in some number of dimensions, as just described, but with the option corresponding to the current menu replaced by a more prominent subdisplay of the options on the current menu; optionally, the scale of this composite display may be gradually increased over time, thereby increasing the area of the screen devoted to showing the options on the current menu, and giving the visual impression that the user is regarding the parent cluster and "zooming in" on the current cluster and its subclusters.

Further Navigational

It should be appreciated that a hierarchical cluster-tree may be configured with multiple cluster selections branching from each node or the same labeled clusters presented in the form of single branches for multiple nodes ordered in a hierarchy. In one variation, the user is able to perform lateral navigation between neighboring clusters as well, by requesting that the system search for a cluster whose cluster profile resembles the cluster profile of the currently selected cluster. If this type of navigation is performed at the level of individual objects (leaf ends), then automatic hyperlinks may be then created as navigation occurs. This is one way that nearest neighbor clustering navigation may be performed. For example, in a domain where target objects are home pages on the World Wide Web, a collection of such pages could be laterally linked to create a "virtual mall."

The simplest way to use the automatic menuing system described above is for the user to begin browsing at the top of the tree and moving to more specific subclusters. However, in a variation, the user optionally provides a query consisting of textual and/or other attributes, from which query the system constructs a profile in the manner described herein, optionally altering textual attributes as described herein before decomposing them into numeric attributes. Query profiles are similar to the search profiles in a user's search profile set, except that their attributes are explicitly specified by a user, most often for one-time usage, and unlike search profiles, they are not automatically updated to reflect changing interests. A typical query in the domain of text articles might have "Tell me about the relation between Galileo and the Medici family" as the value of its "text of article" attribute, and 8 as the value of its "reading difficulty" attribute (that is, 8th-grade level). The system uses the method of section "Searching for Target Objects" above to automatically locate a small set of one or more clusters with profiles similar to the query profile, for example, the articles they contain are written at roughly an 8th-grade level and tend to mention Galileo and the Medicis. The user may start browsing at any of these clusters, and can move from it to subclusters, superclusters, and other nearby clusters. For a user who is looking for something in particular, it is generally less efficient to start at the largest cluster and repeatedly select smaller subclusters than it is to write a brief description of what one is looking for and then to move to nearby clusters if the objects initially recommended are not precisely those desired.

Although it is customary in information retrieval systems to match a query to a document, an interesting variation is possible where a query is matched to an already answered question. The relevant domain is a customer service center, electronic newsgroup, or Better Business Bureau where questions are frequently answered. Each new question-answer pair is recorded for future reference as a target object, with a textual attribute that specifies the question together with the answer provided. As explained earlier with reference to document titles, the question should be weighted more heavily than the answer when this textual attribute is decomposed into TF/IDF scores. A query specifying "Tell me about the relation between Galileo and the Medici family" as the value of this attribute therefore locates a cluster of similar questions together with their answers. In a variation, each question-answer pair may be profiled with two separate textual attributes, one for the question and one for the answer. A query might then locate a cluster by specifying only the question attribute, or for completeness, both the question attribute and the (lower-weighted) answer attribute, to be the text "Tell me about the relation between Galileo and the Medici family."

The filtering technology described earlier can also aid the user in navigating among the target objects. When the system presents the user with a menu of subclusters of a cluster C of target objects, it can simultaneously present an additional menu of the most interesting target objects in cluster C, so that the user has the choice of accessing a subcluster or directly accessing one of the target objects. If this additional menu lists n target objects, then for each I between 1 and n inclusive, in increasing order, the $I^{th}$ most prominent choice on this additional menu, which choice is denoted Top(C,i), is found by considering all target objects in cluster C that are further than a threshold distance t from all of Top(C, 1), Top(C,2), ... Top(C, I-1), and selecting the one in which the user's interest is estimated to be highest. If the threshold distance t is 0, then the menu resulting from this procedure simply displays the n most interesting objects in cluster C, but the threshold distance may be increased to achieve more variety in the target objects displayed. Generally the threshold distance t is chosen to be an affine function or other function of the cluster variance or cluster diameter of the cluster C.

As a novelty feature, the user U can "masquerade" as another user V, such as a prominent intellectual or a celebrity supermodel; as long as user U is masquerading as user V, the filtering technology will recommend articles not according to user U's preferences, but rather according to user V's preferences. Provided that user U has access to the user-specific data of user V, for example because user V has leased these data to user U for a financial consideration, then user U can masquerade as user V by instructing user U's proxy server S to temporarily substitute user V's user profile and target profile interest summary for user U's. In a variation, user U has access to an average user profile and an composite target profile interest summary for a group G of users; by instructing proxy server S to substitute these for user U's user-specific data, user U can masquerade as a typical member of group G, as is useful in exploring group preferences for sociological, political, or market research. More generally, user U may "partially masquerade" as another user V or group G, by instructing proxy server S to temporarily replace user U's user-specific data with a weighted average of user U's user-specific data and the user-specific data for user V and group G.

Menu Organization

Although the topology of a hierarchical cluster tree is fixed by the techniques that build the tree, the hierarchical menu presented to the user for the user's navigation need not be exactly isomorphic to the cluster tree. The menu is typically a somewhat modified version of the cluster tree, reorganized manually or automatically so that the clusters most interesting to a user are easily accessible by the user. In order to automatically reorganize the menu in a user-specific way, the system first attempts automatically to identify existing clusters that are of interest to the user. The system may identify a cluster as interesting because the user often accesses target objects in that cluster—or, in a more sophisticated variation, because the user is predicted to have high interest in the cluster's profile, using the methods disclosed herein for estimating interest from relevance feedback.

Figure 9:
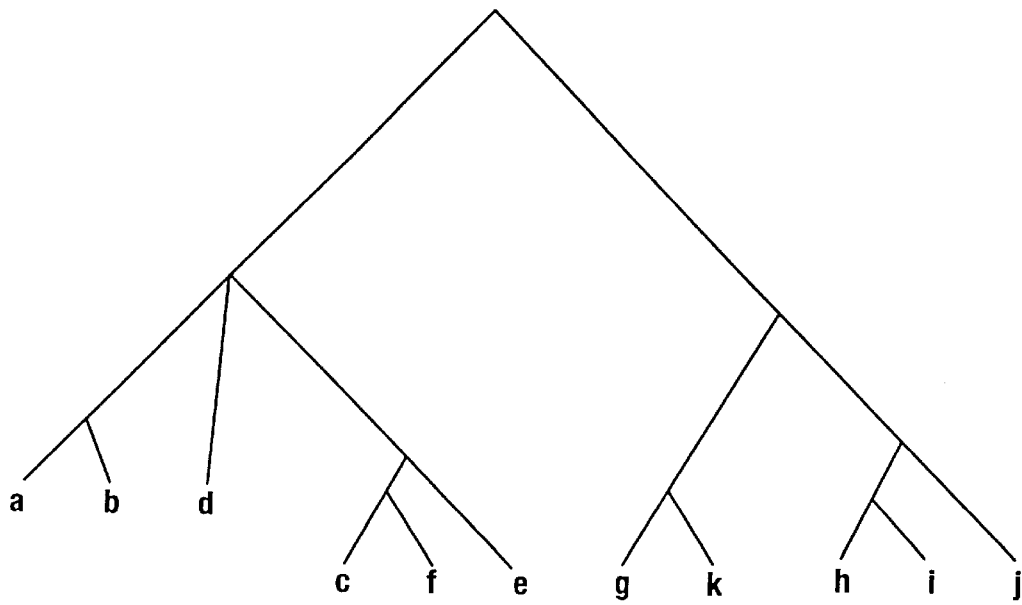
Figure 10:
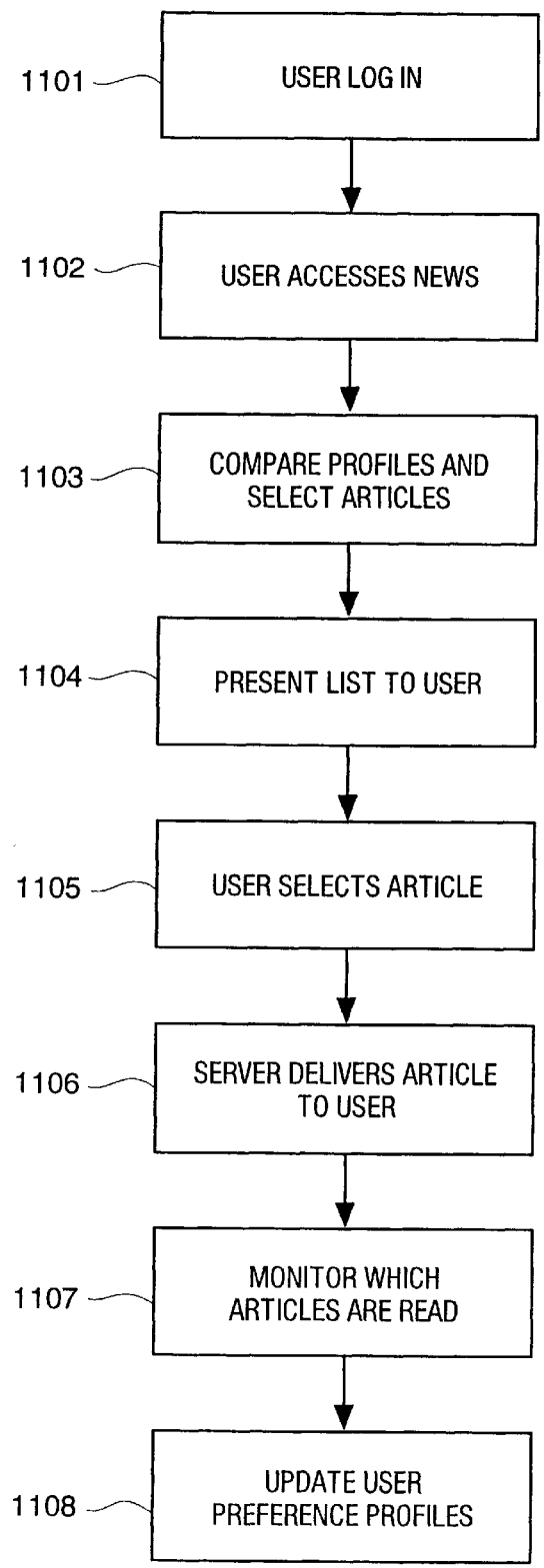
FIG. 10 illustrates in flow diagram form the operational steps taken by the system for customized electronic identification of desirable objects to screen articles for a user.

Several techniques can then be used to make interesting clusters more easily accessible. The system can at the user's request or at all times display a special list of the most interesting clusters, or the most interesting subclusters of the current cluster, so that the user can select one of these clusters based on its label and jump directly to it. In general, when the system constructs a list of interesting clusters in this way, the $I^{th}$ most prominent choice on the list, which choice is denoted Top(), is found by considering all appropriate clusters C that are further than a threshold distance t from all of Top(1), Top(2), ... Top(I-1), and selecting the one in which the user's interest is estimated to be highest. Here the threshold distance t is optionally dependent on the computed cluster variance or cluster diameter of the profiles in the latter cluster. Several techniques that reorganize the hierarchical menu tree are also useful. First, menus can be reorganized so that the most interesting subcluster choices appear earliest on the menu, or are visually marked as interesting; for example, their labels are displayed in a special color or type face, or are displayed together with a number or graphical image indicating the likely level of interest. Second, interesting clusters can be moved to menus higher in the tree, i.e., closer to the root of the tree, so that they are easier to access if th e user starts browsing at the root of the tree. Third, uninteresting clusters can be moved to menus lower in the tree, to make room for interesting clusters that are being moved higher. Fourth, clusters with an especially low interest score (representing active dislike) can simply be suppressed from the menus; thus, a user with children may assign an extremely negative weight to the "vulgarity" attribute in the determination of q, so that vulgar clusters and documents will not be available at all. As the interesting clusters and the documents in them migrate toward the top of the tree, a customized tree develops that can be more efficiently navigated by the particular user. If menus are chosen so that each menu item is chosen with approximately equal probability, then the expected number of choices the user has to make is minimized. If, for example, a user frequently accessed target objects whose profiles resembled the cluster profile of cluster (a, b, d) in FIG. 8 then the menu in FIG. 9 could be modified to show the structure illustrated in FIG. 10.

In the variation where the general techniques disclosed herein for estimating a user's interest from relevance feedback are used to identify interesting clusters, it is possible for a user U to supply "temporary relevance feedback" to indicate a temporary interest that is added to his or her usual interests. This is done by entering a query as described above, i.e., a set of textual and other attributes that closely match the user's interests of the moment . This query becomes "active," and affects the system's determination of interest in either of two ways. In one approach, an active query is treated as if it were any other target object, and by virtue of being a query, it is taken to have received relevance feedback that indicates especially high interest. In an alternative approach, target objects X whose target profiles are similar to an active query's profile are simply considered to have higher quality q(U, X), in that q(TJ, X) is incremented by a term that increases with target object X's similarity to the query profile. Either strategy affects the usual interest estimates: clusters that match user U's usual interests (and have high quality q(*)) are still considered to be of interest, and clusters w hose profiles are similar to an active query are adjudged to have especially high interest. Clusters that are similar to both the query and the user's usual interests are most interesting of all. The user may modify or deactivate an active query at any time while browsing. In addition, if the user discovers a target object or cluster X of particular interest while browsing, he or she may replace or augment the original (perhaps vague) query profile with the target profile of target object or cluster X, t hereby amplifying or refining the original query to indicate an particular interest in objects similar to X. For example, suppose the user is browsing through documents, and specifies an initial query containing the word "Lloyd's," so that the system predicts documents containing the word "Lloyd's" to be more interesting and makes them more easily accessible, even to the point of listing such documents or clusters of such documents, as described above. In particular, certain articles about insurance containing the phrase "Lloyd's of London" are made more easily accessible, as are certain pieces of Welsh fiction containing phrases like "Lloyd's father." The user browses while this query is active, and hits upon a useful article describing the relation of Lloyd's of London to other British insurance houses; by replacing or augmenting the query with the full text of this article, the user can turn the attention of the system to other documents that resemble this article, such as documents about British insurance houses, rather than Welsh folk tales.

In a system where queries are used, it is useful to include in the target profiles an associative attribute that records the associations between a target object and whatever terms are employed in queries used to find that target object. The association score of target object X with a particular query term T is defined to be the mean relevance feedback on target object X, averaged over just those accesses of target object X that were made while a query containing term T was active, multiplied by the negated logarithm of term T's global frequency in all queries. The effect of this associative attribute is to increase the measured similarity of two documents if they are good responses to queries that contain the same terms. A further maneuver can be used to improve the accuracy of responses to a query: in the summation used to determine the quality q(TJ, X) of a target object X, a term is included that is proportional to the sum of association scores between target object X and each term in the active query, if any, so that target objects that are closely associated with terms in an active query are determined to have higher quality and therefore higher interest for the user. To complement the system's automatic reorganization of the hierarchical cluster tree, the user can be given the ability to reorganize the tree manually, as he or she sees fit. Any changes are optionally saved on the user's local storage device so that they will affect the presentation of the tree in future sessions. For example, the user can choose to move or copy menu options to other menus, so that useful clusters can thereafter be chosen directly from the root menu of the tree or from other easily accessed or topically appropriate menus. In an other example, the user can select clusters $C_1$, $C_2$, ... $C_k$ listed on a particular menu M and choose to remove these clusters from the menu, replacing them on the menu with a single aggregate cluster M' containing all the target objects from clusters $C_1$, $C_2$, ... $C_k$. In this case, the immediate subclusters of new cluster M' are either taken to be clusters $C_1$, $C_2$, ... Ck themselves, or else, in a variation similar to the "scatter-gather" method, are automatically computed by clustering the set of all the subclusters of clusters $C_1$, $C_2$, ... $C_k$ according to the similarity of the cluster profiles of these subclusters.

Electronic Mall

In one application, the browsing techniques described above may be applied to a domain where the target objects are purchasable goods. When shoppers look for goods to purchase over the Internet or other electronic media, it is typically necessary to display thousands or tens of thousands of products in a fashion that helps consumers find the items they are looking for. The current practice is to use hand-crafted menus and sub-menus in which similar items are grouped together. It is possible to use the automated clustering and browsing methods described above to more effectively group and present the items. Purchasable items can be hierarchically clustered using a plurality of different criteria. Useful attributes for a purchasable item include but are not limited to a textual description and predefined category labels (if available), the unit price of the item, and an associative attribute listing the users who have bought this item in the past. Also useful is an associative attribute indicating which other items are often bought on the same shopping "trip" as this item; items that are often bought on the same trip will be judged similar with respect to this attribute, so tend to be grouped together. Retailers may be interested in utilizing a similar technique for purposes of predicting both the nature and relative quantity of items which are likely to be popular to their particular clientele. This prediction may be made by using aggregate purchasing records as the search profile set from which a collection of target objects is recommended. Estimated customer demand which is indicative of (relative) inventory quantity for each target object item is determined by measuring the cluster variance of that item compared to another target object item (which is in stock).

As described above, hierarchically clustering the purchasable target objects results in a hierarchical menu system, in which the target objects or clusters of target objects that appear on each menu can be labeled by names or icons and displayed in a two-dimensional or three-dimensional menu in which similar items are displayed physically near each other or on the same graphically represented "shelf." As described above, this grouping occurs both at the level of specific items (such as standard size Ivory soap or large Breck shampoo) and at the level of classes of items (such as soaps and shampoos). When the user selects a class of items (for instance, by clicking on it), then the more specific level of detail is displayed. It is neither necessary nor desirable to limit each item to appearing in one group; customers are more likely to find an object if it is in multiple categories.

Non-purchasable objects such as artwork, advertisements, and free samples may also be added to a display of purchasable objects, if they are associated with (liked by) substantially the same users as are the purchasable objects in the display.

Network Context of the Browsing System

The files associated with target objects are typically distributed across a large number of different servers S1–So and clients C1–Cn. Each file has been entered into the data storage medium at some server or client in any one of a number of ways, including, but not limited to: scanning, keyboard input, e-mail, FTP transmission, automatic synthesis from another file under the control of another computer program. While a system to enable users to efficiently locate target objects may store its hierarchical cluster tree on a single centralized machine, greater efficiency can be achieved if the storage of the hierarchical cluster tree is distributed across many machines in the network. Each cluster C, including single-member clusters (target objects), is digitally represented by a file F, which is multicast to a topical multicast tree MT(C1); here cluster C1 is either cluster C itself or some supercluster of cluster C. In this way, file F is stored at multiple servers, for redundancy. The file F that represents cluster C contains at least the following data:

1. The cluster profile for cluster C, or data sufficient to reconstruct this cluster profile. 2. The number of target objects contained in cluster C. 3. A human-readable label for cluster C, as described in section "Labeling Clusters" above. 4. If the cluster is divided into subclusters, a list of pointers to files representing the subclusters. Each pointer is an ordered pair containing naming, first, a file, and second, a multicast tree or a specific server where that file is stored. 5. If the cluster consists of a single target object, a pointer to the file corresponding to that target object.

The process by which a client machine can retrieve the file F from the multicast tree MT(C1) is described above in section "Retrieving Files from a Multicast Tree." Once it has retrieved file F, the client can perform further tasks pertaining to this cluster, such as displaying a labeled menu of subclusters, from which the user may select subclusters for the client to retrieve next.

The advantage of this distributed implementation is threefold. First, the system can be scaled to larger cluster sizes and numbers of target objects, since much more searching and data retrieval can be carried out concurrently. Second, the system is fault-tolerant in that partial matching can be achieved even if portions of the system are temporarily unavailable. It is important to note here the robustness due to redundancy inherent in our design—data is replicated at tree sites so that even if a server is down, the data can be located elsewhere.

The distributed hierarchical cluster tree can be created in a distributed fashion, that is, with the participation of many processors. Indeed, in most applications it should be recreated from time to time, because as users interact with target objects, the associative attributes in the target profiles of the target objects change to reflect these interactions; the system's similarity measurements can therefore take these interactions into account when judging similarity, which allows a more perspicuous cluster tree to be built The key technique is the following procedure for merging n disjoint cluster trees, represented respectively by files F1 . . . Fn in distributed fashion as described above, into a combined cluster tree that contains all the target objects from all these trees. The files F1 . . . Fn are described above, except that the cluster labels are not included in the representation. The following steps are executed by a server S1, in response to a request message from another server S0, which request message includes pointers to the files F1 . . . Fn. 1. Retrieve files F1 . . . Fn. 2. Let L and M be empty lists. 3. For each file Fi from among F1 . . . Fn: 4. If file Fi contains pointers to subcluster files, add these pointers to list L. 5. If file Fi represents a single target object, add a pointer to file Fi to list L. 6. For each pointer X on list L, retrieve the file that pointer P points to and extract the cluster profile P(X) that this file stores. 7. Apply a clustering algorithm to group the pointers X on list L according to the distances between their respective cluster profiles P (X). 8. For each (nonempty) resulting group C of pointers: 9. If C contains only one pointer, add this pointer to list M; 10. otherwise, if C contains exactly the same subcluster pointers as does one of the files Fi from among F1 . . . Fn, then add a pointer to file Fi to list M; 11. otherwise: 12. Select an arbitrary server S2 on the network, for example by randomly selecting one of the pointers in group C and choosing the server it points to. 13. Send a request message to server S2 that includes the subcluster pointers in group C and requests server S2 to merge the corresponding subcluster trees. 14. Receive a response from server S2, containing a pointer to a file G that represents the merged tree. Add this pointer to list M. 15. For each file Fi from among F1 . . . Fn: 16. If list M does not include a pointer to file Fi, send a message to the server or servers storing Fi instructing them to delete file Fi. 17. Create and store a file F that represents a new cluster, whose subcluster pointers are exactly the subcluster pointers on list M. 18. Send a reply message to server S0, which reply message contains a pointer to file F and indicates that file F represents the merged cluster tree.

With the help of the above procedure, and the multicast tree MT full that includes all proxy servers in the network, the distributed hierarchical cluster tree for a particular domain of target objects is constructed by merging many local hierarchical cluster trees, as follows. 1. One server S (preferably one with good connectivity) is elected from the tree. 2. Server S sends itself a global request message that causes each proxy server in $MT_{full}$ (that is, each proxy server in the network) to ask its clients for files for the cluster tree. 3. The clients of each proxy server transmit to the proxy server any files that they maintain, which files represent target objects from the appropriate domain that should be added to the cluster tree. 4. Server S forms a request R1 that, upon receipt, will cause the recipient server S1 to take the following actions: (a) Build a hierarchical cluster tree of all the files stored on server S1 that are maintained by users in the user base of S1. These files correspond to target objects from the appropriate domain. This cluster tree is typically stored entirely on S1, but may in principle be stored in a distributed fashion. (b) Wait until all servers to which the server S1 has propagated request R have sent the recipient reply messages containing pointers to cluster trees. (c) Merge together the cluster tree created in step 5(a) and the cluster trees supplied in step 5(b), by sending any server (such as S1 itself) a message requesting such a merge, as described above. (d) Upon receiving a reply to the message sent in (c), which reply includes a pointer to a file representing the merged cluster tree, forward this reply to the sender of request R1, unless this is S1 itself 5. Server S sends itself a global request message that causes all servers in $MT_{full}$ to act on embedded request R1. 6. Server S receives a reply to the message it sent in 5(c). This reply includes a pointer to a file F that represents the completed hierarchical cluster tree. Server S multicasts file F to all proxy servers in $MT_{full}$. Once the hierarchical cluster tree has been created as above, server S can send additional messages through the cluster tree, to arrange that multicast trees MT(C) are created for sufficiently large clusters C, and that each file F is multicast to the tree MT(C), where C is the smallest cluster containing file F.

MATCHING USERS FOR VIRTUAL COMMUNITIES

Virtual Communities

Computer users frequently join other users for discussions on computer bulletin boards, newsgroups, mailing lists, and real-time chat sessions over the computer network, which may be typed (as with Internet Relay Chat (IRC)), spoken (as with Internet phone), or videoconferenced. These forums are herein termed "virtual communities." In current practice, each virtual community has a specified topic, and users discover communities of interest by word of mouth or by examining a long list of communities (typically hundreds or thousands). The users then must decide for themselves which of thousands of messages they find interesting from among those posted to the selected virtual communities, that is, made publicly available to members of those communities. If they desire, they may also write additional messages and post them to the virtual communities of their choice. The existence of thousands of Internet bulletin boards (also termed newsgroups) and countless more Internet mailing lists and private bulletin board services (BBS's) demonstrates the very strong interest among members of the electronic community in forums for the discussion of ideas about almost any subject imaginable. Presently, virtual community creation proceeds in a haphazard form, usually instigated by a single individual who decides that a topic is worthy of discussion. There are protocols on the Internet for voting to determine whether a newsgroup should be created, but there is a large hierarchy of newsgroups (which begin with the prefix "alt.") that do not follow this protocol.

The system for customized electronic identification of desirable objects described herein can of course function as a browser for bulletin boards, where target objects are taken to be bulletin boards, or subtopics of bulletin boards, and each target profile is the cluster profile for a cluster of documents posted on some bulletin board. Thus, a user can locate bulletin boards of interest by all the navigational techniques described above, including browsing and querying. However, this method only serves to locate existing virtual communities. Because people have varied and varying complex interests, it is desirable to automatically locate groups of people with common interests in order to form virtual communities. The Virtual Community Service (VCS) described below is a network-based agent that seeks out users of a network with common interests, dynamically creates bulletin boards or electronic mailing lists for those users, and introduces them to each other electronically via e-mail. It is useful to note that once virtual communities have been created by VCS, the other browsing and filtering technologies described above can subsequently be used to help a user locate particular virtual communities (whether pre-existing or automatically generated by VCS); similarly, since the messages sent to a given virtual community may vary in interest and urgency for a user who has joined that community, these browsing and filtering technologies (such as the e-mail filter) can also be used to alert the user to urgent messages and to screen out uninteresting ones.

The functions of the Virtual Community Service are general functions that could be implemented on any network ranging from an office network in a small company to the World Wide Web or the Internet. The four main steps in the procedure are: 1. Scan postings to existing virtual communities. 2. Identify groups of users with common interests. 3. Match users with virtual communities, creating new virtual communities when necessary. 4. Continue to enroll additional users in the existing virtual communities.

More generally, users may post messages to virtual communities pseudonymously, even employing different pseudonyms for different virtual communities. (Posts not employing a pseudonymous mix path may, as usual, be considered to be posts employing a non-secure pseudonym, namely the user's true network address.) Therefore, the above steps may be expressed more generally as follows 1. Scan pseudonymous postings to existing virtual communities. 2. Identify groups of pseudonyms whose associated users have common interests. 3. Match pseudonymous users with virtual communities, creating new virtual communities when necessary. 4. Continue to enroll additional pseudonymous users in the existing virtual communities.

Each of these steps can be carried out as described below.

Scanning

Using the technology described above, Virtual Community Service constantly scans all the messages posted to all the newsgroups and electronic mailing lists on a given network, and constructs a target profile for each message found. The network can be the Internet, or a set of bulletin boards maintained by America Online, Prodigy, or CompuServe, or a smaller set of bulletin boards that might be local to a single organization, for example a large company, a law firm, or a university. The scanning activity need not be confined to bulletin boards and mailing lists that were created by Virtual Community Service, but may also be used to scan the activity of communities that predate Virtual Community Service or are otherwise created by means outside the Virtual Community Service system, provided that these communities are public or otherwise grant their permission.

The target profile of each message includes textual attributes specifying the title and body text of the message. In the case of a spoken rather than written message, the latter attribute may be computed from the acoustic speech data by using a speech recognition system. The target profile also includes an associative attribute listing the author(s) and designated recipient(s) of the message, where the recipients may be individuals and/or entire virtual communities; if this attribute is highly weighted, then the system tends to regard messages among the same set of people as being similar or related, even if the topical similarity of the messages is not clear from their content, as may happen when some of the messages are very short. Other important attributes include the fraction of the message that consists of quoted material from previous messages, as well as attributes that are generally useful in characterizing documents, such as the message's date, length, and reading level.

Virtual Community Identification

Next, Virtual Community Service attempts to identify groups of pseudonymous users with common interests. These groups, herein termed "pre-communities," are represented as sets of pseudonyms. Whenever Virtual Community Service identifies a pre-community, it will subsequently attempt to put the users in said pre-community in contact with each other, as described below. Each pre-community is said to be "determined" by a cluster of messages, pseudonymous users, search profiles, or target objects.

In the usual method for determining pre-communities, Virtual Community Service clusters the messages that were scanned and profiled in the above step, based on the similarity of those messages' computed target profiles, thus automatically finding threads of discussion that show common interests among the users. Naturally, discussions in a single virtual community tend to show common interests; however, this method uses all the texts from every available virtual community, including bulletin boards and electronic mailing lists. Indeed, a user who wishes to initiate or join a discussion on some topic may send a "feeler message" on that topic to a special mailing list designated for feeler messages; as a consequence of the scanning procedure described above, the feeler message is automatically grouped with any similarly profiled messages that have been sent to this special mailing list, to topical mailing lists, or to topical bulletin boards. The clustering step employs "soft clustering," in which a message may belong to multiple clusters and hence to multiple virtual communities. Each cluster of messages that is found by Virtual Community Service and that is of sufficient size (for example, 10–20 different messages) determines a pre-community whose members are the pseudonymous authors and recipients of the messages in the cluster. More precisely, the pre-community consists of the various pseudonyms under which the messages in the cluster were sent and received.

Alternative methods for determining a pre-community, which do not require the scanning step above, include the following: 1. Pre-communities can be generated by grouping together users who have similar interests of any sort, not merely Individuals who have already written or received messages about similar topics. If the user profile associated with each pseudonym indicates the user's interests, for example through an associative attribute that indicates the documents or Web sites a user likes, then pseudonyms can be clustered based on the similarity of their associated user profiles, and each of the resulting clusters of pseudonyms determines a pre-community comprising the pseudonyms in the cluster. 2. If each pseudonym has an associated search profile set formed through participation in the news clipping service described above, then all search profiles of all pseudonymous users can be clustered based on their similarity, and each cluster of search profiles determines a pre-community whose members are the pseudonyms from whose search profile sets the search profiles in the cluster are drawn. Such groups of people have been reading about the same topic (or, more generally, accessing similar target objects) and so presumably share an interest. 3. If users participate in a news clipping service or any other filtering or browsing system for target objects, then an individual user can pseudonymously request the formation of a virtual community to discuss a particular cluster of one or more target objects known to that system. This cluster of target objects determines a pre-community consisting of the pseudonyms of users determined to be most interested in that cluster (for example, users who have search profiles similar to the cluster pro file), together with the pseudonym of the user who requested formation of the virtual community.

Matching Users with Communities

Once Virtual Community Service identifies a cluster C of messages, users, search profiles, or target objects that determines a pre-community M, it attempts to arrange for the members of this pre-community to have the chance to participate in a common virtual community V. In many cases, an existing virtual community V may suit the needs of the pre-community M. Virtual Community Service first attempts to find such an existing community V. In the case where cluster C is a cluster of messages, V may be chosen to be any existing virtual community such that the cluster profile of cluster C is within a threshold distance of the mean profile of the set of messages recently posted to virtual community V; in the case where cluster C is a cluster of users, V may be chosen to be any existing virtual community such that the cluster profile of cluster C is within a threshold distance of the mean user profile of the active members of virtual community V; in the case where the cluster C is a cluster of search profiles, V may be chosen to be any existing virtual community such that the cluster profile of cluster C is within a threshold distance of the cluster profile of the largest cluster resulting from clustering all the search profiles of active members of virtual community V; and in the case where the cluster C is a cluster of one or more target objects chosen from a separate browsing or filtering system, V may be chosen to be any existing virtual community initiated in the same way from a cluster whose cluster profile in that other system is within a threshold distance of the cluster profile of cluster C. The threshold distance used in each case is optionally dependent on the cluster variance or cluster diameter of the profile sets whose means are being compared.

If no existing virtual community V meets these conditions and is also willing to accept all the users in pre-community M as new members, then Virtual Community Service attempts to create a new virtual community V. Regardless of whether virtual community V is an existing community or a newly created community, Virtual Community Service sends an e-mail message to each pseudonym P in pre-community M whose associated user U does not already belong to virtual community V (under pseudonym P) and has not previously turned down a request to join virtual community V. The e-mail message informs user U of the existence of virtual community V, and provides instructions which user U may follow in order to join virtual community V if desired; these instructions vary depending on whether virtual community V is an existing community or a new community. The message includes a credential, granted to pseudonym P, which credential must be presented by user U upon joining the virtual community V, as proof that user U was actually invited to join. If user U wishes to join virtual community V under a different pseudonym Q, user U may first transfer the credential from pseudonym P to pseudonym Q, as described above. The e-mail message further provides an indication of the common interests of the community, for example by including a list of titles of messages recently sent to the community, or a charter or introductory message provided by the community (if available), or a label generated by the methods described above that identifies the content of the cluster of messages, user profiles, search profiles, or target objects that was used to identify the pre-community M.

If Virtual Community Service must create a new community V, several methods are available for enabling the members of the new community to communicate with each other. If the pre-community M is large, for example containing more than 50 users, then Virtual Community Service typically establishes either a multicast tree, as described below, or a widely-distributed bulletin board, assigning a name to the new bulletin board. If the pre-community M has fewer members, for example 2–50, Virtual Community Service typically establishes either a multicast tree, as described below, or an e-mail mailing list. If the new virtual community V was determined by a cluster of messages, then Virtual Community Service kicks off the discussion by distributing these messages to all members of virtual community V. In addition to bulletin boards and mailing lists, alternative fora that can be created and in which virtual communities can gather include real-time typed or spoken conversations (or engagement or distributed multi-user applications including video games) over the computer network and physical meetings, any of which can be scheduled by a partly automated process wherein Virtual Community Service requests meeting time preferences from all members of the pre-community M and then notifies these individuals of an appropriate meeting time.

Continued Enrollment

Even after creation of a new virtual community, Virtual Community Service continues to scan other virtual communities for new messages whose target profiles are similar to the community's cluster profile (average message profile). Copies of any such messages are sent to the new virtual community, and the pseudonymous authors of these messages, as well as users who show high interest in reading such messages, are informed by Virtual Community Service (as for pre-community members, above) that they may want to join the community. Each such user can then decide whether or not to join the community. In the case of Internet Relay Chat (IRC), if the target profile of messages in a real time dialog are (or become) similar to that of a user, VCS may also send an urgent e-mail message to such user whereby the user may be automatically notified as soon as the dialog appears, if desired.

With these facilities, Virtual Community Service provides automatic creation of new virtual communities in any local or wide- area network, as well as maintenance of all virtual communities on the network, including those not created by Virtual Community Service. The core technology underlying Virtual Community Service is creating a search and clustering mechanism that can find articles that are "similar" in that the users share interests. This is precisely what was described above. One must be sure that Virtual Community Service does not bombard users with notices about communities in which they have no real interest. On a very small network a human could be "in the loop", scanning proposed virtual communities and perhaps even giving them names. But on larger networks Virtual Community Service has to run in fully automatic mode, since it is likely to find a large number of virtual communities.

Delivering Messages to a Virtual Community

Once a virtual community has been identified, it is straightforward for Virtual Community Service to establish a mailing list so that any member of the virtual community may distribute e-mail to all other members. Another method of distribution is to use a conventional network bulletin board or newsgroup to distribute the messages to all servers in the network, where they can be accessed by any member of the virtual community. However, these simple methods do not take into account cost and performance advantages which accrue from optimizing the construction of a multicast tree to carry messages to the virtual community. Unlike a newsgroup, a multicast tree distributes messages to only a selected set of servers, and unlike an e-mail mailing list, it does so efficiently.

A separate multicast tree MT(V) is maintained for each virtual community V, by use of the following four procedures. 1. To construct or reconstruct this multicast tree, the core servers for virtual community V are taken to be those proxy servers that serve at least one pseudonymous member of virtual community V. Then the multicast tree MT(V) is established via steps 4–6 in the section "Multicast Tree Construction Procedure" above. 2. When a new user joins virtual community V, which is an existing virtual community, the user sends a message to the user's proxy server S. If user's proxy server S is not already a core server for V, then it is designated as a core server and is added to the multicast tree MT(V), as follows. If more than k servers have been added since the last time the multicast tree MT(V) was rebuilt, where k is a function of the number of core servers already in the tree, then the entire tree is simply rebuilt via steps 4–6 in the section "Multicast Tree Construction Procedure" above. Otherwise, server S retrieves its locally stored list of nearby core servers for V, and chooses a server S1. Server S sends a control message to S1, indicating that it would like to be added to the multicast tree MT(V). Upon receipt of this message, server SI retrieves its locally stored subtree G1 of MT(V), and forms a new graph G from G1 by removing all degree-1 vertices other than S1 itself. Server S1 transmits graph G to server S, which stores it as its locally stored subtree of MT(V). Finally, server S sends a message to itself and to all servers that are vertices of graph G, instructing these servers to modify their locally stored subtrees of MT(V) by adding S as a vertex and adding an edge between SI and S. 3. When a user at a client q wishes to send a message F to virtual community V, client q embeds message F in a request R instructing the recipient to store message F locally, for a limited time, for access by member s of virtual community V. Request R includes a credential proving that the user is a member of virtual community V or is otherwise entitled to post messages to virtual community V (for example is not "black marked" by that or other virtual community members). Client q then broadcasts request R to all core servers in the multicast tree MT(V), by means of a global request message transmitted to the user's proxy server as described above. The core servers satisfy request R, provided that they can verify the included credential. 4. In order to retrieve a particular message sent to virtual community V, a user U at client q initiates the steps described in section "Retrieving Files from a Multicast Tree," above. If user U does not want to retrieve a particular message, but rather wants to retrieve all new messages sent to virtual community V, then user U pseudonymously instructs its proxy server (which is a core server for V) to send it all messages that were multicast to MT(V) after a certain date. In either case, user U must provide a credential proving user U to be a member of virtual community V, or otherwise entitled to access messages on virtual community V.

SUMMARY

A method has been presented for automatically selecting articles of interest to a user. The method generates sets of search profiles for the users based on such attributes as the relative frequency of occurrence of words in the articles read by the users, and uses these search profiles to efficiently identify future articles of interest. The methods is characterized by passive monitoring (users do not need to explicitly rate the articles), multiple search profiles per user (reflecting interest in multiple topics) and use of elements of the search profiles which are automatically determined from the data (notably, the TF/IDF measure based on word frequencies and descriptions of purchasable items). A method has also been presented for automatically generating menus to allow users to locate and retrieve articles on topics of interest. This method clusters articles based on their similarity, as measured by the relative frequency of word occurrences. Clusters are labeled either with article titles or with key words extracted from the article. The method can be applied to large sets of articles distributed over many machines.

It has been further shown how to extend the above methods from articles to any class of target objects for which profiles can be generated, including news articles, reference or work articles, electronic mail, product or service descriptions, people (based on the articles they read, demographic data, or the products they buy), and electronic bulletin boards (based on the articles posted to them). A particular consequence of being able to group people by their interests is that one can form virtual communities of people of common interest, who can then correspond with one another via electronic mail.

We claim:

1. A method for cataloging a plurality of target objects that are stored on an electronic storage media, where users are connected via user terminals and bidirectional data communication connections to a target server that accesses said electronic storage media, said method comprising the steps of:

storing on said electronic storage media each target object;

automatically generating in said target server, target profiles for each of said target objects that are stored on said electronic storage media, each of said target profiles being generated from the contents of an associated one of said target objects and their associated target object characteristics comprising:

automatically generating a hierarchical menu that directs said users to at least a subset of said plurality of target objects stored on said electronic media, comprising:

sorting all target objects in said subset into a plurality of clusters of target objects based on an empirical measure of similarity of content of said target objects, and generating a hierarchical menu that identifies the content in common of target objects sorted into each of said plurality of clusters, to enable said identified user to identify ones of said plurality of target objects stored on said electronic storage media that are likely to be of interest to said identified user.

2. The method of claim 1 wherein said step of automatically generating a hierarchical menu further comprises:

ascribing a cluster profile to each of said plurality of clusters.

3. The method of claim 1 wherein said step of sorting comprises:

dividing said plurality of target objects into at least two clusters based upon said empirical measure of similarity of content of said target objects;

subdividing each of said at least two clusters into at least two subclusters based upon said empirical measure of similarity of content of said target objects contained in each said cluster; and repeating said step of subdividing to produce a multi-level hierarchy of identified clusters.

4. The method of claim 3 wherein said step of generating a hierarchical menu comprises:

ascribing a cluster profile to each cluster produced by all steps of dividing and subdividing in said step of sorting.

5. The method of claim 4 wherein said step of ascribing comprises:

identifying at least one term in said generated target profiles produced for ones of said plurality of target objects sorted into a cluster that is indicative of the target content of said ones of said plurality of target objects sorted into said cluster.

6. The method of claim 4 wherein said step of ascribing comprises:

selecting at least one target object of said ones of said plurality of target objects sorted into said cluster that are closest to the center of the cluster, and ascribing a cluster profile that is indicative of a content of said ones of said plurality of target objects sorted into said cluster, said cluster profile comprising elements of at least one of: a title of said selected at least one target object, and a set of words contained in the target profile of said selected at least one target object cluster which have the highest relative frequency.

7. A method for cataloging a plurality of target objects that are stored on an electronic storage media, where users are connected via user terminals and bidirectional data communication connections to a target server that accesses said electronic storage media, and wherein said sets of target object characteristics comprise sets of user interest characteristics for a virtual community of users, said method comprising the steps of:

storing on said electronic storage media each target object;

automatically generating in said target server, target profiles for each of said target objects that are stored on said electronic storage media, each of said target profiles being generated from the contents of an associated one of said target objects and their associated target object characteristics comprising:

automatically generating a hierarchical menu that directs a requesting one of said users to at least a subset of said sets of user interest characteristics for a virtual community of users stored on said electronic media, comprising:

sorting all sets of user interest characteristics for a virtual community of users in said subset into a plurality of clusters of target sets of user interest characteristics for a virtual community of users based on an empirical measure of similarity of content of said target sets of user interest characteristics for a virtual community of users, and generating a hierarchical menu that identifies the content in common of target sets of user interest characteristics for a virtual community of users sorted into each of said plurality of clusters, to enable said requesting user to identify ones of said plurality of target sets of user interest characteristics for a virtual community of users stored on said electronic storage media that are likely to be of interest to said requesting user.

8. The method of claim 7 wherein said step of automatically generating a hierarchical menu further comprises:

ascribing a cluster profile to each of said plurality of clusters.

9. The method of claim 7 wherein said step of sorting comprises:

dividing said plurality of target sets of user interest characteristics for a virtual community of users into at least two clusters based upon said empirical measure of similarity of content of said target sets of user interest characteristics for a virtual community of users;

subdividing each of said at least two clusters into at least two subclusters based upon said empirical measure of similarity of content of said target sets of user interest characteristics for a virtual community of users contained in each said cluster; and repeating said step of subdividing to produce a multi-level hierarchy of identified clusters.

10. The method of claim 9 wherein said step of generating a hierarchical menu comprises:

ascribing a cluster profile to each cluster produced by all steps of dividing and subdividing in said step of sorting.

11. The method of claim 10 wherein said step of ascribing comprises:

identifying at least one term in said generated target profiles produced for ones of said plurality of target sets of user interest characteristics for a virtual community of users sorted into a cluster that is indicative of the target content of said ones of said plurality of target sets of user interest characteristics for a virtual community of users sorted into said cluster.

12. The method of claim 10 wherein said step of ascribing comprises:

selecting at least one target set of user interest characteristics for a virtual community of users of said ones of said plurality of target sets of user interest characteristics for a virtual community of users sorted into said cluster that are closest to the center of the cluster, and ascribing a cluster profile that is indicative of a content of said selected target set of user interest characteristics for a virtual community of users sorted into said cluster, said cluster profile comprising elements of at least one of: a characteristic of said selected at least one target user interest characteristics for a virtual community of users, and a set of words contained in the target profile of said selected at least one target object cluster which have the highest relative frequency.

13. Apparatus for cataloging a plurality of target objects that are stored on an electronic storage media, where users are connected via user terminals and bidirectional data communication connections to a target server that accesses said electronic storage media, said apparatus comprising:

means for storing on said electronic storage media each target; and means for automatically generating in said target server, target profiles for each of said target objects and that are stored on said electronic storage media, each of said target profiles being generated from the contents of an associated one of said target objects their associated target object characteristics, comprising:

means for automatically generating a hierarchical menu that directs said users to at least a subset of said plurality of target objects stored on said electronic media, comprising:

means for sorting all target objects in said subset into a plurality of clusters of target objects based on an empirical measure of similarity of content of said target objects, and means for generating a hierarchical menu that identifies the content in common of target objects sorted into each of said plurality of clusters, to enable said identified user to identify ones of said plurality of target objects stored on said electronic storage media that are likely to be of interest to said identified user.

14. The apparatus of claim 13 wherein said means for automatically generating a hierarchical menu further comprises:

means for ascribing a cluster profile to each of said plurality of clusters.

15. The apparatus of claim 13 wherein said means for sorting comprises:

means for dividing said plurality of target objects into at least two clusters based upon said empirical measure of similarity of content of said target objects;

means for subdividing each of said at least two clusters into at least two subclusters based upon said empirical measure of similarity of content of said target objects contained in each said cluster; and means for repeating said cluster subdividing to produce a multi-level hierarchy of identified clusters.

16. The apparatus of claim 15 wherein said means for generating a hierarchical menu comprises:

means for ascribing a cluster profile to each cluster produced by all steps of dividing and subdividing in said step of sorting.

17. The apparatus of claim 16 wherein said means for ascribing comprises:

means for identifying at least one term in said generated target profiles produced for ones of said plurality of target objects sorted into a cluster that is indicative of the target content of said ones of said plurality of target objects sorted into said cluster.

18. The apparatus of claim 17 wherein said means for ascribing comprises:

means for selecting at least one target object of said ones of said plurality of target objects sorted into said cluster that are closest to the center of the cluster, and means for ascribing a cluster profile that is indicative of a content of said ones of said plurality of target objects sorted into said cluster, said cluster profile comprising elements of at least one of: a title of said selected at least one target object, and a set of words contained in the target profile of said selected at least one target object cluster which have the highest relative frequency.

19. Apparatus for cataloging a plurality of target objects that are stored on an electronic storage media, where users are connected via user terminals and bidirectional data communication connections to a target server that accesses said electronic storage media, said apparatus comprising:

means for storing on said electronic storage media each target; and means for automatically generating in said target server, target profiles for each of said target objects and that are stored on said electronic storage media, each of said target profiles being generated from the contents of an associated one of said target objects their associated target object characteristics, comprising:

means for automatically generating a hierarchical menu that directs a requesting one of said users to at least a subset of said sets of user interest characteristics for a virtual community of users stored on said electronic media, comprising:

means for sorting all sets of user interest characteristics for a virtual community of users in said subset into a plurality of clusters of target sets of user interest characteristics for a virtual community of users based on an empirical measure of similarity of content of said target sets of user interest characteristics for a virtual community of users, and means for generating a hierarchical menu that identifies the content in common of target sets of user interest characteristics for a virtual community of users sorted into each of said plurality of clusters, to enable said requesting user to identify ones of said plurality of target sets of user interest characteristics for a virtual community of users stored on said electronic storage media that are likely to be of interest to said requesting user.

20. The apparatus of claim 19 wherein said means for automatically generating a hierarchical menu further comprises:

means for ascribing a cluster profile to each of said plurality of clusters.

21. The apparatus of claim 19 wherein said means for sorting comprises:

means for dividing said plurality of target sets of user interest characteristics for a virtual community of users into at least two clusters based upon said empirical measure of similarity of content of said target sets of user interest characteristics for a virtual community of users;

means for subdividing each of said at least two clusters into at least two subclusters based upon said empirical measure of similarity of content of said target sets of user interest characteristics for a virtual community of users contained in each said cluster; and means for repeating said step of subdividing to produce a multi-level hierarchy of identified clusters.

22. The apparatus of claim 21 wherein said means for generating a hierarchical menu comprises:

means for ascribing a cluster profile to each cluster produced by all steps of dividing and subdividing in said step of sorting.

23. The apparatus of claim 22 wherein said means for ascribing comprises:

means for identifying at least one term in said generated target profiles produced for ones of said plurality of target sets of user interest characteristics for a virtual community of users sorted into a cluster that is indicative of the target content of said ones of said plurality of target sets of user interest characteristics for a virtual community of users sorted into said cluster.

24. The apparatus of claim 22 wherein said means for ascribing comprises:

means for selecting at least one target set of user interest characteristics for a virtual community of users of said ones of said plurality of target sets of user interest characteristics for a virtual community of users sorted into said cluster that are closest to the center of the cluster, and means for ascribing a cluster profile that is indicative of a content of said selected target set of user interest characteristics for a virtual community of users sorted into said cluster, said cluster profile comprising elements of at least one of: a characteristic of said selected at least one target user interest characteristics for a virtual community of users, and a set of words contained in the target profile of said selected at least one target object cluster which have the highest relative frequency.

* * * * *